United States Patent [19]

Raben

[11] Patent Number: 5,692,872

[45] Date of Patent: Dec. 2, 1997

[54] TIRE-STACKING DEVICE AND ACCESSORIES FOR USE IN COOPERATIVE ARRANGEMENT WITH A LIFT TRUCK

[76] Inventor: Thomas M. Raben, 12548 Apache Pass Ave., Evansville, Ind. 47720

[21] Appl. No.: 666,829

[22] Filed: Jun. 19, 1996

Related U.S. Application Data

[60] Continuation of Ser. No. 478,905, Jun. 7, 1995, abandoned, which is a division of Ser. No. 344,240, Nov. 23, 1994, Pat. No. 5,562,392, which is a continuation-in-part of Ser. No. 230,079, Apr. 20, 1994, abandoned, which is a continuation-in-part of Ser. No. 38,144, Mar. 26, 1993, Pat. No. 5,385,440, which is a continuation-in-part of Ser. No. 917,779, Jul. 21, 1992, abandoned.

[51] Int. Cl.$^6$ ........................................... B66F 9/075
[52] U.S. Cl. ........................................... 414/607; 414/608
[58] Field of Search ........................................... 414/607, 608, 414/663, 785, 664, 667, 668, 671

[56] References Cited

U.S. PATENT DOCUMENTS

| | | |
|---|---|---|
| 1,506,136 | 8/1924 | Remde . |
| 2,714,463 | 8/1955 | Fraser . |
| 2,772,918 | 12/1956 | Klinger . |
| 2,827,190 | 3/1958 | Spitzmesser ........................... 414/608 |
| 2,929,523 | 3/1960 | Cushman . |
| 2,959,313 | 11/1960 | Bettencourt et al. . |
| 2,981,429 | 4/1961 | Williamson . |
| 3,084,820 | 4/1963 | Malo . |
| 3,118,555 | 1/1964 | Bent et al. . |
| 3,409,156 | 11/1968 | Mills . |
| 4,295,772 | 10/1981 | Zimmerman . |
| 4,325,669 | 4/1982 | Schafer . |
| 4,354,795 | 10/1982 | Dutra, Jr. . |
| 4,403,903 | 9/1983 | Cary ........................... 414/607 |
| 4,497,606 | 2/1985 | Hobson ........................... 414/607 |
| 4,538,953 | 9/1985 | Abramson, Jr. ........................... 414/608 |
| 4,688,981 | 8/1987 | Ravnsborg et al. ........................... 414/607 |
| 4,699,565 | 10/1987 | Seaberg ........................... 414/607 X |
| 4,850,789 | 7/1989 | Zimmerman ........................... 414/607 X |
| 4,961,681 | 10/1990 | Threatt ........................... 414/607 |
| 5,156,519 | 10/1992 | Johansson . |
| 5,230,600 | 7/1993 | Marino ........................... 414/664 X |

FOREIGN PATENT DOCUMENTS

| | | |
|---|---|---|
| 2 240 633 | 2/1974 | Germany . |
| 2713348 | 9/1978 | Germany ........................... 414/667 |
| 55-21310 | 2/1980 | Japan . |
| 39303 | 3/1955 | Poland . |
| 337124 | 4/1959 | Switzerland . |
| 624461 | 6/1949 | United Kingdom . |
| 0723554 | 2/1955 | United Kingdom ........................... 414/667 |
| 0843768 | 8/1960 | United Kingdom ........................... 414/608 |
| 0956437 | 4/1964 | United Kingdom ........................... 414/607 |
| 1 229 490 | 4/1971 | United Kingdom . |

OTHER PUBLICATIONS

Catalog Page 144, (1991) Myers Tire Supply No. 325.

*Primary Examiner*—James W. Keenan
*Attorney, Agent, or Firm*—Woodard, Emhardt, Naughton, Moriarty & McNett

[57] ABSTRACT

The tire-stacking device includes a platform for placing a plurality of tires side by side when the device is in a horizontal position. The device is thereafter raised by the lifting apparatus of a lift truck to a vertical position. The stack of tires is supported in this vertical position by a clamping arrangement attached to the base end of the device. The clamping arrangement is selectively releasable to permit an operator to deposit the stack of tires at a desired location. A hook is also provided for connecting the device to the lifting apparatus of a lift truck. A fork apparatus is further provided to be used in cooperative arrangement with the hook, a pair of existing fork lift forks, and a lift truck to lift and transport objects. A cart apparatus is also provided for facilitating the mounting and dismounting of the hook to the lifting apparatus of the lift truck.

5 Claims, 44 Drawing Sheets

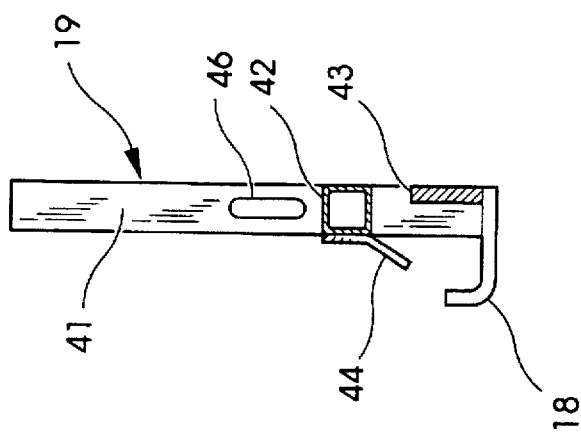
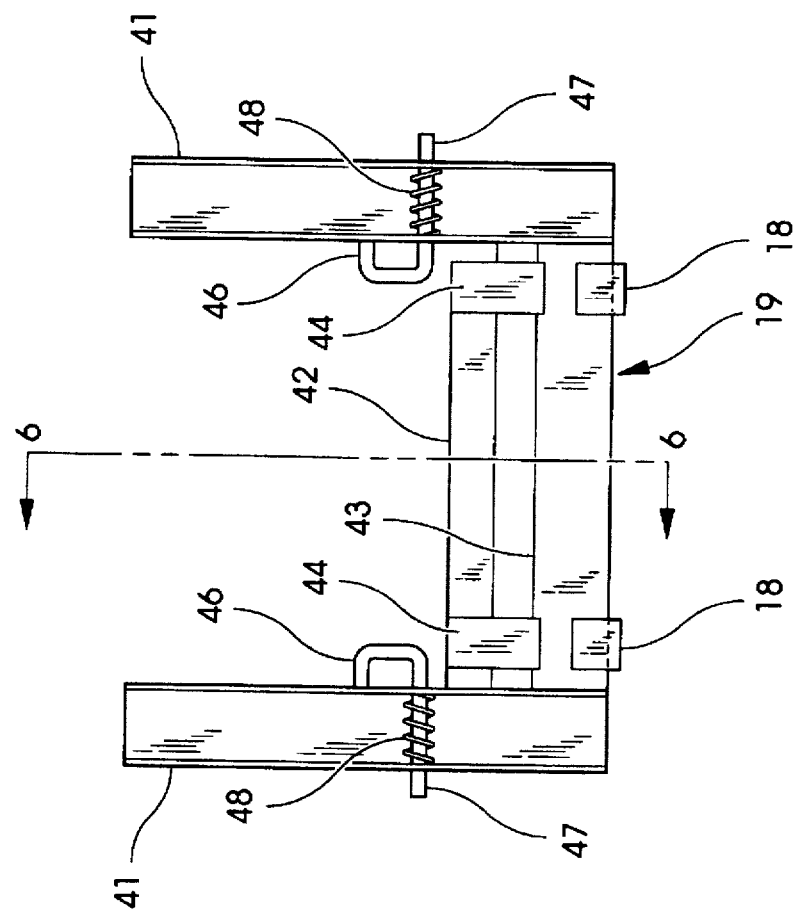

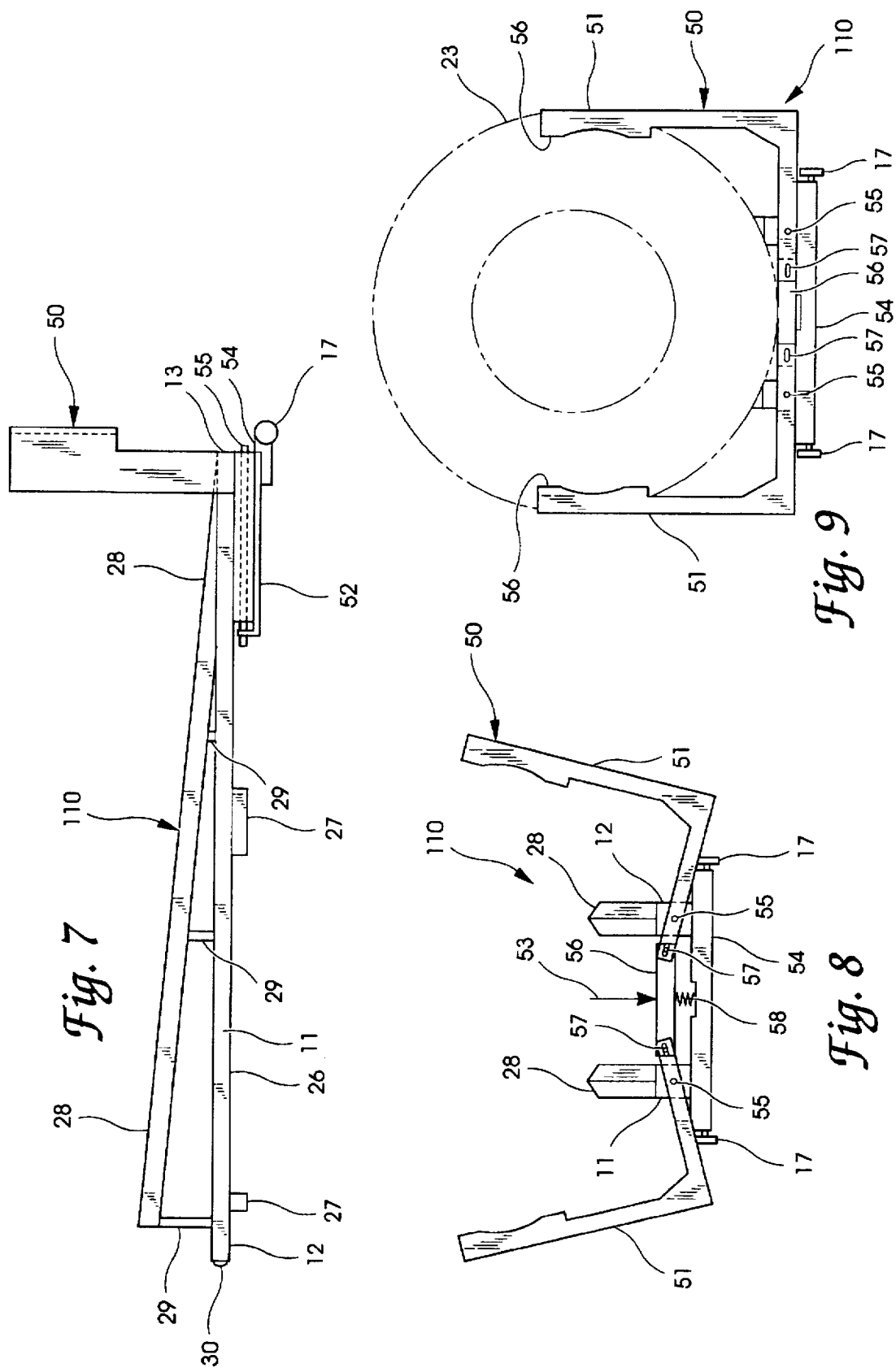

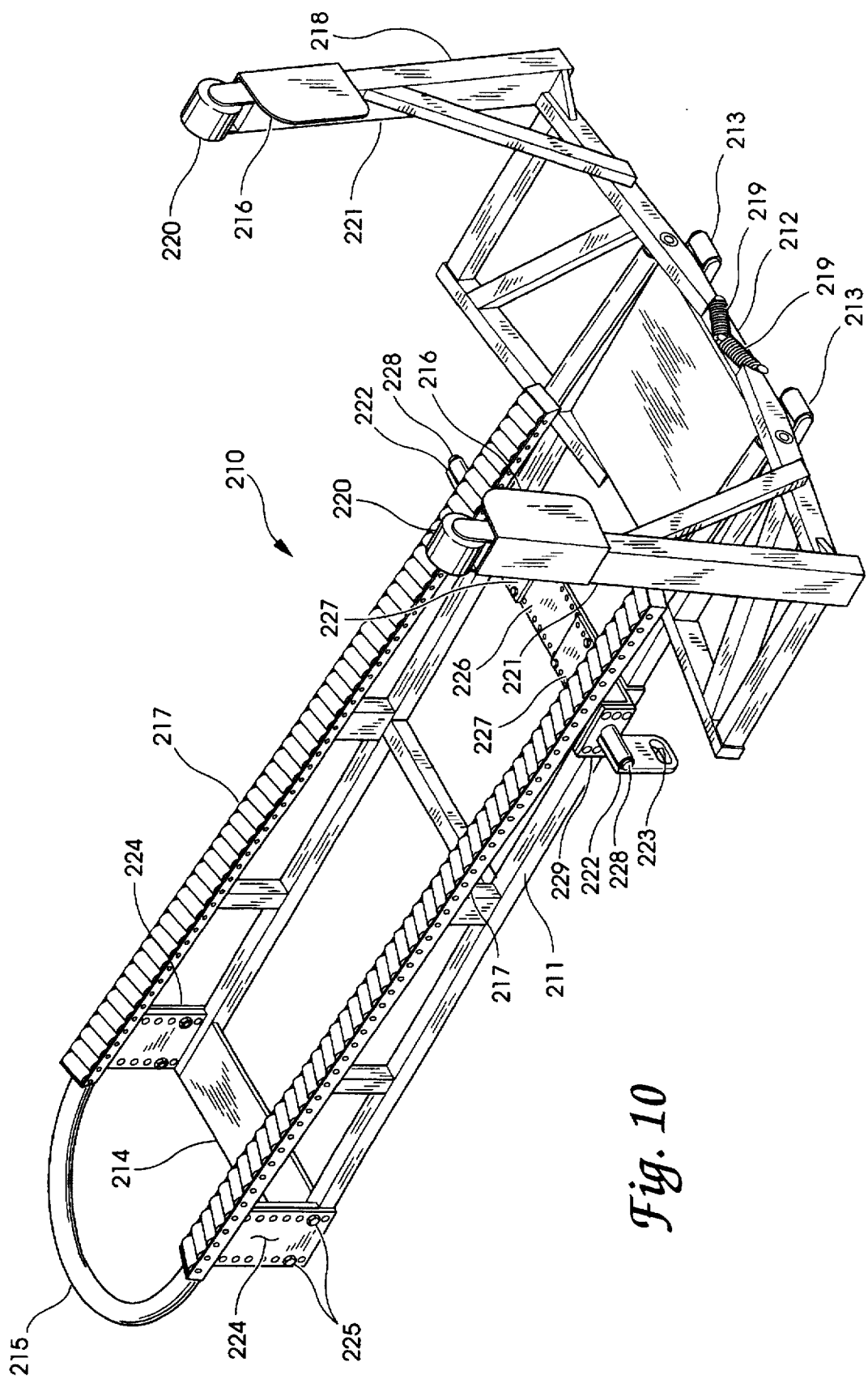

TIRE-STACKING DEVICE AND ACCESSORIES FOR USE IN COOPERATIVE ARRANGEMENT WITH A LIFT TRUCK

REFERENCE TO RELATED APPLICATIONS

This application is a continuation of application Ser. No. 08/478,905, filed Jun. 7, 1995, now abandoned, which is a division of Ser. No. 344,240 filed Nov. 23, 1994, now U.S. Pat. No. 5,562,392, which is a continuation-in-part of U.S. patent application Ser. No. 08/230,079, filed Apr. 20, 1994, now abandoned which is a continuation-in-part of Ser. No. 038,144 filed Mar. 26, 1993, now U.S. Pat. No. 5,385,440, issued Jan. 31, 1995, which is a continuation-in-part of U.S. patent application Ser. No. 07/917,779, filed Jul. 21, 1992, now abandoned.

BACKGROUND OF THE INVENTION

This invention relates generally to devices for use in cooperative arrangement with a lift truck, and in particular, to stacking and transporting devices for use in stacking and moving stacks of tires.

In the truck tire retreading business, used truck tires are normally brought into the plant and then are stacked on pallets eight tires high until the tires are ready for processing. Because these tires weigh on the order of 125 pounds each, they are generally too heavy for a single man to lift and place the last few tires on the top of a stack. Thus, it often requires two men to complete each eight-tire stack. After being stacked on a pallet, the tires can be moved about the plant by a single man using an ordinary forklift truck.

The present method of manually stacking tires on pallets suffers from two distinct drawbacks. First, it is inefficient to require the use of two persons to stack the tires. This inefficiency is even more significant when one realizes that the second person is only needed to stack the last few tires but is not needed to begin the stack of tires or to move the tires around the plant once stacked. Second, when only a single person is available to stack the tires, that person runs the risk of injury due to overexertion in having to stack heavy tires to heights above their chest level.

What is needed are tire-stacking and transporting devices that are capable of being used without pallets in conjunction with a forklift truck and which enable a single person to stack tires and transport the stack in an efficient manner without running the risk of injury due to overexertion.

SUMMARY OF THE INVENTION

One embodiment of the present invention comprises a tire-stacking device for use in cooperative arrangement with a lift truck having a lifting apparatus. The tire-stacking device comprises a frame having a base end, a lifting end and a platform extending between the base end and the lifting end, the frame being configured to permit a plurality of tires to be rolled from a stationary surface onto the platform and into side-by-side relation on the platform when the frame is in a horizontal position and resting on the stationary surface, the platform being capable of supporting the plurality of tires when the frame is in said horizontal position. The device further includes a lateral support structure having a root end, a free end and a support surface positioned between the root end and the free end, the root end being attached to the base end of the frame with the free end of the lateral support structure extending away from the platform, the support surface being capable of supporting the plurality of tires when the frame is in a vertical position, and means for releasably connecting the lifting end of the frame to the lifting apparatus of the lift truck.

In accordance with another aspect of the present invention, a tire-stacking device for use in cooperative arrangement with a lift truck having a lifting apparatus is provided. The tire-stacking device comprises a frame having a base end, a lifting end and a platform extending between the base end and the lifting end, the platform being capable of supporting a plurality of tires in side-by-side relation when the frame is in a horizontal position. The tire-stacking device further includes a pair of gripping arms each having a root end pivotably attached to the base end and a free end with a support structure positioned between the root end and the free end, the arms being capable of pivoting toward and away from each other, the support structure being capable of supporting the plurality of tires when the frame is in a vertical position. Also included is means for forcing the gripping arms toward each other, the means for forcing being connected to each of the root ends and being responsive to the weight of at least one of the plurality of tires when the frame is in the horizontal position, and means for releasably connecting the lifting end of the frame to the lifting apparatus of the lift truck, wherein the weight of at least one of the plurality of tires acting upon the forcing means sufficiently urges the gripping arms inwardly toward each other to position the support structure for supporting the plurality of tires when the frame is in its vertical position.

In accordance with a further aspect of the present invention, a tire-stacking device for use in cooperative arrangement with a lift truck having a lifting apparatus is provided. The tire-stacking device comprises a frame having a base end, a lifting end and a platform extending between the base end and the lifting end, the platform being capable of supporting a plurality of tires in side-by-side relation when the frame is in a horizontal position. The device further includes a lateral support structure having a root end and a free end, the root end being attached to the base end of the frame with the free end of the lateral support structure extending away from the platform. Also included is a support member pivotably attached to the lateral support structure between the root end and the free end, the support member being pivotable between a support position and a release position, the support member supporting the plurality of tires when the frame is in a vertical position and the support member is in the support position, and releasing the plurality of tires from the tire-stacking device when the frame is in the vertical position and the support member is in the release position. Finally, the device includes means for releasably connecting the lifting end of the frame to the lifting apparatus of the lift truck.

Another embodiment of the present invention comprises a fork apparatus for use in cooperative arrangement with a lift truck having a lifting apparatus. The fork apparatus comprises a frame having a top end, a base end, and a lifting element. A support structure is attached to the frame, the support structure being adapted to support a pair of fork lift forks in side by side relation. The fork apparatus further includes a hook attachable to the lifting apparatus of the lift truck, the hook having means for releasably connecting the hook to the lifting element of the fork apparatus.

A further embodiment of the present invention comprises a cart apparatus for use in cooperative arrangement with a lift truck having a lifting apparatus. The cart apparatus comprises a body having a top, two sides and a base, the body defining a handle portion adjacent the top, a front wall portion extending from the base toward the top and terminating in a ledge at a predetermined distance from the base, and a rear wall portion extending the predetermined distance from the base toward the top, the rear wall portion having a diagonal portion extending between the body and the rear wall portion, wherein the two sides, the rear wall portion and the front wall portion define a recess, and wherein the recess, the ledge and the diagonal portion of the rear wall are configured to support a device to be removably mounted to the lifting apparatus of the lift truck, and further wherein the predetermined distance is chosen such that the device may be mounted to, and removed from, the lifting apparatus of the lift truck without removing the device from said cart apparatus.

One object of the present invention is to provide improved methods and apparata for stacking and moving stacks of tires.

Another object of the present invention is to provide a fork apparatus operatively associated with a pair of existing fork lift forks.

A further object of the present invention is to provide a cart apparatus for facilitating the mounting and dismounting of a hook assembly to the lifting apparatus of a lift truck.

Related objects and advantages of the present invention will be apparent from the following description.

BRIEF DESCRIPTION OF THE DRAWINGS

FIG. 5 is a front elevational view of an adapter which is connected between the lifting apparatus of the lift truck and the tire-stacking device of FIGS. 1–4.

FIG. 6 is a sectional view of the adapter shown in FIG. 5 taken along the line 6—6 of FIG. 5.

FIG. 7 is a side elevational view of another tire-stacking device.

FIG. 8 is an end elevational view of the tire-stacking device shown in FIG. 7 with the clamping mechanism in its open position.

FIG. 9 is an end elevational view of the tire-stacking device of FIG. 7 shown with the clamping mechanism in its closed position about a tire.

FIG. 10 is an isometric view of a tire-stacking device according to the preferred embodiment of the present invention.

FIG. 49 is a side elevational and cross-sectional view of the hook assembly of FIG. 48a.

FIG. 50a is a front elevational view of a cart apparatus in accordance with a further aspect of the present invention.

FIG. 50b is a side elevational view of the cart apparatus of FIG. 50a.

DESCRIPTION OF THE PREFERRED EMBODIMENTS

Figure 1:
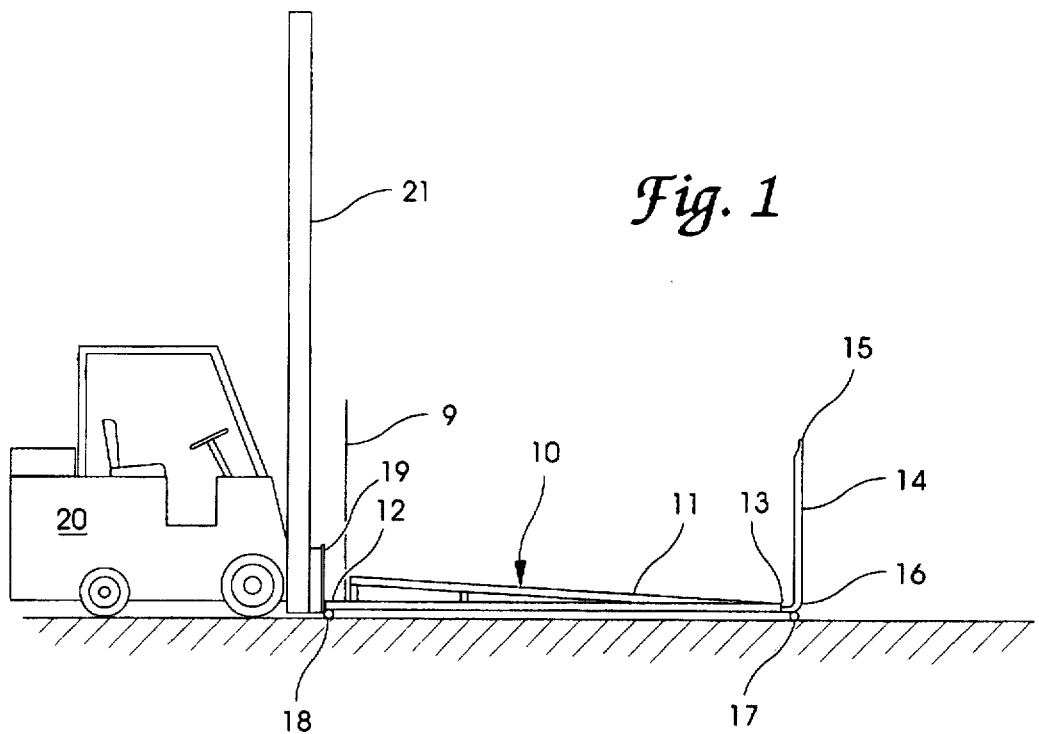
FIG. 1 is a side elevational view of a tire-stacking device in its horizontal position attached to the lifting apparatus of a lift truck.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
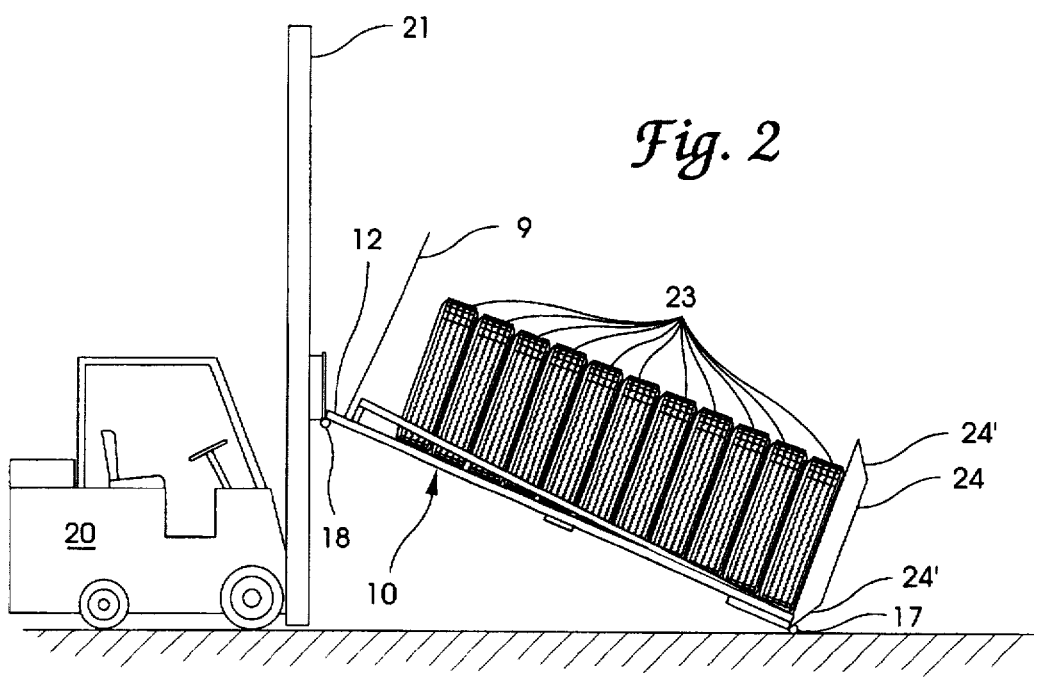
FIG. 2 is a side elevational view of the tire-stacking device of FIG. 1 after a plurality of tires has been arranged thereon and the lifting apparatus of the lift truck has been activated.
Figure 3:
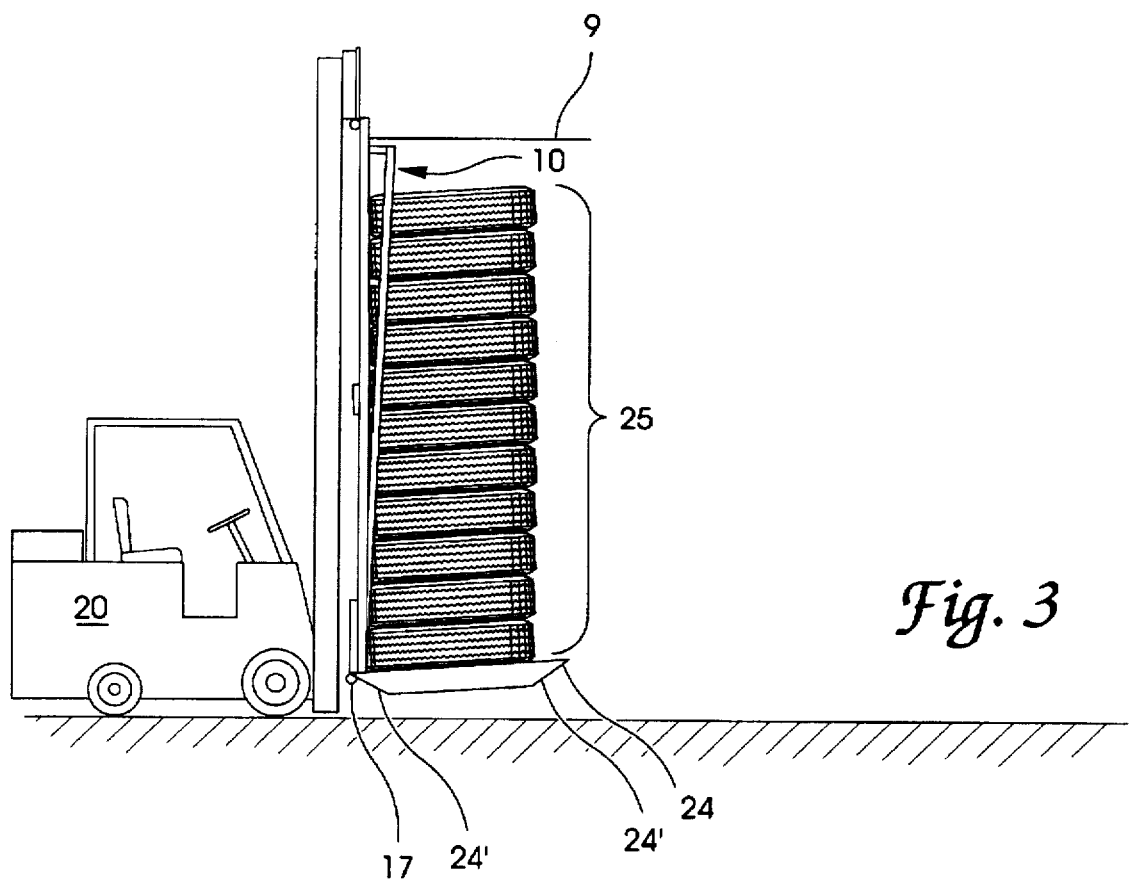
FIG. 3 is a side elevational view of the tire-stacking device of FIG. 1 shown in its vertical position holding a stack of tires.

Referring now to FIGS. 1–3, there is illustrated a tire-stacking device 10 being used in cooperative arrangement with a lift truck 20. Tire-stacking device 10 includes a frame 11 having a lifting end 12 and a base end 13. A pair of forks 14, which act as a lateral support structure, are attached to the base end 13 of frame 11. Forks 14 are attached such that the free end 15 of the forks projects perpendicularly away from frame 11. A pair of wheels 17 are attached to the root end 16 of the forks 14. The lifting end 12 of tire-stacking device 10 is connected to the lifting apparatus 21 of lift truck 20 via an adapter 19. Adapter 19 includes at least one hook 18 that attaches to lifting end 12 via cross members 30, which are better shown in FIG. 4.

With the tire-stacking device in its horizontal position as shown in FIG. 1, the worker simply places an ordinary but slightly modified wooden pallet 24 over forks 14, and then arranges a plurality of tires 23 in side-by-side relation along the top platform portion of frame 11. Note that the bottom end slats of the pallet 24 are cut back or removed and the ends of the rails making up the pallet are bevelled so that bottom corners 24' of the pallet are bevelled. The worker then activates lifting apparatus 21 of lift truck 20 with the lifting end 12 of tire-stacking device 10 attached thereto via adapter 19. As the lifting end 12 of tire-stacking device 10 is lifted off the ground, base end 13 of the tire-stacking device moves toward the lift truck 20 on wheels 17, as shown by the arrows in FIG. 2. In order to get tire-stacking device 10 into its vertical position, the lifting apparatus of the lift truck must have a vertical lift height greater than the length of the tire-stacking device. FIG. 3 shows tire-stacking device 10 in its vertical position with a plurality of stacked tires 25 supported thereon. The worker can then simply drive the lift truck to any location to deposit the new stack of tires 25.

In order to deposit the stack of tires 25, the lifting apparatus is lowered until pallet 24 contacts the ground. The lift truck is then backed away from the pallet and the new stack of tires 25 is left standing alone with the tire-stacking device 10 remaining attached to the lift truck 20. Thus, the tire-stacking device enables a single person with the aid of a lift truck to stack a plurality of tires on a pallet without requiring significant amounts of lifting on the worker's part.

Figure 4:
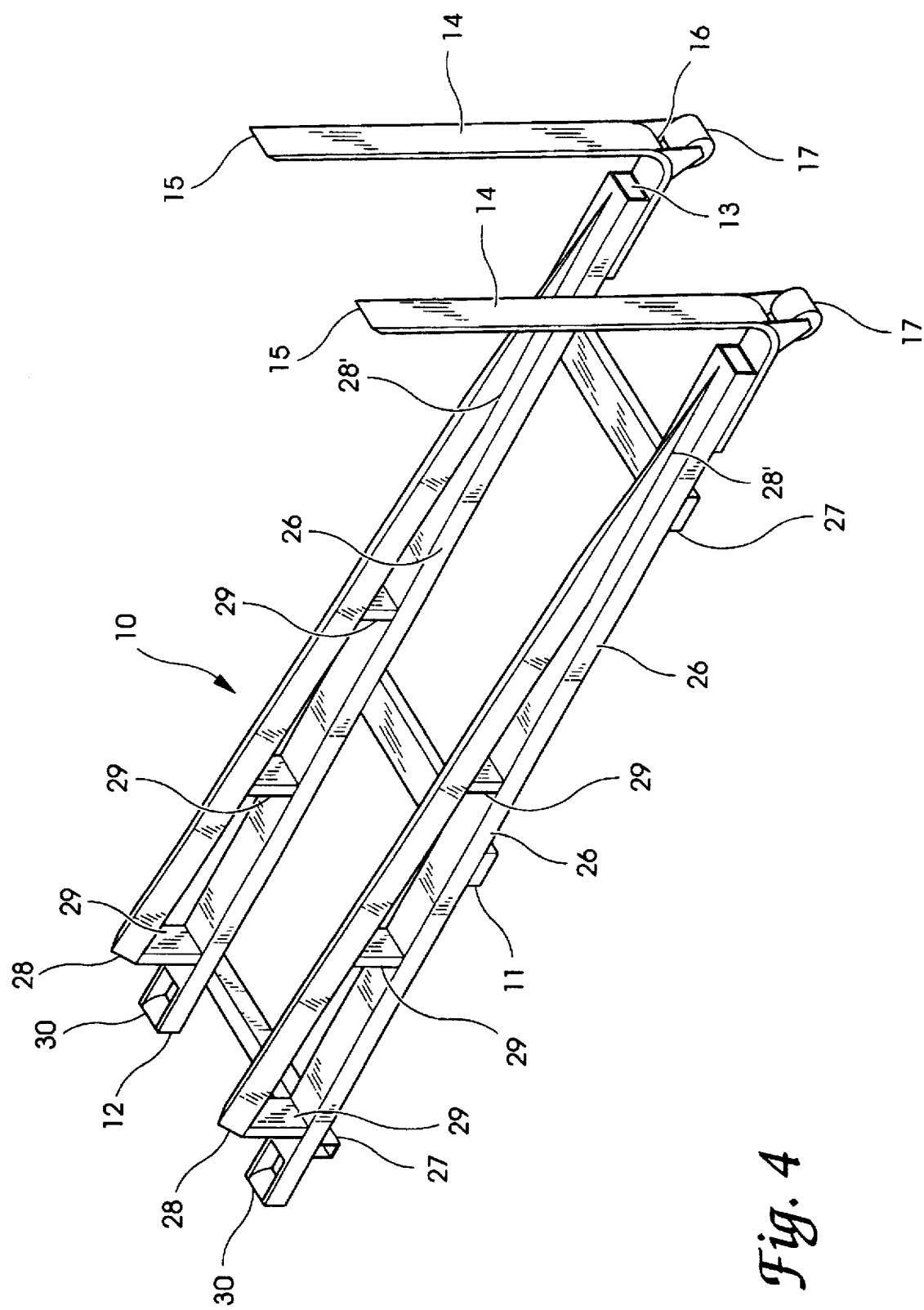
FIG. 4 is an isometric view of a tire-stacking device.

FIG. 4 shows in greater detail the various components which go into making up tire-stacking device 10. In particular, frame 11 includes a pair of elongated metallic rails 26 that are rigidly interconnected by a plurality of bracing members 27 along its length. A pair of spaced apart angle irons or support rails 28 are fixedly supported on the top of rails 26 via a plurality of vertical support members 29 fixed to and extending therebetween. Angle irons 28 act as a platform for the tires when the device is in its horizontal position. Vertical support members 29 and angle irons 28 are arranged such that the platform gently slopes downward toward the base end 13 of frame 11. A pair of cross members 30 are attached to the lifting end 12 of rails 26. Lateral support is provided by a pair of lifting forks 14 which are fixedly attached one each to the base end 13 of rails 26. Forks 14 extend substantially perpendicular to rails 26 but form a slightly acute angle with angle irons 28. A pair of wheels 17 are rotatably mounted to the root end 16 of each of the forks 14 and serve as a support for the base end of the tire-stacking device. The various components making up the frame including the rails 26 and 28, the members 29, cross members 30 and bracing members 27 as well as the forks 14 are preferably made from metal and welded together.

FIG. 5 shows a detailed front view of adapter 19 which is attached to the lifting apparatus of the lift truck to enable the lift truck to lift the tire-stacking device of FIG. 4. Adapter 19 includes a pair of vertically disposed I-beam members 41 which are fixedly connected together via cross braces 42 and 43. A pair of spring-biased pins 46 extend through the front portion of I-beam members 41 such that each pin 46 includes a protrusion 47 which enables the adapter to be attached to the lifting apparatus of the lift truck. Pins 46 are biased via springs 48 so that the protrusions 47 extend oppositely and outboard of adapter 19. Pins 46 are arranged in size to mate to the lifting apparatus of a lift truck via protrusions 47. A pair of hook members 18 are fixedly attached to cross member 43 in a spaced apart relation that corresponds to the distance apart of cross members 30 on the lifting end 12 of the tire-stacking device 10 (see FIG. 4). Directly above hooks 18 are retaining members 44 which are attached to cross brace 42 and serve to help prevent the cross members 30 from inadvertently escaping from hooks 45 while the stack of tires is being lifted, transported and/or deposited by the lift truck. FIG. 6 shows in side view the preferred shape of retainer 44 and hooks 45.

FIGS. 7-9 illustrate an alternative tire-stacking device that utilizes a clamping mechanism 50 in place of the forks 14 of the embodiment discussed earlier. Like the embodiment discussed earlier, tire-stacking device 110 includes a frame 11 which is made up of a pair of elongated rails 26 held together by a plurality of cross support members 27. Angle irons 28, which act as a platform for the tires, are then supported above rails 26 via a plurality of vertical support members 29. Like the embodiment discussed earlier, angle irons 28 are arranged in a slight sloping pattern which has been found to better facilitate the use of the device. Also like the device discussed earlier, tire-stacking device 110 includes a pair of cross members 30 which are attached to the lifting end 12 of frame 11 in a spaced apart relation in order to correspond to hooks 45 on adapter 19 which is shown in FIGS. 5 and 6. Tire-stacking device 110 also includes a pair of wheels 17 which are rotatably mounted adjacent base end 13 of the device.

As best seen in FIGS. 8 and 9, clamping arrangement 50 includes a pair of grasping arms 51 which each pivot about a pivot pin 55, which pins are attached to frame 11. Arms 51 are interconnected by a pressure plate 56 via a pin and slot arrangement 57. Compression spring 58 is disposed between cross member 54 and pressure plate 56 in such a way that arms 51 are biased into an open position as shown in FIG. 8. The weight of a tire placed on pressure plate 56 acts in the direction of arrow 53 which causes spring 58 to compress and arms 51 to swing closed into their closed position as shown in FIG. 9. Arms 51 each include a lateral support portion 56 which serves to support the stack of tires when the tire-stacking device 110 is in its vertical position.

Tire-stacking device 110 is used in a manner similar to the device discussed earlier except no wooden pallet is required when clamping arrangement 50 is used in place of forks 14 of the previous embodiment. Instead, the first tire is merely placed adjacent the base end 13 of the tire-stacking device to activate the clamping arrangement 50 in order to hold the first tire in place. The remaining tires are arranged in a side-by-side relation to the first tire as in the embodiment discussed earlier. Next, the lift truck is connected to the lifting end 12 of the tire-stacking device via adapter 19 as discussed earlier. The stack of tires are then hoisted into a vertical position as shown in FIGS. 1-3. The stack of tires can then be moved to any location using the lift truck. After arriving at the desired location, the worker lowers the lifting apparatus of the lift truck sufficient that the first tire begins to come in contact with the ground or with a pallet. As the first tire comes in contact with the ground, the weight of the stack of tires no longer acts against the arms to hold them in gripping relation whereupon compression spring 58 causes the arms to once again swing open to their open position as shown in FIG. 8 thus releasing the stack of tires from the tire-stacking device 110.

The tire-stacking device of the present invention can also be used in cooperative arrangement with a lift truck in order to move previously stacked tires to a new location. When using the tire-stacking device to simply move stacks of tires, the worker merely connects the tire-stacking device to the lifting apparatus of the lift truck and raises the tire-stacking device into its vertical position as shown in FIG. 3. However, unlike what is shown in FIG. 3, there would be no stack of tires 25 or pallet 24 being carried by the tire-stacking device. The operator then drives the lift truck to approach a stack of tires with the lateral support structure of the tire-stacking device extending in front of the lift truck.

It should be noted that the rod 9 shown in FIGS. 1-3 which protrudes away from tire-stacking device adjacent lifting end 12 provides a fork truck operator with a visual guide so that he can estimate approximately where the hooks 18 are because the same is normally hidden from his view. Utilizing the visual guide 9, the fork truck operator then positions the hooks 18 to engage the cross members 30.

If the stack of tires is on top of a pallet, the fork truck operator positions the forks 14 as discussed earlier in the pallet under the stack of tires. In the case of the clamping arrangement 50 shown with respect to tire-stacking device 110, the fork truck operator approaches the stack of tires until the bottom tire depresses pressure plate 53 thus activating the clamping arrangement 50 to clamp around the base tire of the stack of tires.

The lift truck operator then activates the lifting apparatus to raise the stack of tires which are then supported by the lateral support structure of the tire-stacking device. Next, the lift truck is driven to a new location and the lifting apparatus is activated to lower the stack of tires until the tires are no longer supported by the lateral support structure. Finally, the lift truck is backed away from the stack of tires to leave the tires at the new location.

FIG. 10 shows an improved tire-stacking device 210 according to another embodiment of the present invention. The tire-stacking device is built around a frame 211 having a base end 212 and a lifting end 214 analogous to the embodiments discussed earlier. A pair of rollers 213 are attached adjacent the base end and rotatably support the device when being lifted from its horizontal position to a vertical position, as illustrated in FIGS. 1-3. Device 210 includes a pair of roller rails 217 in place of the angle irons 28 discussed with respect to the earlier embodiments. These rollers allow the stack of tires to settle when the device is lifted from its horizontal position to its vertical position. As in the embodiments discussed earlier, roller rails 217 serve as a platform upon which the tires can be arranged in side-by-side relation before the device is lifted to its upright vertical position.

An arcuate-shaped lifting bar 215 is attached to the lifting end 214 of frame 211 via an adjustable bracket 224. Bracket 224 and bolts 225 enable the arcuate-shaped lifting bar to have its height above the ground adjusted to accommodate different hook assemblies and lift trucks. Arcuate-shaped lifting bar 215 enables a single hook to lift tire-stacking device 210 instead of the dual hook design of the embodiments shown in FIGS. 1-9.

Tire-stacking device 210 also includes a clamping arrangement 218 which is similar to the clamping arrangement shown and described with respect to FIGS. 8 and 9, except that clamping arrangement 218 includes tension springs 219 which bias arms 221 toward one another. Thus, clamping arrangement 218 is virtually identical to the clamping arrangement described earlier except that the arms 221 are biased inward as opposed to outward as shown in FIG. 8. Like the embodiment described earlier, clamping arrangement 218 provides a lateral support structure for supporting the stack of tires when the device is in its vertical upright position. In particular, support surfaces 216, which are mounted on each arm, support the base tire in a stack of tires in a manner similar to that illustrated in FIG. 9. A roller 220 is mounted on the free end of each arm 221 and serves as a means for spreading the arms apart when the tire-stacking device approaches a stack of tires to be lifted. In other words, rollers 220 ride along the treads of the base tire in a stack of tires causing the arms 221 to spread apart as support surfaces 216 slip underneath the base tire. Tire-stacking device 210 also includes a pair of latch members 222 that are mounted on either side of frame 211 above clamping arrangement 218. Latch members 222, which are discussed infra, serve to prevent base end 212 of the tire-stacking device from swinging away from the lift truck when the device 210 is in its vertical position and the lift truck is removing the device 210 from a stack of tires.

Figure 11:
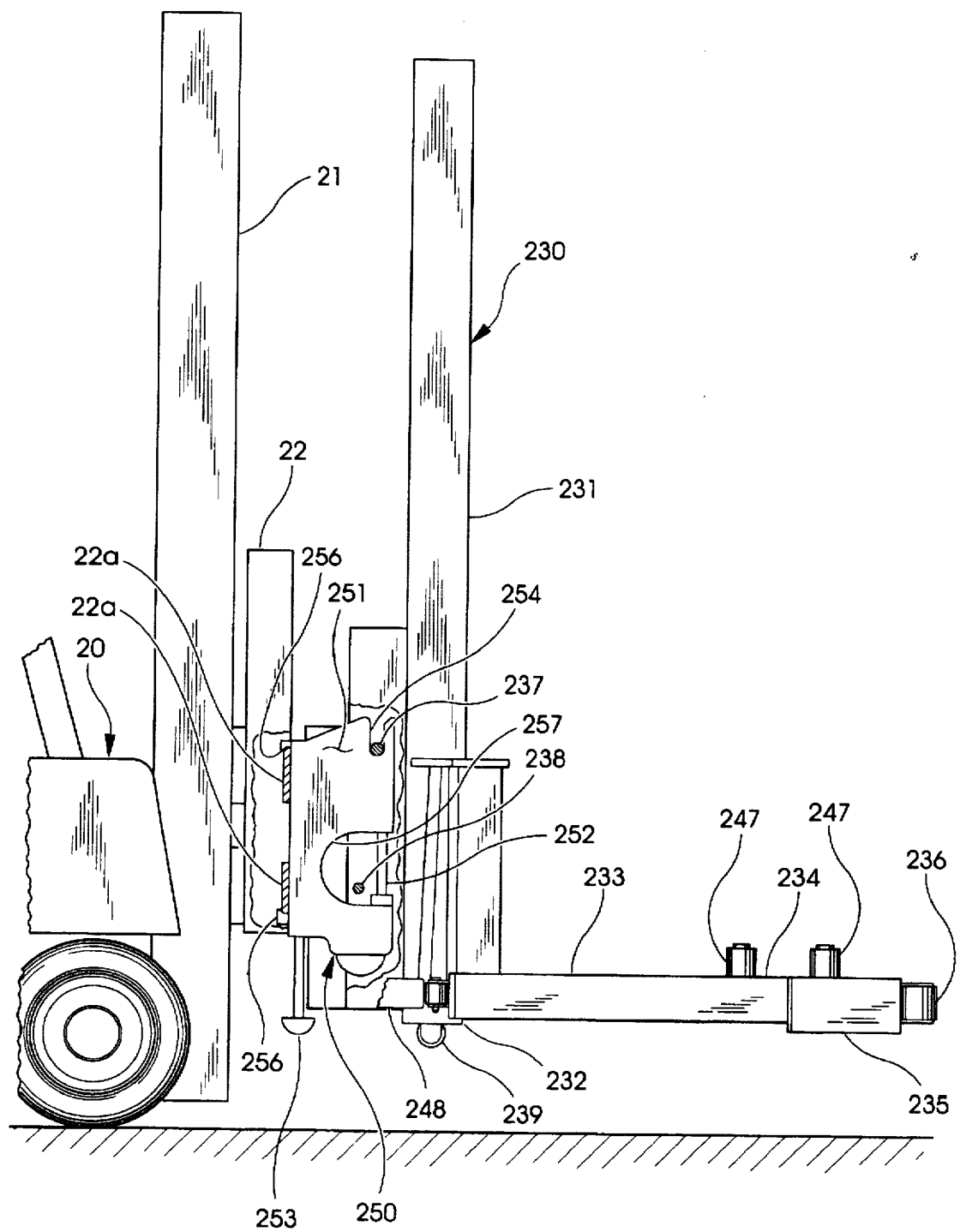
FIG. 11 is a partial side elevational view of a tire-transporting device according to another embodiment of the present invention attached to the lifting apparatus of a lift truck.
Figure 12:
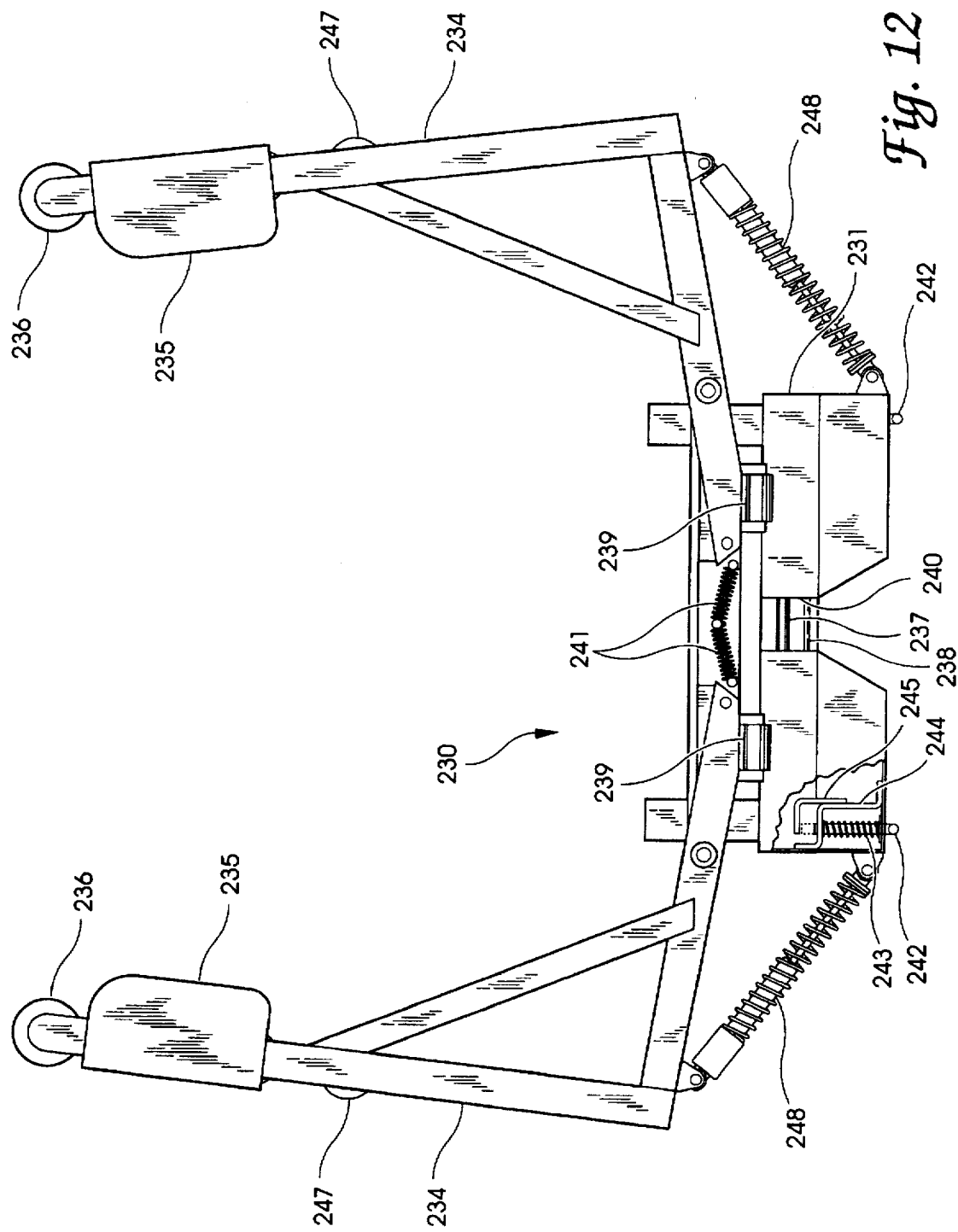
FIG. 12 is a bottom view of the tire-transporting device shown in FIG. 11.

Referring now to FIGS. 11 and 12, a tire-transporting device 230 according to another embodiment of the present invention is shown lifted just above the ground by a lift truck 20. Unlike the tire-stacking devices described earlier, transporting device 230 is always maintained in an upright position as shown and is used only for moving stacks of tires from one place to another. Transporting device 230 includes a clamping arrangement 233 that is substantially identical to the clamping arrangement 218 of tire-stacking device 210 previously described. However, unlike the clamping arrangement described earlier, the transporting device includes a pair of ordinary automotive shock absorbers that serve essentially as compression springs to strengthen the inward bias of arms 234. This added feature better enables device 230 to approach and clamp onto a stack of tires. Clamping arrangement 233 is also different from the embodiments discussed earlier in that it includes the addition of guide rollers 247 mounted on each of the arms 234. Rollers 247 better enable device 230 to back away from a stack of tires without dragging the stack due to the added bias of shock absorbers 248. Clamping arrangement 233 is attached to a relatively short vertical frame 231 that enables lift truck 20, to move a stack of tires through low clearance areas. In other words, the relatively short vertical frame 231 combined with a relatively short mast 21 of lift truck 20 enables one to move a stack of tires through doorways as well as in and out of trucks. Movement of stacks of tires through low-clearance areas would be substantially impossible with the relatively longer tire-stacking devices previously described.

Figure 17:
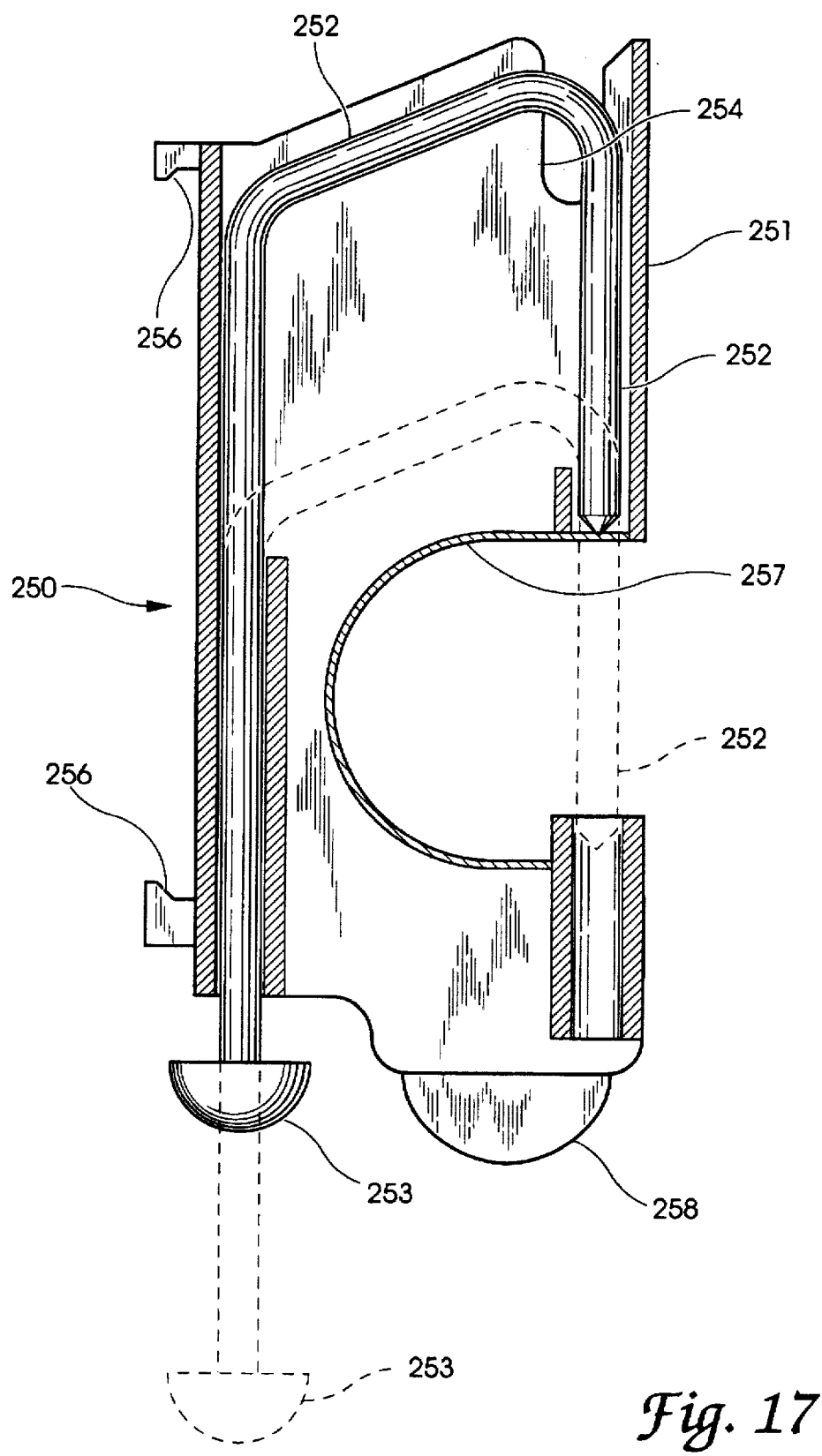
FIG. 17 is a fully sectioned side elevational view of a hooking assembly according to one aspect of the present invention.

Transporting device 230 is connected to the lifting apparatus 22 of the lift truck 20 via a hook assembly 250 (see FIG. 17). Hook assembly 250 includes a pair of mounting flanges 256 that enable the assembly to be attached to the front of lifting apparatus 22 via a pair of cross plates 22a. The weight of transporting device 230 is supported by hook 254 via a lifting pin 237 that is mounted in the lower portion of vertical frame 231 in a channel 240 as best seen in FIG. 12. The transporting device also includes a base pin 238 that is also mounted within channel 240. Base pin 238 becomes trapped within cavity 257 of hook assembly 250 when pill 252 drops to its closed position. By being trapped within cavity 257, base pin 238 acts as a backup hook that prevents transporter device 230 from becoming accidentally disconnected from the lift truck in the event that lifting pin 237 fails.

When standing alone unhooked from a lift truck, transporting device 230 is supported by a pair of rollers 239 and the underside of support surfaces 235. When hooked to a lift truck, the rear side of vertical frame 231 is held slightly away from the front face of the lifting truck by spring-loaded upright bars 242. Upright bars 242 are biased outward by compression springs 243, which are attached to frame 231 via mounting bracket 244. Channel guides 245 are also mounted within vertical frame 231 and enable upright bars 243 to slide from an extended position as shown to a position flush with the back surface of frame 231. When approaching a stack of tires to be lifted, the rollers 236 and rollers 247 mounted along free ends of arms 234 ride against the tread of the base tire to spread the arms apart. Thus, arms 234 are spread apart against the action of tension springs 241 and shock absorbers 248, which normally maintain the arms biased toward one another as shown in FIG. 12. The base tire in a stack of tires is supported by support surfaces 235 as in the tire-stacking devices previously described.

Referring now to FIGS. 13-17, the unique structure of hook assembly 250 enables it to be used interchangeably with tire-stacking device 210 and tire-transporting device 230. In fact, the sliding pin action of hook assembly 250 enables a lift truck operator to connect and disconnect the lifting apparatus 22 of a lift truck to both the tire-stacking device 210 and the transporting device 230 without ever having to step off of the lift truck. Sliding pin 252 is capable of moving between a retracted position and a closed position as shown in shadow in FIG. 17. Normally, the weight of sliding pin 252 maintains it in its closed or locked position. However, when the lifting apparatus of the lift truck is lowered near the ground, push knob 253 comes in contact with the ground and causes sliding pin 252 to retract to it's open position. A plastic knob 258 is attached to the underside of housing 251 and slides along the ground when the lift truck is being connected or disconnected from either the stacking device 210 or the transporting device 230. Housing 251 includes a pair of mounting flanges 256 which enable hook assembly 250 to be attached to the lifting apparatus of a lift truck.

Figure 13:
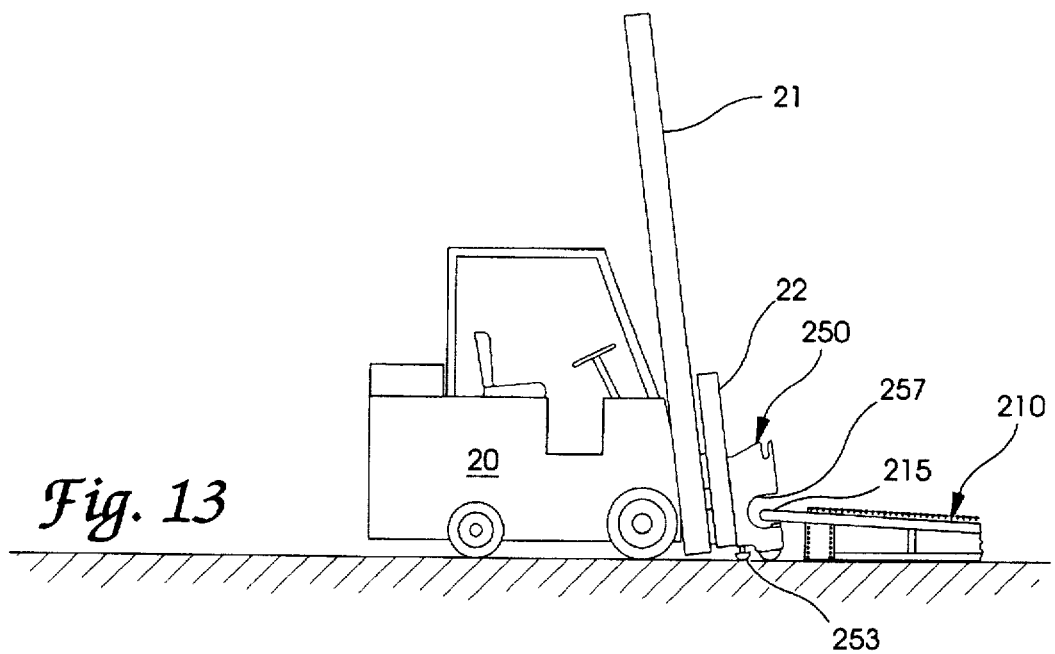
FIG. 13 is a side elevational view of a lift truck being unhooked from the tire-stacking device of FIG. 10.
Figure 14:
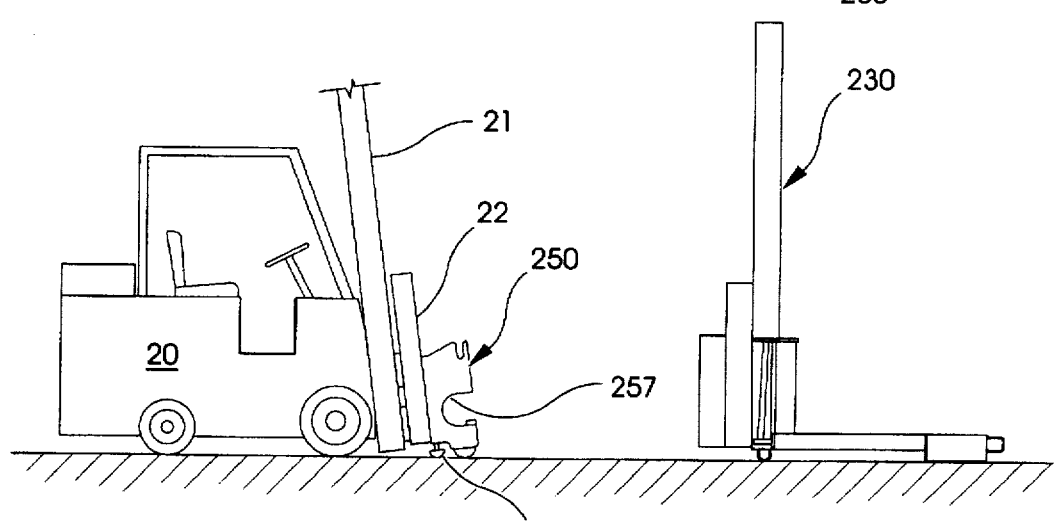
FIG. 14 is a side elevational view of the lift truck of FIG. 13 approaching the tire-transporting device of FIGS. 11 and 12.

Because sliding pin 252 of hook assembly 250 naturally slides to its closed position when the assembly is lifted above the ground, tire-stacking device 210 can only be connected and disconnected from the lift truck 20 when the device is in its horizontal position as shown in FIG. 13. When hooking up to the tire-stacking device, the lift truck operator lowers the lifting apparatus 22 until plastic knob 258 of hook assembly 250 contacts the ground so that push knob 253 has moved sliding pin 252 to its retracted position. Depending upon the particular lift truck being used, the operator may also have to slant the mast 21 in order to get pin 252 sufficiently retracted to unhook from the tire-stacking device 210. The lift truck operator then drives the lift truck forward until arcuate-shaped lifting bar 215 is received within cavity 257 of hook assembly 250. The operator then places a plurality of tires on tire-stacking device 210 and lifts the stack into its vertical upright position as illustrated in FIGS. 1-3. The operator then moves the stack of tires to a desired location and deposits them there by lowering the lifting apparatus until the base tire of the stack is no longer supported by the support surfaces 216 (FIG. 10) of the clamping arrangement 218. The lift truck operator the backs away from the stack of tires with the tire-stacking device still in its upright position.

Figure 15:
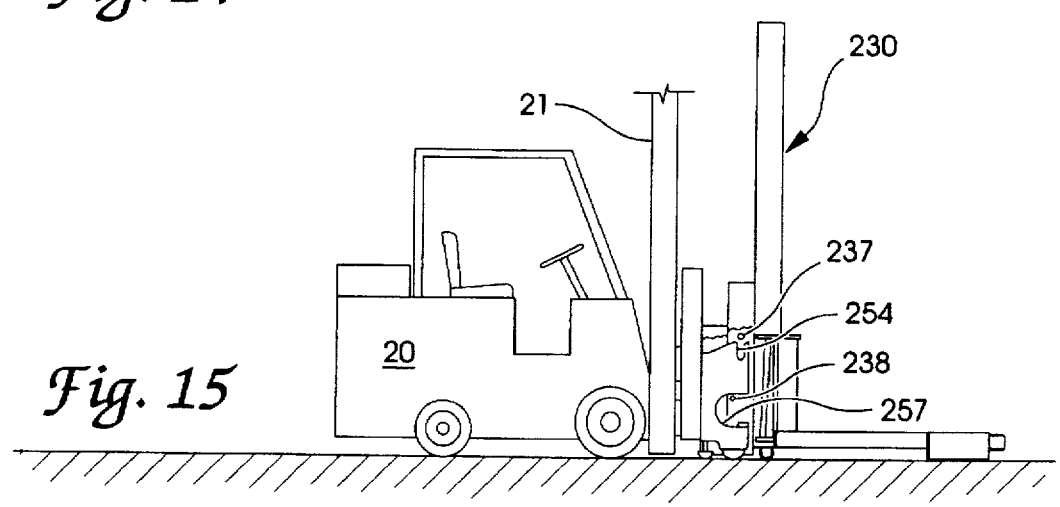
FIG. 15 is a side elevational view of the lift truck of FIG. 14 hooking up to the tire-transporting device of FIGS. 11–12.

The operator can then disconnect from the tire-stacking device 210 by lowering it into its horizontal position so that the sliding pin of the hook assembly 250 is moved to its retracted position and arcuate-shaped lifting bar 215 can be withdrawn from cavity 257. With the lift truck 20, lifting apparatus 22 and the tire-stacking device in the configuration shown in FIG. 14, the lift truck operator then simply backs away from tire-stacking device 210. If the lift truck operator then desires to connect the lift truck 20 to a tire transporting device 230, he approaches the device with the lifting apparatus 20 and the hook assembly 250 in the configuration shown in FIG. 15. The operator then advances the lift truck forward until hook assembly 250 is received within channel 240 (FIG. 12) so that hook 254 is positioned underneath lifting pin 237 of tire transporter 230. At the same time, base pin 238 is received within cavity 257 as shown in FIG. 15. The connection is completed by raising the lifting apparatus of the lift truck sufficiently that lifting pin 237 is received within hook 254 and sliding pin 252 of hook assembly 250 has dropped sufficiently to trap base pin 28 within cavity 257.

Figure 16:
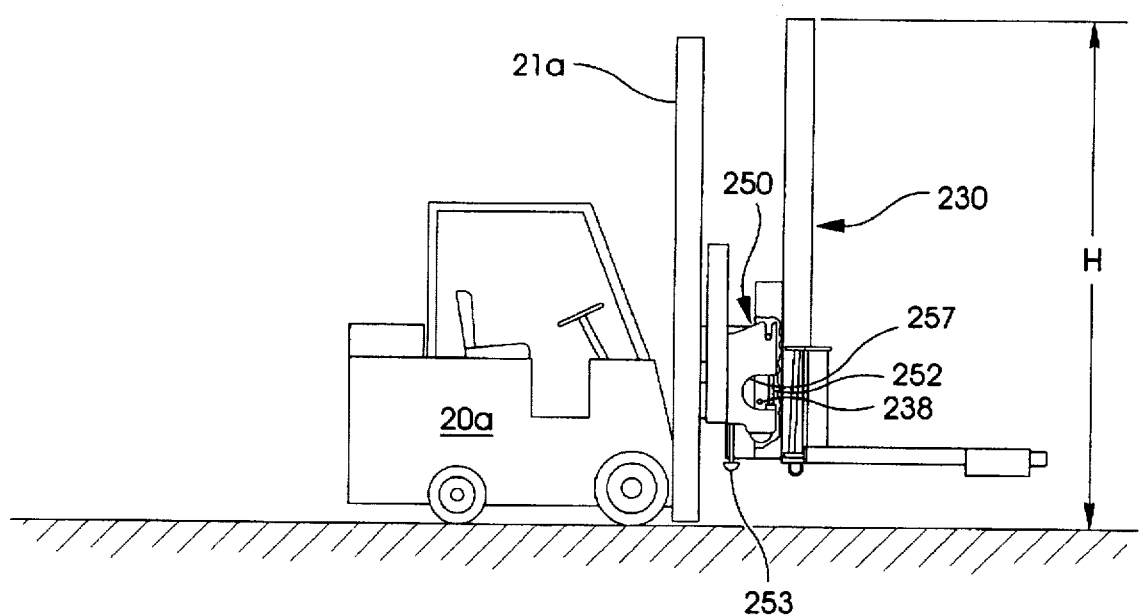
FIG. 16 is a side elevational view of a lift truck having a shortened mast attached to the tire-transporting device of FIGS. 11 and 12.

The operator then approaches a stack of tires with support surfaces 235 (FIG. 12) sliding under the base tire to support the stack. When using a lift truck 20a having a relatively short mast 21a as shown in FIG. 16, the lift truck operator can utilize the tire-transporting device 230 to move stacks of tires in and out of low-clearance areas such as through doorways, as well as in and out of trucks. When depositing a stack of tires, the operator lowers the stack until the base tire is no longer supported by the support surfaces 235 (FIG. 12), and then backs away from the stack of tires.

Figure 18:
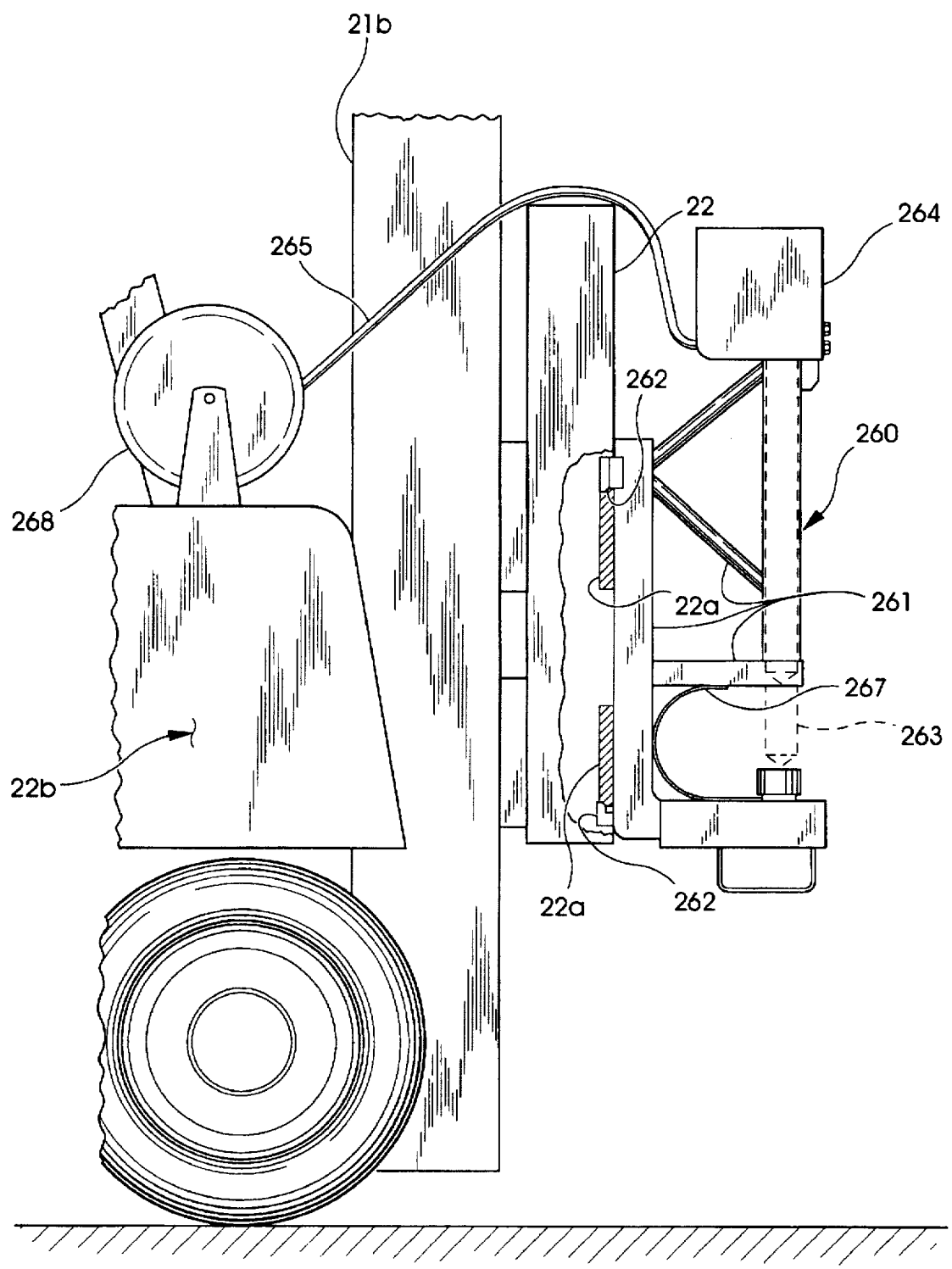
FIG. 18 is a partial side elevational view of a lift truck having an alternative hook assembly attached thereto according to another aspect of the present invention.

Referring now to FIG. 18, an alternative hook assembly 260 is shown attached to the front of the lifting apparatus 22 of a lift truck in the same way described earlier with respect to hook assembly 250. In other words, hook assembly 260 includes a pair of mounting flanges 262 which grip a pair of cross plates 22a mounted across the face of lifting apparatus 22. Because of the configuration of hook assembly 260, it is only useful in cooperation with tire-stacking device 210 and is incapable of connecting to tire-transporting device 230. Hook assembly 260 includes a framework 261 upon which an electronic worm gear 264 is mounted. Electronic worm gear 264 is connected to a pin 263, that may be retracted and advanced in order to open and close access to cavity 267, which is analogous to cavity 257 described with respect to hook assembly 250. Power is delivered to electronic worm gear 264 via a power cord 265 that is retracted and paid out from reel 268 that in turn is mounted on the fender of lift truck 22b. Reel 268 automatically takes up any slack in power cord 265. As the lifting apparatus 22 of the lift truck 22b is raised and lowered, power cord 265 is retracted and paid out of reel 268 as needed. Power is delivered to power cord 265 from on board power supplied by the lift truck. A switch (not shown) is mounted in the cab of the lift truck and allows the operator to raise and lower pin 263 to open and close access to cavity 267.

When using tire-stacking device 210, it is sometimes difficult to back away from a stack of tires without having the base end 212 (FIG. 10) swing away from the lift truck. In order to alleviate this problem and otherwise prevent the tire-stacking device from swinging away from the lift truck when in its upright position as shown in FIG. 22, three different latching mechanism components have been devised. The first component is described in relationship to FIGS. 19 and 20, the second component is illustrated and described with reference to FIGS. 10 and 21, and the third is described in relation to FIGS. 23–25.

Figure 19:
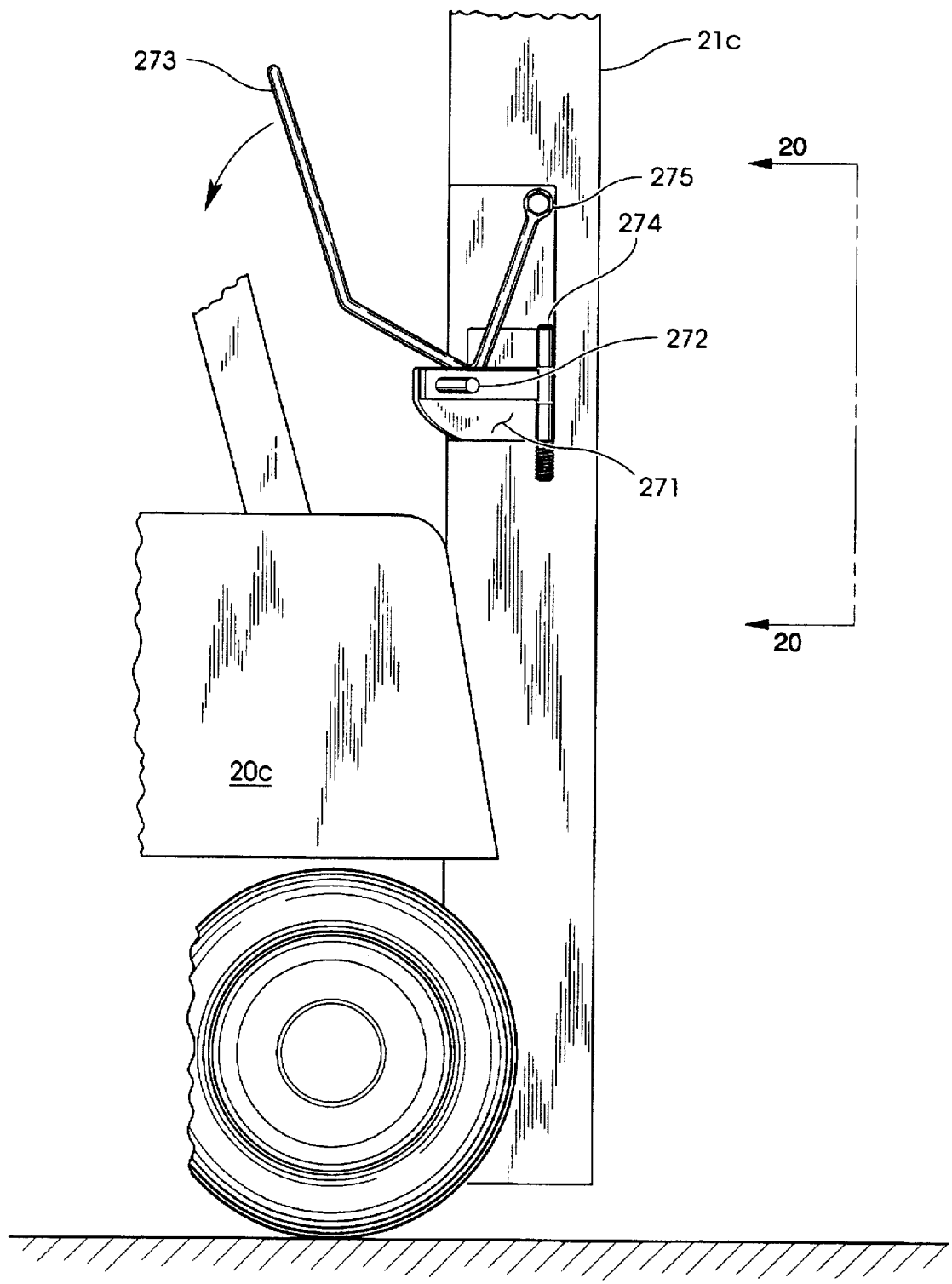
FIG. 19 is a partial side elevational view of a lift truck having a component assembly attached thereto for preventing a tire-stacking device from swinging away from the lift truck according to still another aspect of the present invention.
Figure 20:
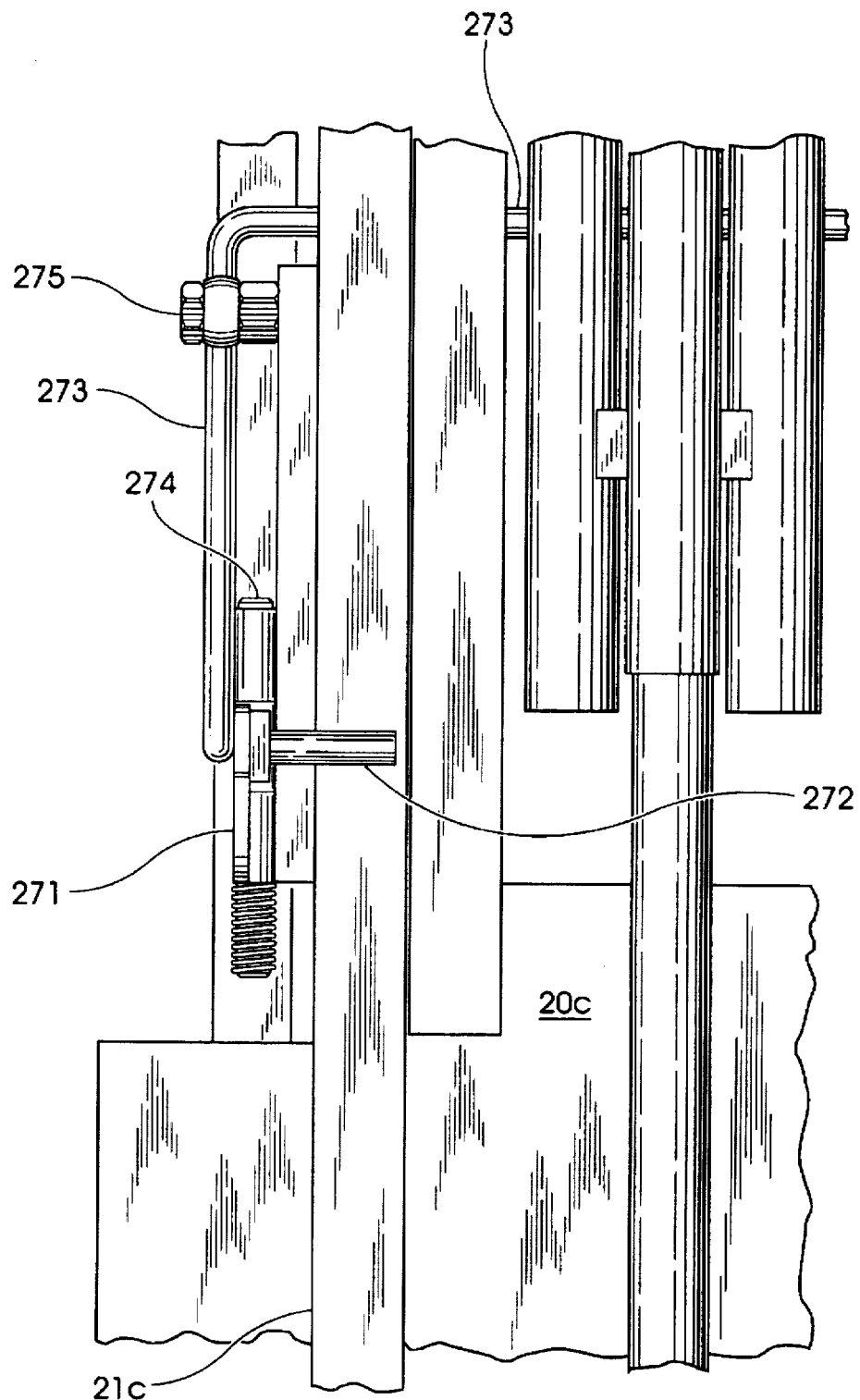
FIG. 20 is a partial front elevational view of the lift truck in FIG. 19 looking in the direction of arrows 20—20 after the component assembly has been moved to its locked position.

FIGS. 19 and 20 show the first latching component attached to the mast 21c of a lift truck 20c. The first component includes a push/pull bar 273 that is pivotably mounted to mast 21c on mounting bolts 275. A wing 271 is pivotably mounted on a hinge 274 below mounting bolt 275. Hinge 274 is spring-biased to normally maintain wing 271 in its retracted position as shown in FIG. 19. However, when push/pull bar 273 is rotated counterclockwise around mounting bolt 275, it forces wing 271 to swing around to its locked position as shown in FIG. 20. In the locked position, pin 272, which is attached to wing 271, traps a portion of the frame of the tire-stacking device against mast 21c of the lift truck 20c. This configuration is better illustrated in FIG. 22 where pin 272 has trapped a portion of frame 211 against the outer face of mast 21e. Although not shown, a pair of wings are preferably mounted on each side of the mast 21e. In this way, the pair of wings prevent the tire-stacking device from swinging laterally and the pins 272 prevent the tire-stacking device from swinging away from the lift truck when moving or depositing a stack of tires.

Figure 21:
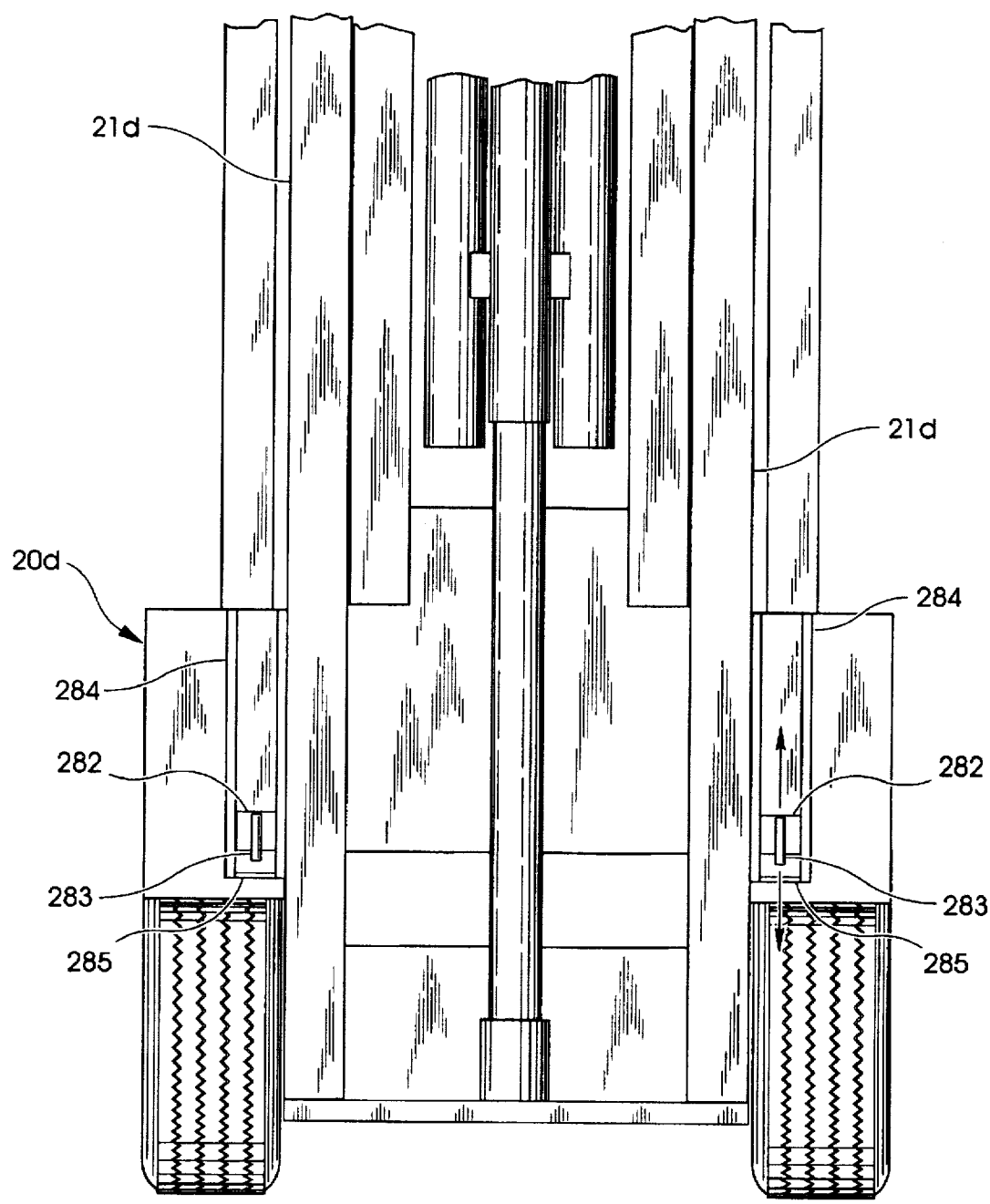
FIG. 21 is a front elevational view of a lift truck having an alternative component assembly for preventing the tire-stacking device from swinging with respect to the lift truck.
Figure 22:
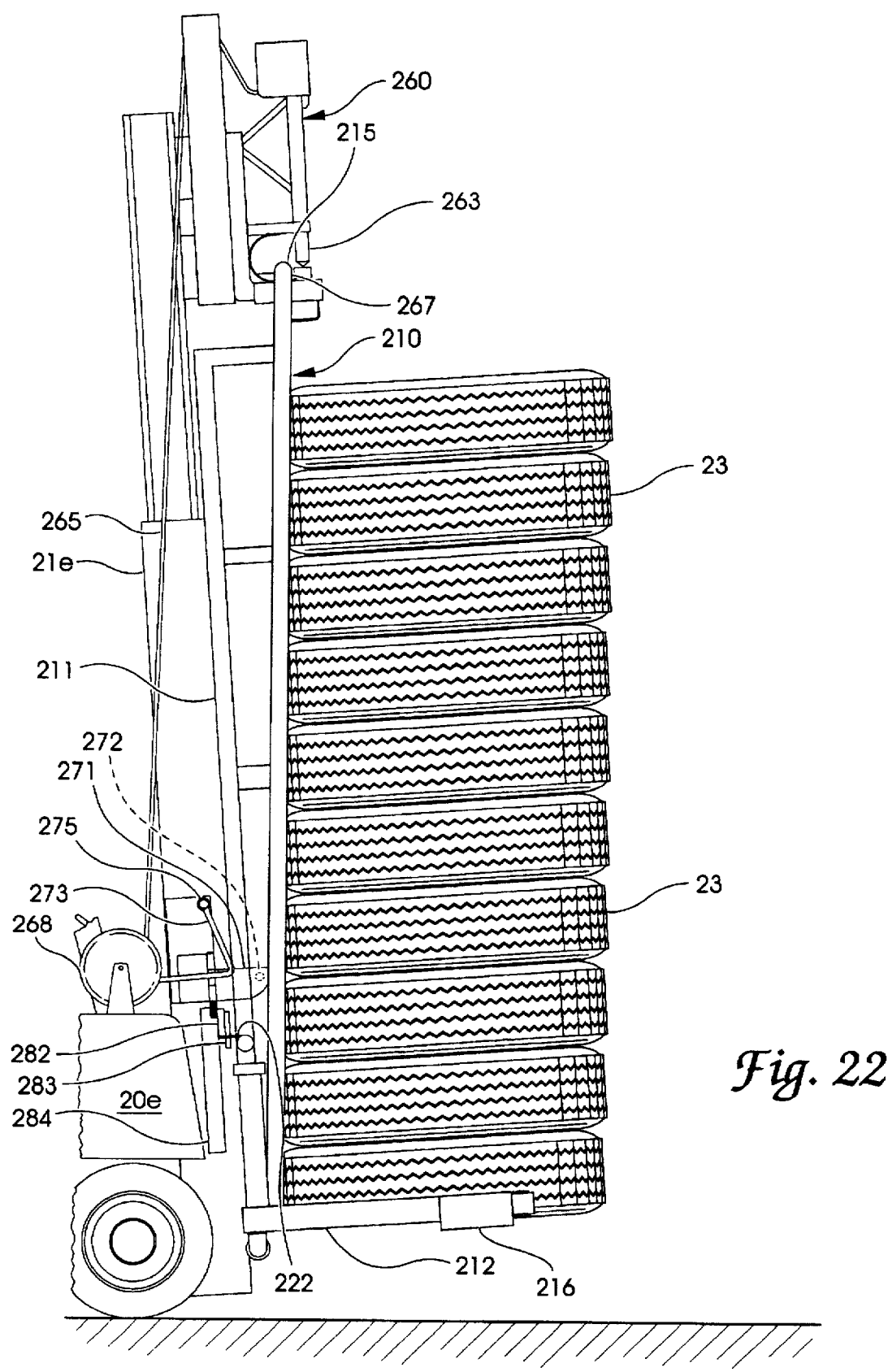
FIG. 22 is a partial side elevational view of a lift truck supporting a stack of tires with a tire-stacking device according to the present invention.

FIG. 21 illustrates a second and different component for preventing the base of the tire-stacking device from swinging with respect to the lift truck. In this alternative aspect of the invention, a pair of channels 284 are mounted on either side of the mast 21d of a lift truck 20d. A metal block 285 is welded to the bottom of channels 284 in order to prevent sliders 282 from escaping through the bottom of the channels. Sliders 282 are otherwise free to slide up and down within channels 284. Each slider has a pin 283 welded thereto as shown in FIG. 21. When tire-stacking device 210 is lifted off the ground while in its vertical position (FIG. 22), bores 223 of latch members 222 (FIG. 10), receive pins 283 as shown in FIG. 22. Thus, the force of gravity maintains the pins within bores 223 of latches 222 when the tire-stacking device is raised and lowered because sliders 282 are able to slide up and down within channels 284. However, blocks 285 are positioned such that latches 222 only engage pins 283 when the tire-stacking device is in its vertical position. In other words, pins 283 remain engaged to latches 222 when the tire-stacking device is lowered in a vertical position into contact with the ground. This allows the operator to back away from a stack of tires without the base of the tire-stacking device swinging away from the lift truck.

The operator can disengage the latches by lowering the tire-stacking device in its vertical position into contact with the ground and then tilting the top of the mast backwards toward the lift truck sufficiently that latches 222 just become disengaged from pins 283. In other words, the tilting of the mast of the lift truck slightly raises pins 283 with respect to latches 222 when the tire-stacking device is in contact with the ground. This means that the operator should have the mast tilted backwards when raising the tire-stacking device from its horizontal position to its vertical position as illustrated in FIGS. 1–3. After the tire-stacking device has been raised to its vertical position, the operator pivots the mast forwardly returning it to its vertical position so that pins 283 just enter bores 223 of latches 222 to hold the base of the tire-stacking device from swinging with respect to the lift truck, even though the tire-stacking device is still in contact with the ground. Although a lift truck would ordinarily be equipped with only one type of swing inhibiting component, FIG. 22 shows both of the previously described components in their latched position holding the base 212 of tire-stacking device 210 against the front face of mast 21e.

It is important that latches 222 be adjustable to accommodate the particular frontal structure of different lift trucks.

Also, it is important to note that latches 222 are mounted upon hinges 228 which enable them to pivot out of the way when the tire-stacking device 210 is lowered into its horizontal position. In other words, latches 222 pivot so that the device is supported by frame 211 instead of the ends of the latches. Hinges 228 are in turn securely attached to mounting plates 229 which include a plurality of mounting bores which provide vertical adjustability. Mounting plates 229 are each secured to one wing of L-shaped adjustment plates 227 which are adjustable laterally on an inverted U-shaped bracket 226. In turn, inverted U-shaped bracket 226 can be slid along frame 211 and mounted at any appropriate location above clamping arrangement 218. Adjustable mounting plates 229, plates 227 and bracket 226 allow latches 222 to be positioned to accommodate the size and structure of most lift trucks. These various brackets are better illustrated in FIG. 23, which shows the third type of anti-swing component.

Figure 23:
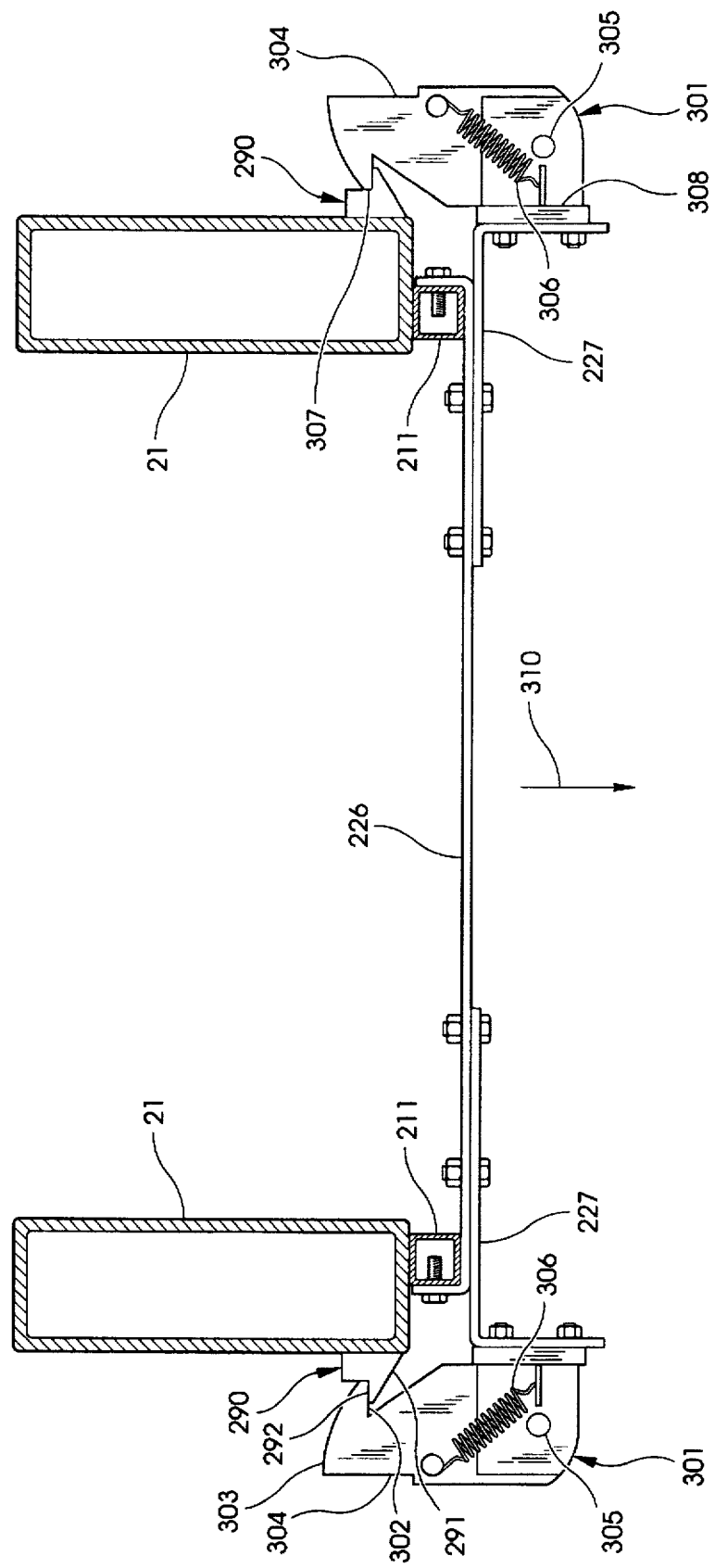
FIG. 23 is a partial sectioned top view of still another alternative component assembly for preventing the tire-stacking device from swinging with respect to the lift truck.

For clarity in illustrating the structure and function of the third component for preventing the base of the tire-stacking device from swinging with respect to the lift truck, FIG. 23 only shows a cross-section of mast 21 for a lift truck. In this alternative, elongated catch pieces 290 are mounted to the sides of mast 21 in place of the channel and slider configuration shown in FIG. 21. In place of latches 222 of the earlier version, a pair of catch hook assemblies 301 are mounted on either side of L-shaped brackets 227. L-shaped brackets are in turn adjustably mounted on inverted U-shaped bracket 226, which is itself attached along the base rail of frame 211 of the tire-stacking device 210 (FIG. 10). The adjustability of the various mounting brackets permits the catch hook assemblies 301 to be attached to the tire-stacking device in a way which can accommodate the mast structure of virtually any lift truck in the same manner as latches 222 just discussed. When properly mounted and adjusted, hook edge 302 of catch assembly 301 rests against catch surface 292 of catch piece 290 to prevent the tire-stacking device (only partially shown) from swinging away from the lift truck along arrow 310. When the tire-stacking device is lifted from its horizontal position to its vertical position as illustrated in FIGS. 1-3, curved edge 303 of catch plate 304 scrapes against lateral ramp surface 291 causing catch plate 304 to pivot around pin 305 against the action of tension spring 306. When the frame 211 finally comes in contact with the mast 21 of the lift truck, catch plate 304 locks in place against catch piece 290 as shown in FIG. 23.

Figure 24:
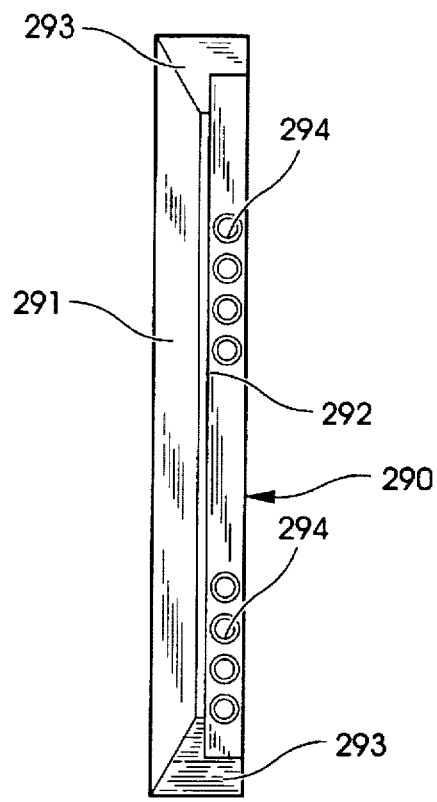
FIG. 24 is a side elevational view of a catch piece for use in the component assembly shown in FIG. 23.

When the tire-stacking device is lifted off the ground in its vertical position, hook edge 302 slides along the length of catch surface 292 (FIG. 24). It is important that catch piece 290 be attached to mast 21 of the lift truck a proper distance above the ground so that the lift truck operator is able to disengage catch hook assembly 301 from catch piece 290 when the tire-stacking device is lowered in its vertical position into contact with the ground and the mast 21 of the lift truck is tilted backwards. Typically, tilting mast 21 can cause relative movement between hook edge 302 and catch surface 292 on the order of ¾ to 1½ inches. Thus, catch piece 290 should be mounted such that end edge 307 of catch plate 304 slides below catch surface 292 onto or below end ramp 293 when the mast is tilted backward. In this way, the slight relative movement caused by tilting the mast is sufficient to disengage hook edge 302 from catch surface 292, thus enabling the lift truck operator to lower the tire-stacking device from its vertical position to a horizontal position. This disengagement in turn allows the operator to completely disengage the lift truck from the tire-stacking device 210 as shown in FIG. 13. Hook edge 302 automatically slides up end ramp 293 into contact with catch surface 292 when the tire-stacking device is lifted off the ground. Likewise, hook edge 302 automatically rehooks itself with catch surface 292 when the tire-stacking device is lowered from a position above catch piece 290.

Figure 25:
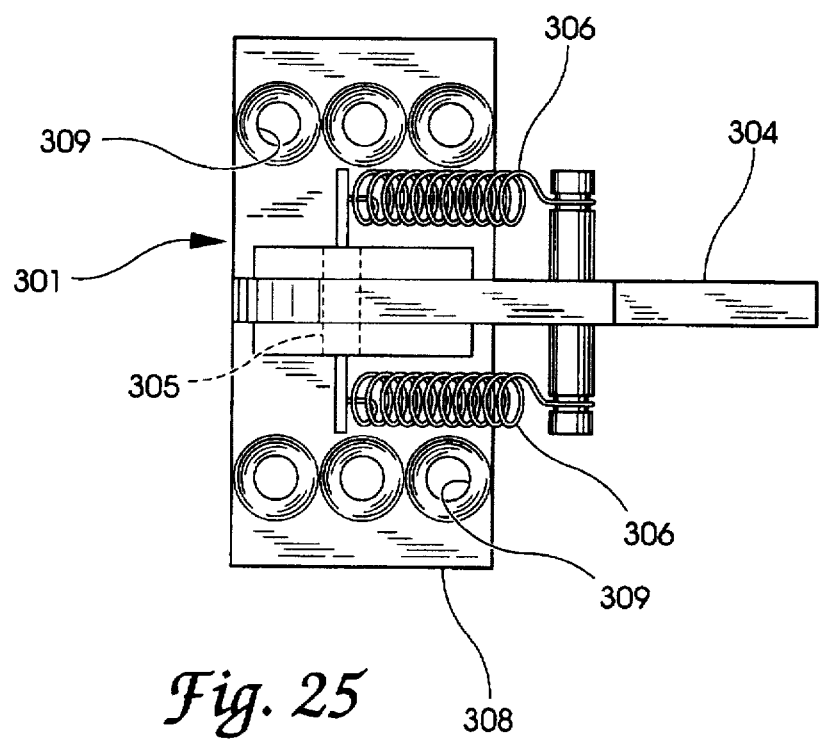
FIG. 25 is a side elevational view of a catch hook for use in the component assembly of FIG. 23.

Referring to FIG. 25, catch hook assembly 301 is secured to one side of a mounting plate 308 having a plurality of mounting bores 309 similar to the mounting plate 229 of latches 222 discussed earlier. The plurality of mounting bores 309 allow the catch hook assembly 301 to be adjustably mounted to the L-shaped brackets 227 to accommodate the particular structure of the tire-stacking device and lift truck. Catch plate 304 is pivotally mounted between a pair of upstanding side walls on pivot pin 305. Tension springs 306, which are mounted on the other side of catch plate 304, normally maintain the catch plate in the position shown in FIG. 23. However, when the tire-stacking device is in a horizontal position as shown in FIG. 10, the pivoting feature of catch hook assemblies 301 allows the pivot plates to pivot off to the side so that the weight of the tire-stacking device is supported by frame 211 rather than the curved edges 303 of the catch plates. This pivoting feature of catch hook assemblies 301 also facilitates the automatic latching of hook edge 302 with catch surface 292 as discussed previously. It should be pointed out that catch piece 290 is provided with a plurality of mounting bores 294 so that the catch piece can be remounted and calibrated as tire wear on the lift truck changes the functional relationship between catch piece 290 and catch hook assemblies 301. Any mounting bores 294 that are not in use, are normally plugged so that end edge 307 of catch plate 304 does not become snagged when the tire-stacking device is raised and lowered with respect to the ground when in its vertical position.

Figure 26:
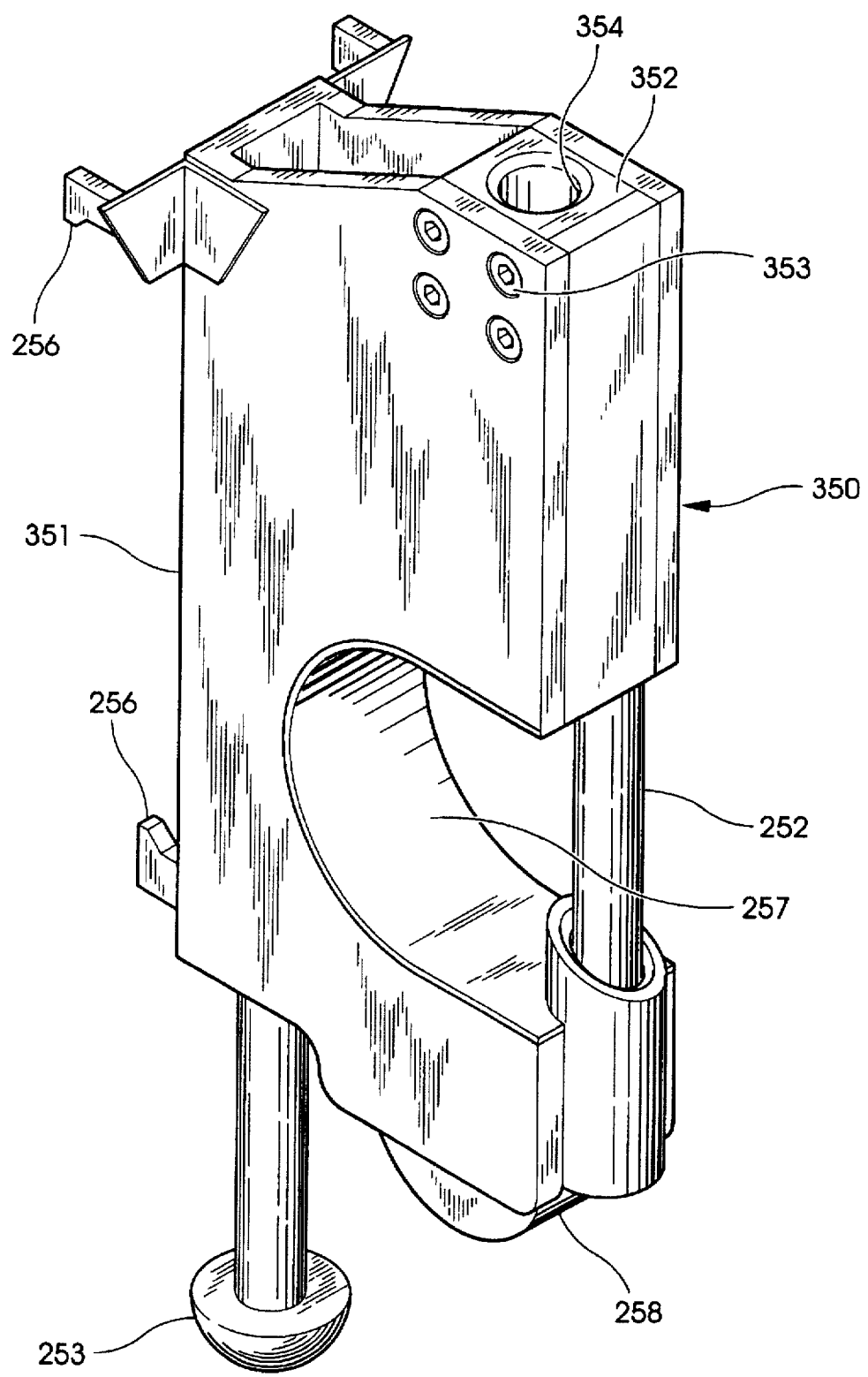
FIG. 26 is an isometric view of an alternative hooking assembly according to one aspect of the present invention.
Figure 27:
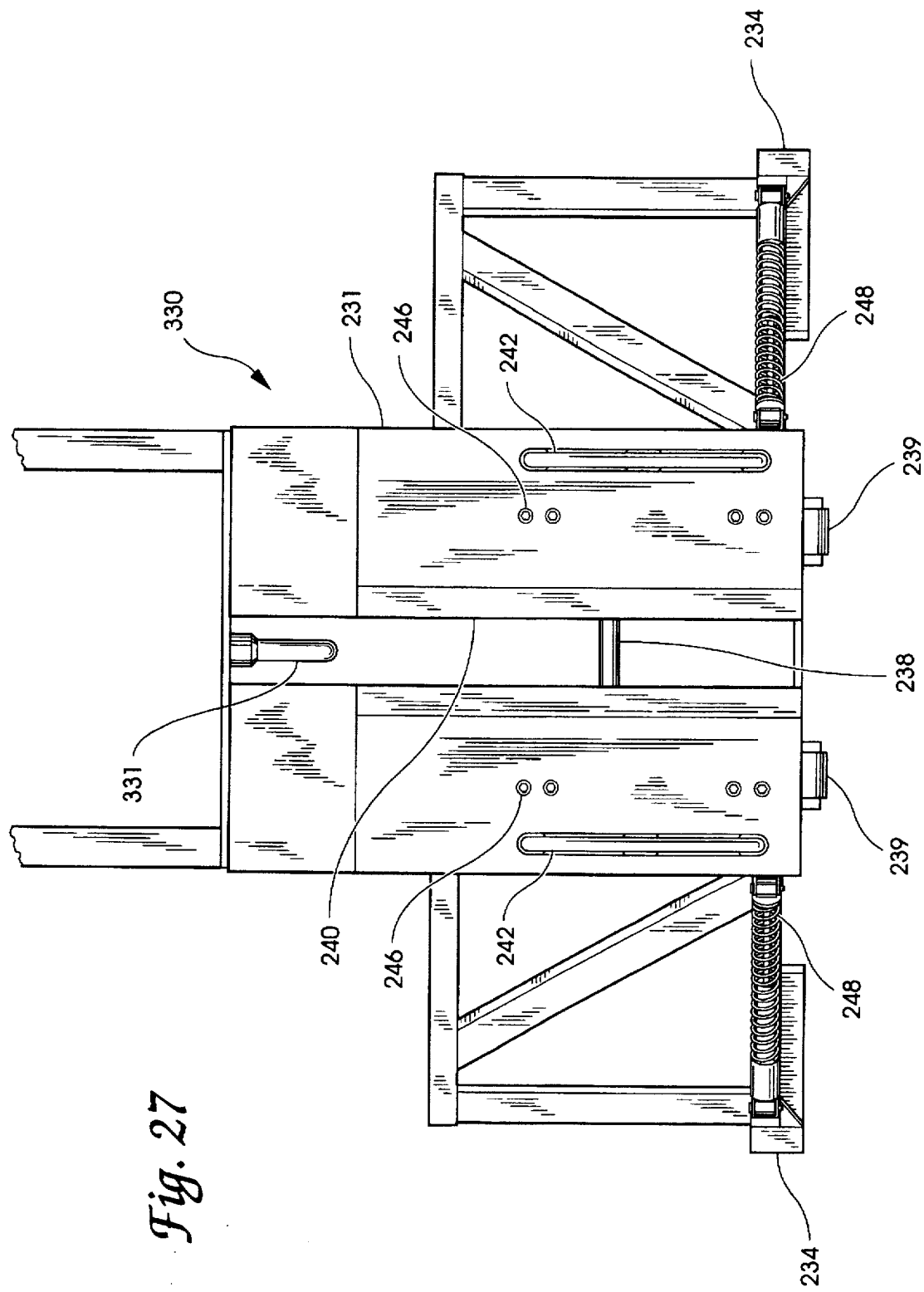
FIG. 27 is a rear elevational view of a tire transporter according to another embodiment of the present invention.

Referring now to FIGS. 26 and 27, a modified hook assembly 350 is illustrated for use in conjunction with an alternative embodiment of tire transporter 330. Hook assembly 350 is similar to hook assembly 250 described earlier in relationship to FIG. 17, and like numbers are used to identify identical features. However, in place of hook 254 of hook assembly 250, hook assembly 350 includes a slightly modified housing 351 that includes a block 352 mounted therein via screws 353. The block includes a vertical bore 354 that receives vertical lifting pin 331 of the alternative embodiment of tire transporter 330. Hook assembly 350 is used in a manner similar to that of hook assembly 250 discussed in reference to FIGS. 13-16; however, instead of lifting pin 237 of tire transporter 230 being received in hook 254, vertical lifting pin 331 is received in vertical bore 354 of hook assembly 350.

This difference allows tire transporter 330 to pivot slightly about the vertical axis defined by vertical pin 331 because channel 240 is slightly wider than hook assembly 350. This subtle feature results in a tire transporter 330 that is much more forgiving to the lift truck operator when approaching a stack of tires to be lifted. In particular, in the tire transporter 230 discussed earlier, the lift truck operator must approach a stack of tires nearly dead center in order to get the clamping mechanism 218 properly actuated and positioned about the base tire of the stack. The vertical pin structure of tire transporter 330, on the other hand, allows the tire transporter to pivot slightly about the pin when approaching a stack of tires so that the tire transporter automatically compensates when the lift truck operator approaches the stack of tires slightly off center. When tire transporters 330 does pivot with respect to the lift truck, one of the spring-loaded upright bars 242 is depressed against the front face of the lift truck. The spring action of upright bars 242 causes the tire transporter 330 to reassume its position straight in front of the lift truck when the stack of tires is lifted off of the ground. Thus, the lift truck operator can approach a stack of tires slightly off center causing the transporter to pivot to one side or the other, but the return spring action of upright bars 242 (see FIG. 12) causes the tire transporter 330 to reassume a straight-ahead position on the lift truck once the tires are lifted above the ground.

Figure 28:
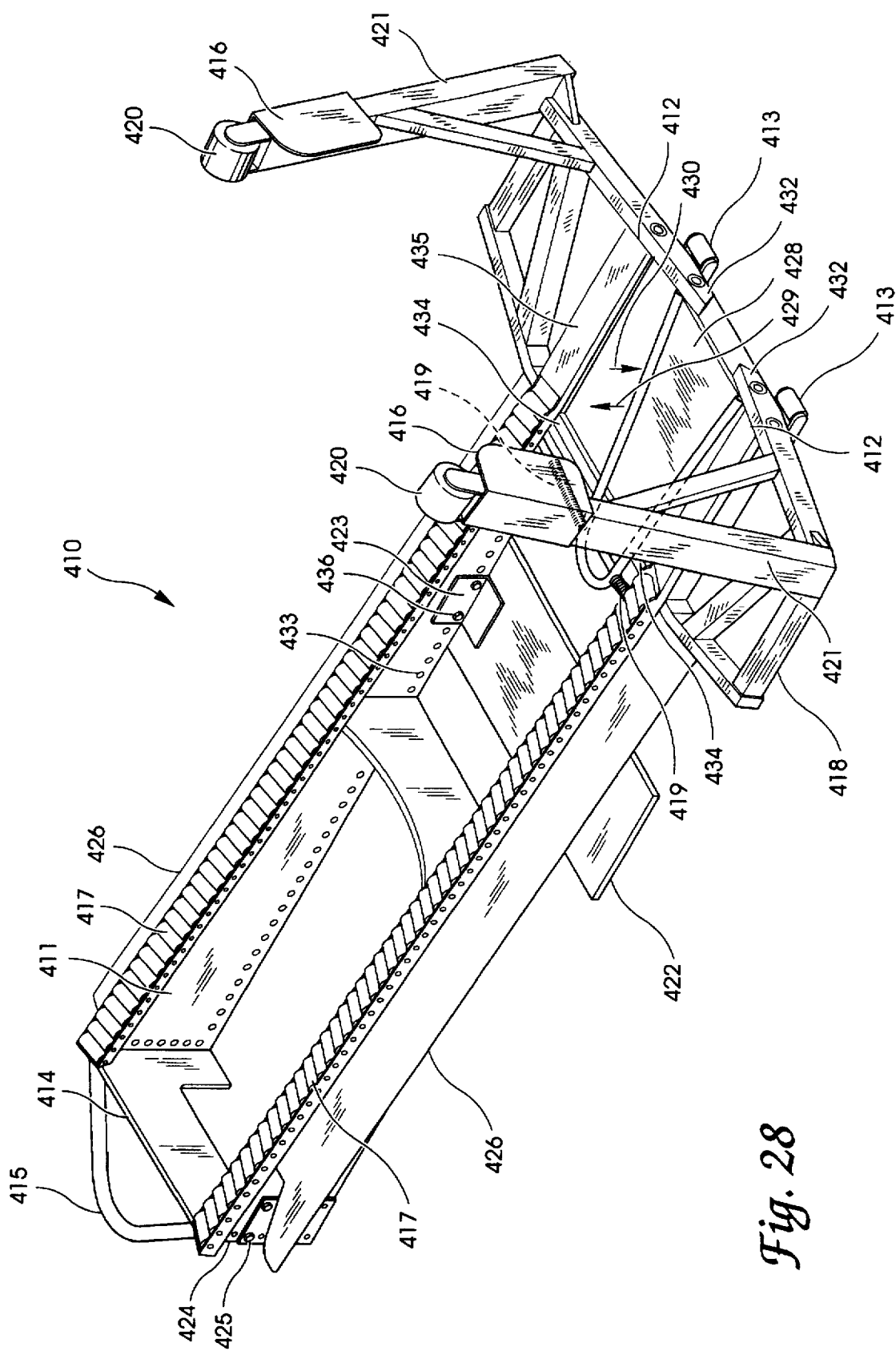
FIG. 28 is an isometric view of another embodiment of a tire-stacking device in accordance with the present invention.

FIG. 28 shows another improved tire-stacking device 410 according to another embodiment of the present invention. The tire-stacking device 410 is built around a frame 411 having a base end 412 and a lifting end 414 analogous to the embodiments discussed earlier. A pair of rollers 413 are attached adjacent the base end and rotatably support the device when being lifted from its horizontal position to a vertical position, as illustrated with device 10 in FIGS. 1–3. Device 410 includes a pair of roller rails 417 analogous to roller rails 217 shown in FIG. 10. As with tire-stacking device 210, these rollers allow the stack of tires to settle when the device is lifted from its horizontal position to its vertical position. Additionally, roller rails 417 serve as a platform upon which the tires can be arranged in side-by-side relation before the device 410 is lifted to its upright vertical position. Flanges are attached along the outside edges of roller rails 417 and provide ramps 426 for rolling the tires onto the roller rails 417 from a floor or other stationary surface upon which device 410 is resting in its horizontal position. Thus, in order to avoid the lifting of any of the tires onto tire-stacking device 410, a worker may arrange the device 410 in its horizontal position on, for example, the floor of a tire storage facility, and then proceed to load tires onto tire-stacking device 410 by rolling each tire from the floor to the roller rails 417 via ramps 426. In this way, the worker may avoid the lifting of any of the tires to be stacked.

An arcuate-shaped lifting bar 415 is attached to the lifting end 414 of frame 411 via an adjustable bracket 424. Bracket 424 and bolts 425 enable the arcuate-shaped lifting bar to have its height above the ground adjusted to accommodate different hook assemblies and lift trucks. As with the embodiment shown in FIG. 10, arcuate-shaped lifting bar 415 enables a single hook to lift tire-stacking device 410 instead of the dual hook design of the embodiments shown in FIGS. 1–9.

Tire-stacking device 410 also includes a clamping arrangement 418 which is similar to the clamping arrangement shown and described with respect to FIG. 10. Clamping arrangement 418 includes tension springs 419 which bias arms 421 toward one another. In addition, clamping arrangement 418 includes a pressure mechanism 428 connected to arms 421 via levers 432 and 434. As the first tire of the stack is rolled onto device 410, while in its horizontal position, the tire is positioned at the base end 412 between arms 421 and resting upon pressure device 428 and surfaces 435. The weight of this first tire upon pressure device 428 causes the arms 421 to become biased toward one another with sufficient force so that support surfaces 416, which are mounted on each arm, are in position to support the base tire in a stack of tires, in a manner similar to that illustrated in FIG. 9. Pressure device 428 may be sized so that it is subjected to the weight of a plurality of tires in the stack, and in the preferred embodiment, pressure device 428 is sized to be subjected to the weight of the bottom two tires in the stack. Although the present invention contemplates a variety of mechanisms for providing pressure device 428, such as a hydraulic or air pressure mechanism, the preferred embodiment utilizes a pressure plate which is responsive to the force acted upon it in the direction of arrows 429 and 430. Thus, as arms 421 are pivoted away from each other, pressure plate 428 moves in the direction of arrow 429. Conversely, when force is applied in the direction of arrow 430, arms 421 are biased toward each other with a force directly proportional to the force applied to pressure plate 428. In this embodiment, the weight of one tire acting in the direction of arrow 430 upon pressure plate 428 is sufficient to bias arms 421 toward each other so that support surfaces 416 are positioned for supporting the stack of tires when stacking device 410 is in its vertical position. As with the embodiment shown in FIG. 10, a roller 420 is mounted on the free end of each arm 421 and serves as a means for spreading the arms apart when the tire-stacking device either approaches a stack of tires to be lifted or is removing device 410 from a stack of tires. Tire-stacking device 410 also includes a strike plate 422 that is mounted along the back side of frame 411 above clamping arrangement 418. Brackets 423 and the plurality of holes 433 along either side of the length of frame 411 enable the strike plate 422 to be adjusted via bolts 436 to a plurality of locations along the length of frame 411. Strike plate 422, in the present embodiment, must be made of a magnetically attractable material.

Figure 29:
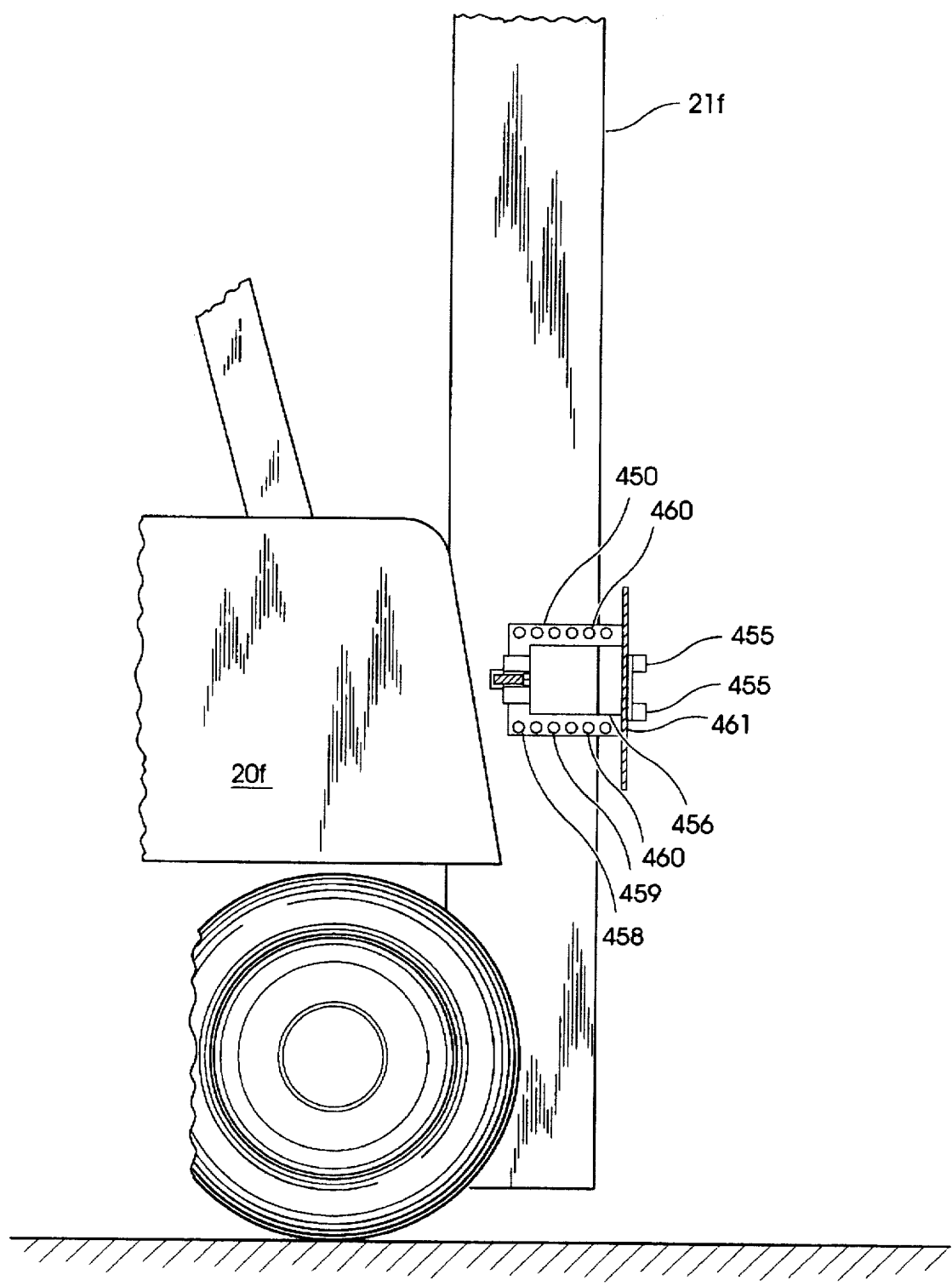
FIG. 29 is a partial side elevational view of a lift truck having a magnetic device attached thereto for preventing the base end of a tire-stacking device from being drawn away from the lift truck, in accordance with another aspect of the present invention.

Referring now to FIG. 29, magnetic assembly 450 is shown attached to the mast 21f of a lift truck 20f. Magnetic assembly 450 serves to act in conjunction with striker plate 422 to secure the lower portion of the frame 411 to the mast 21f of the lift truck, to prevent the base end 412 of the tire-stacking device 410 from being drawn away from the lift truck when the device 410 is being removed from the stack of tires. Although the present invention contemplates that magnetic assembly 450 may comprise, for example, an electro-magnet or other magnetic means, the preferred embodiment utilizes a pair of rare earth permanent magnets 455. Permanent magnets 455 are disposed in a housing 456 which is attached to a bracket 458 suitable for attaching to the mast 21f of the lift truck. The horizontal position of magnetic assembly 450 is adjustable via the plurality of holes 459 disposed along the bracket 458 on either side of the magnet housing 456. Bolts 460 are used to secure the assembly 450 to the mast 21f of the lift truck. Flexible plastic flange 461 is included as a safety precaution to help keep fingers and clothing from becoming pinched between magnets 455 and the striker plate 422.

Figure 30:
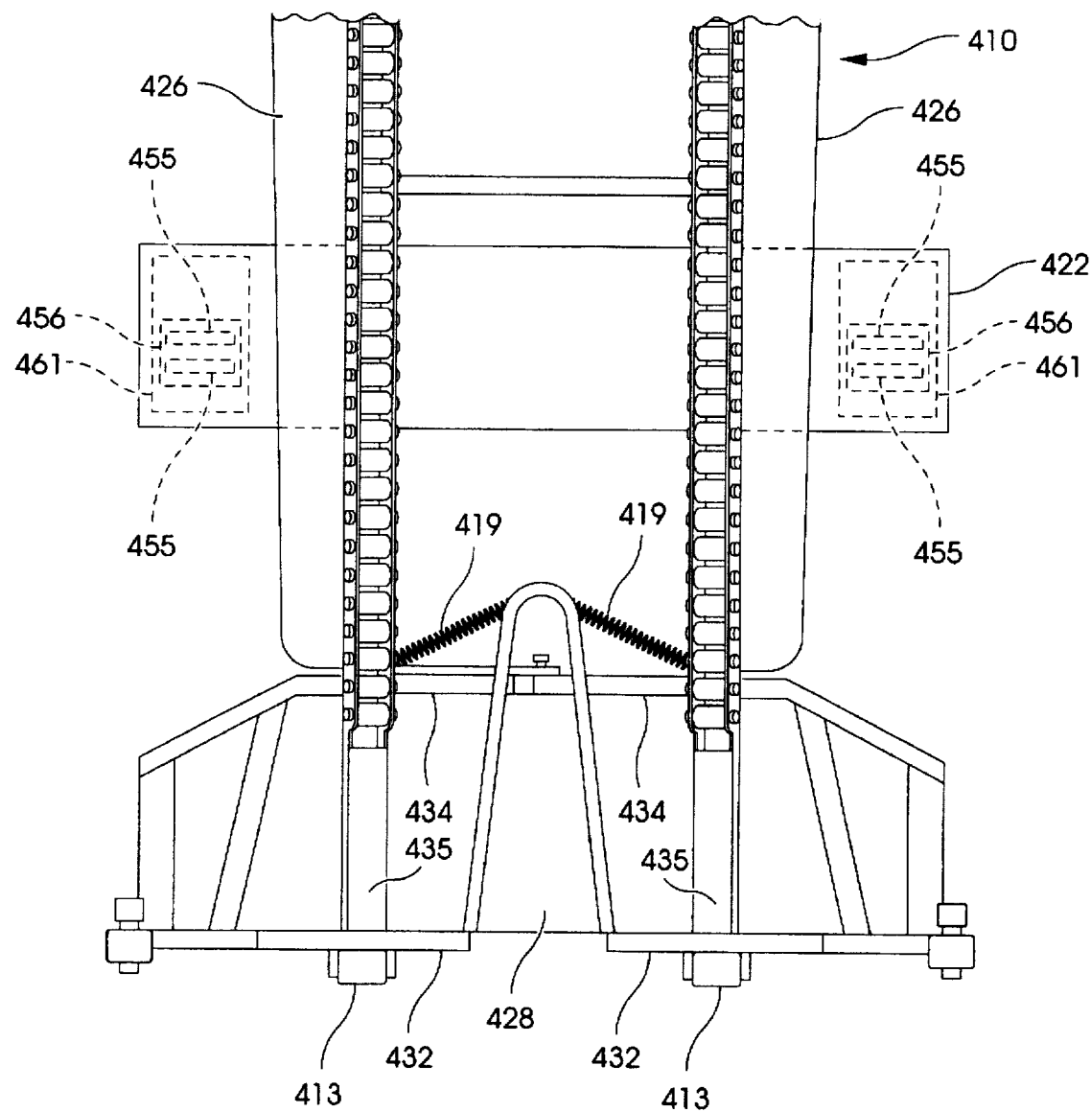
FIG. 30 is a partial front elevational view of the magnetic assembly of the tire-stacking device of FIG. 28 with the magnetic device of FIG. 29 shown in phantom.

Referring now to FIG. 30, the position of the magnet assemblies 450 are shown in phantom with respect to the front of the stacker 410. As shown, a pair of magnetic assemblies 450, positioned outside of the ramps 426, are typically used. When tire-stacking device 410 is lifted off the ground, while in its vertical position (as analogously shown in FIG. 22), magnets 455 of magnet assemblies 450 receive strike plate 422 of device 410. Thus, the magnetic force of magnets 455 maintains the vertical position of the tire-stacking device 410. Thus, when the operator backs away from a stack of tires, the magnetic force between magnets 455 and the strike plate 422 prevents the base of the tire-stacking device 410 from being drawn away from the lift truck.

The operator can disengage the magnets 455 from the strike plate 422 by lowering the tire-stacking device 410 into contact with the ground when the top of the mast is tilted backwards toward the lift truck. In other words, the tilting of the mast of the lift truck causes the magnets 455 to slide off the strike plate 422 as the tire-stacking device 410 contacts the ground. The operator may then continue lowering the device 410 into its horizontal position for receiving another stack of tires.

Figure 31:
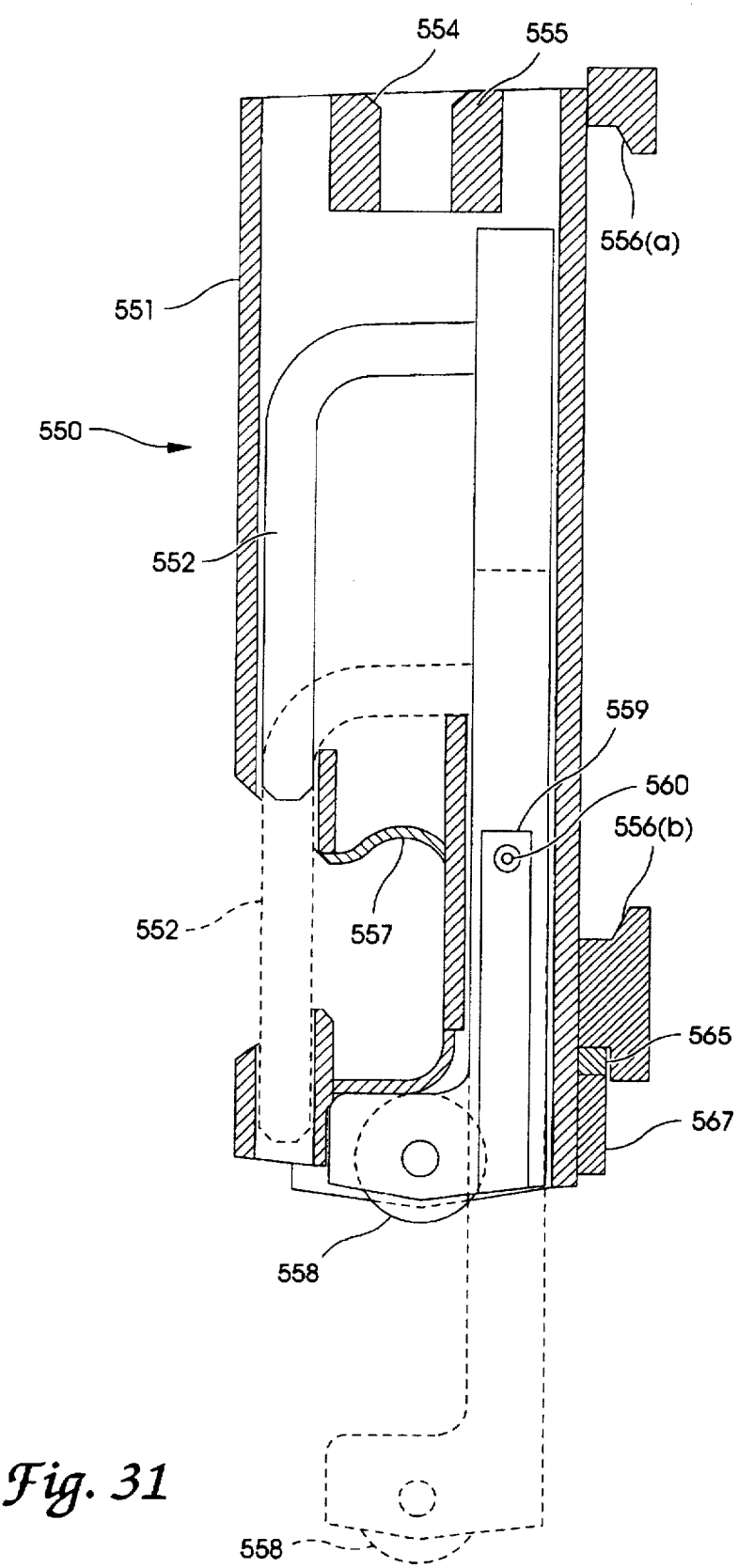
FIG. 31 is a sectioned side elevational view of a hooking assembly in accordance with another aspect of the present invention, with the sliding pin shown in full.
Figure 32:
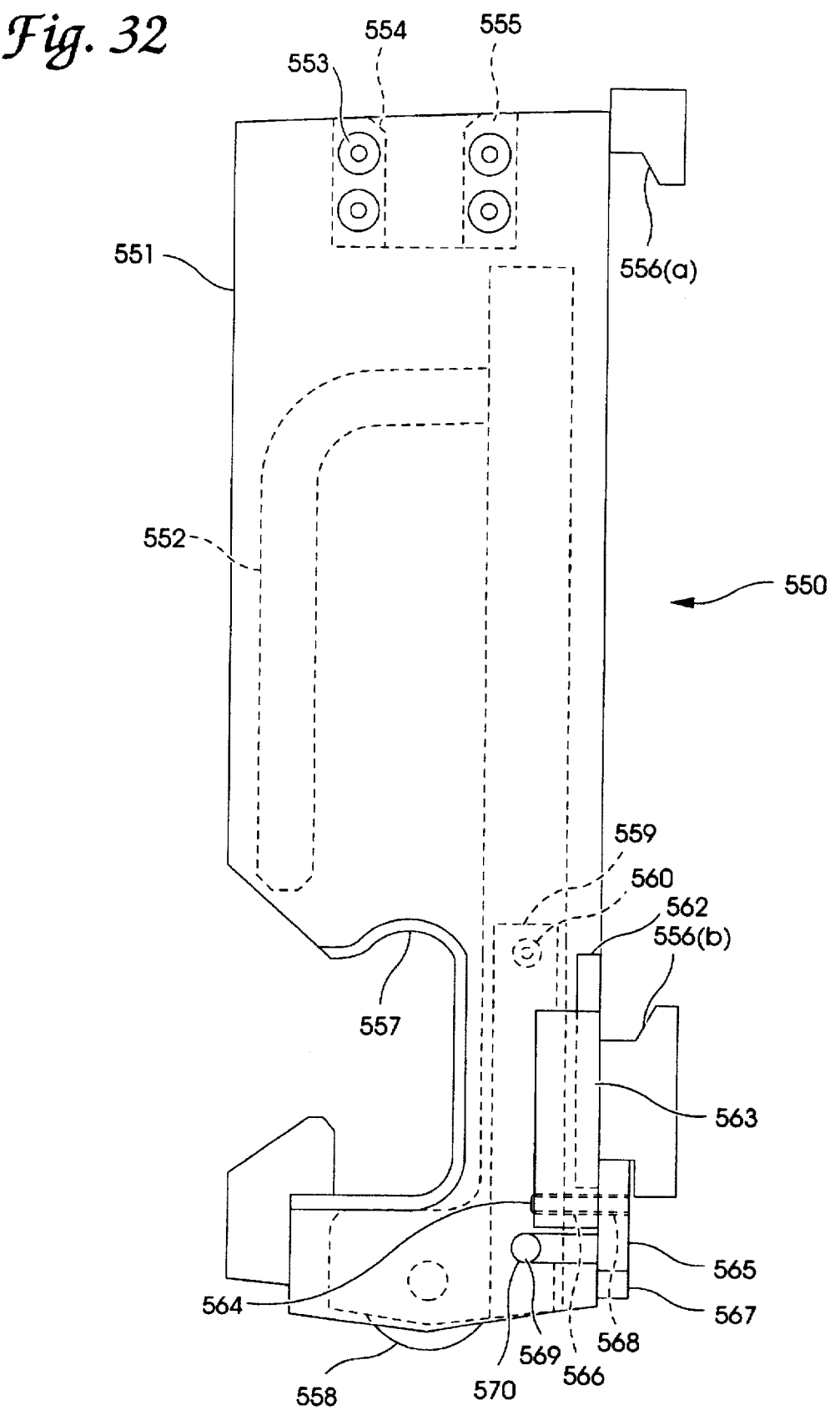
FIG. 32 is a side elevational view of the hooking assembly shown in FIG. 31, with internal portions shown in phantom
Figure 33:
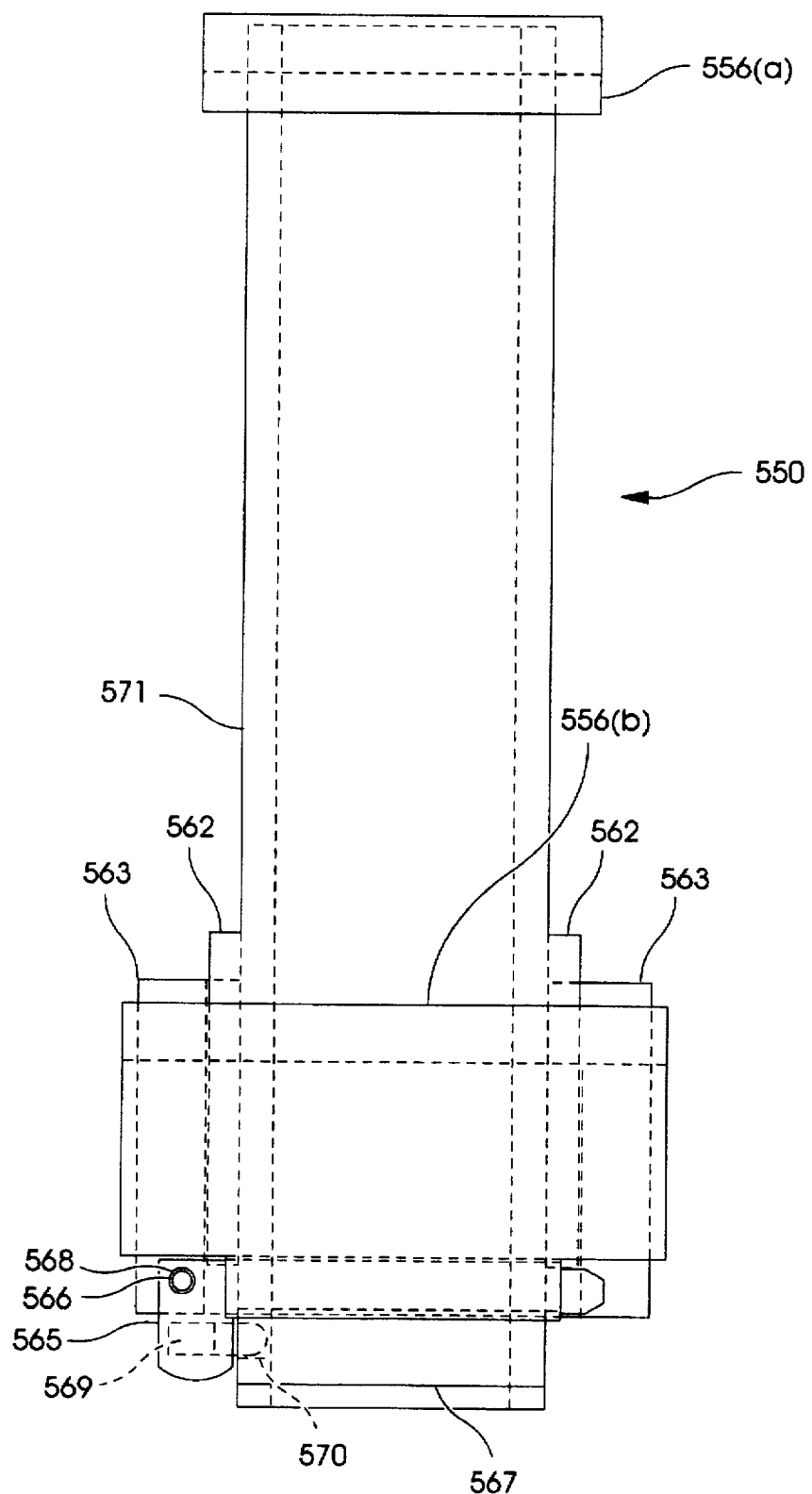
FIG. 33 is a rear elevational view of the hooking assembly shown in FIGS. 31 and 32.
Figure 37:
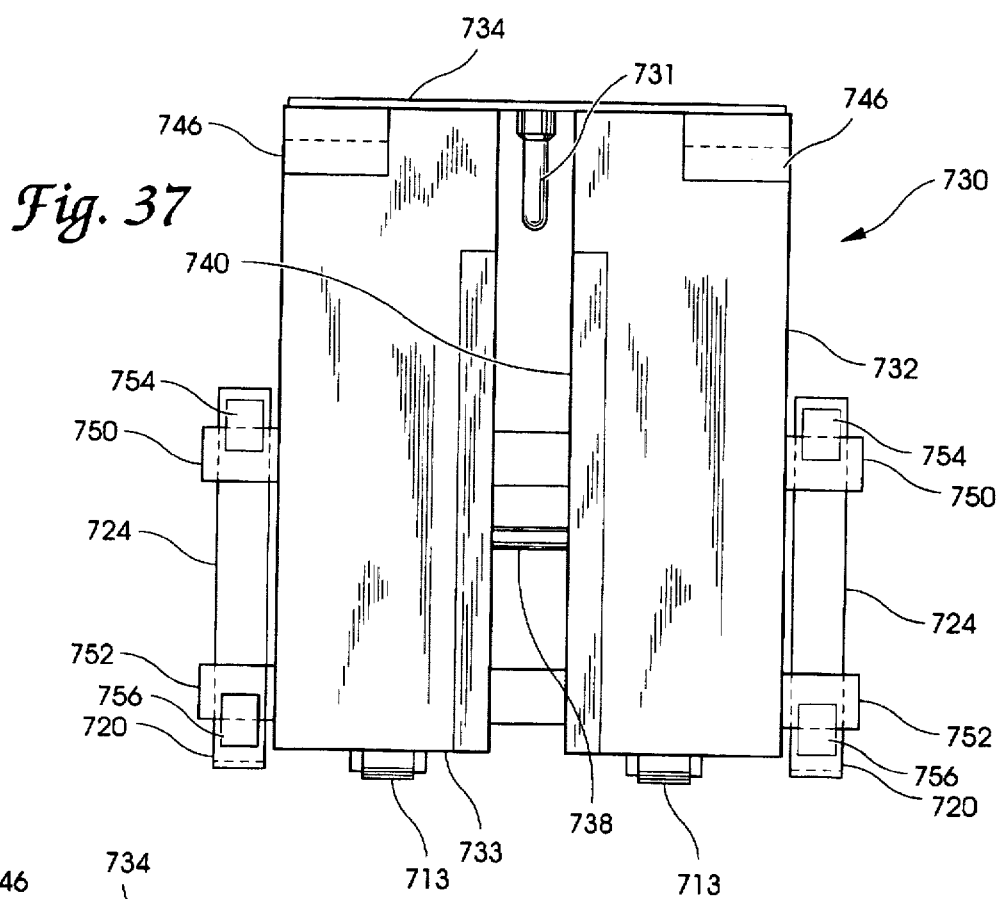
FIG. 37 is a rear elevational view of a fork apparatus in accordance with yet another embodiment of the present invention.
Figure 38:
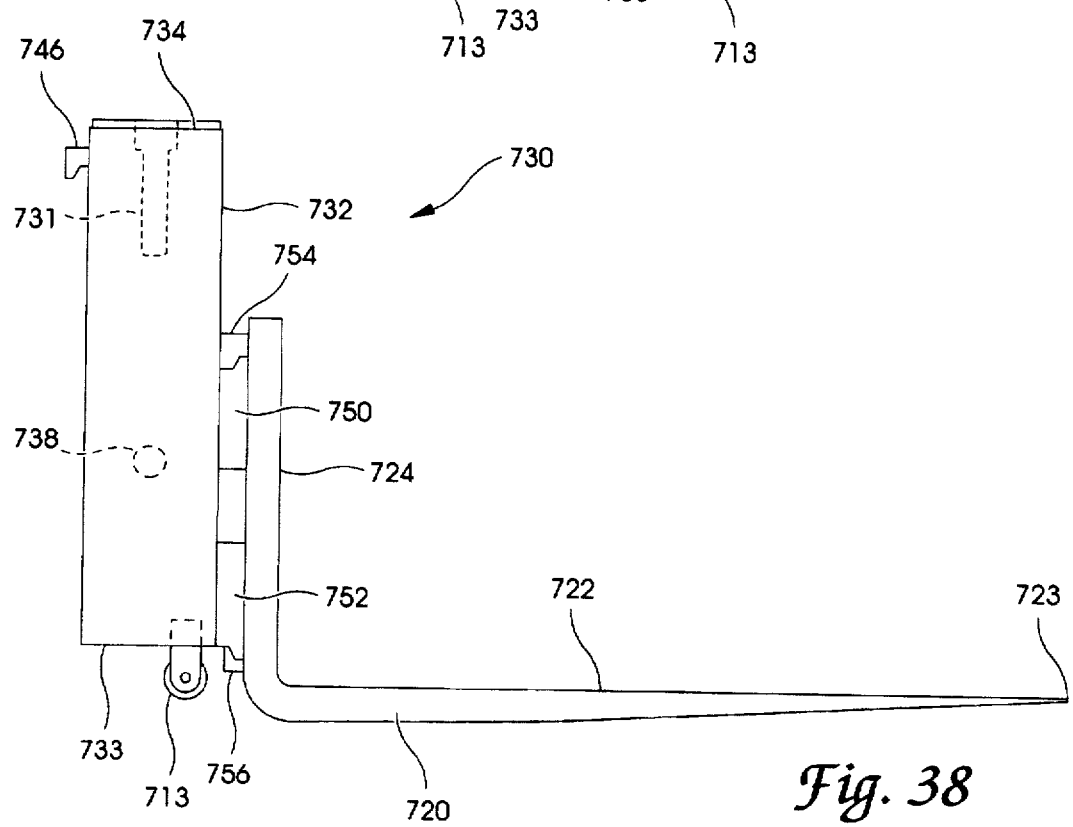
FIG. 38 is a side elevational view of the fork apparatus of FIG. 37.

Referring now to FIGS. 31–33, an improved hook assembly 550 is illustrated for use in conjunction with tire-stacking devices 210 and 410, tire transporter 330 and fork assembly 730 (FIGS. 37 and 38). Hook assembly 550 operates virtually identically to hook assembly 350, but contains a few structural modifications.

As with the hook assembly embodiments previously described, hook assembly 550 contains a sliding pin 552 that is capable of moving between a retracted position and a closed position as shown in shadow in FIG. 31. Normally, the weight of sliding pin 552 maintains it in its closed or locked position. However, when the lifting apparatus of the lift truck is lowered near the ground, roller 558 comes in contact with the ground and causes the sliding pin 552 to retract to its open position. Since roller 558 is the only aspect of hook assembly 550 that comes in contact with the ground, hook assembly 550 is less likely to experience wear and tear of its components than the hook assembly embodiments previously discussed. Flange 559 is attached to sliding pin 552 near the roller 558. Flange 559 includes a protuberance 560 opposite its attachment end which works in conjunction with pin 569 and bore 570 to provide a safety feature unique to this particular embodiment. If pin 569, connected to spacer pin 565 (more fully discussed hereinafter), is fully inserted into bore 570, than the sliding pin 552 may be freely actuated between its retracted position and its closed position as shown in FIG. 31. However, if pin 569 is not disposed within bore 570, any attempt to move sliding pin 552 into its retracted position will fail because protuberance 560 will enter empty bore 570 and restrict any further movement of sliding pin 552. Flange 559 is spring biased toward wall 571 of hook assembly 550. This spring bias enables protuberance 560 to enter empty bore 570 if pin 569 is not disposed therein. This flange/pin arrangement acts as a safety mechanism to prevent a lift truck operator from lifting a tire-stacker or transporter if hook assembly 550 is not properly attached to a lift truck.

As with the embodiments previously discussed, housing 551 includes a pair of mounting flanges 556(a) and 556(b) which enable hook assembly 550 to be attached to the lifting apparatus of a lift truck. However, it is known that most lift trucks contain a notched-out portion along the bottom rail of the lifting apparatus or carriage mechanism. With the hook assembly embodiments previously discussed, this notch is used to install the hook assembly on the carriage mechanism. First, the top mounting flange is positioned on the top of the lift truck carriage mechanism. Next, the lower mounting flange is pushed into the notched-out portion of the carriage mechanism and then the entire hook assembly is moved to either side of the notched-out portion thereby clamping the hook assembly to the carriage mechanism. In practice, it has been found that the width and location of this notched-out portion varies from lift truck to lift truck. Thus, in order to standardize the size of mounting flanges 556(a) and 556(b), and thus remove the dependence of hook assembly 550 on the notched-out portion of the lift truck carriage mechanism, lower flange 556(b) has been designed to slide vertically along tabs 562 of housing 551 via flange brackets 563. Alternatively, the present invention contemplates that the lower mounting flange 556(b) be fixed in place on hook assembly 550 and upper mounting flange 556(a) be slidably attached to housing 551. To install the preferred embodiment of hook assembly 550 on the carriage mechanism of a lift truck, upper mounting flange 556(a) is attached to the top of the carriage mechanism as before. Spacer pin 565 is then removed from hook assembly 550 and the lower mounting flange 556(b) is allowed to slide vertically down to its lowest position. In this lowest position, hook assembly 550 has been designed so that the distance between upper mounting flange 556(a) and lower mounting flange 556(b) is wide enough to span the vertical distance of the carriage mechanism on any lift truck. Similarly, the width of lower mounting flange 556(b) has been designed to be substantially wider than the notched-out portion on the carriage mechanism of any lift truck. Thus, with lower mounting flange 556(b) in its lowermost vertical position, and with the top mounting flange 556(a) already in position on the carriage mechanism, hook assembly 550 is simply pushed toward the lift truck carriage mechanism until housing 551 is in contact with, and flush against, the carriage mechanism. Lower mounting flange 556(b) is then raised until the carriage mechanism is clamped between upper mounting flange 556(a) and lower mounting flange 556(b). Although the present invention contemplates that lower mounting flange 556(b) may be raised by pneumatic means, electro-mechanical means, or by purely mechanical means, such as, for example, a lever mechanism, flange 556(b) is raised into position in the preferred embodiment by hand. Sliding pin 565 is then forced between the lower surface of lower mounting flange 556(b) and the upper surface of block 567, thus forming a clamping arrangement between flanges 556(a) and 556(b), and the carriage mechanism of the lift truck. Care must be taken at this point to ensure that pin 569 of sliding pin 565 is disposed within bore 570 so that sliding pin 552 is free to actuate between its retracted and closed positions. Once this is accomplished, and to ensure that pin 569 does not become inadvertently removed from bore 570 on a properly installed hook assembly 550, locking pin 564 is provided for sliding into bores 566 and 568 disposed through flange bracket 563 and sliding pin 565 respectively. On a properly installed hook assembly 550, bores 566 and 568 are aligned to permit the passage of locking pin 565 therethrough. Since the vertical distance of a lift truck carriage mechanism is relatively constant throughout the lift truck industry, and because the notched-out portions vary widely from lift truck to lift truck, the hook assembly 550 mounting mechanism shown and disclosed in this embodiment may easily be mounted to any lift truck, regardless of the size or configuration of the notched-out portion of the carriage mechanism.

Analogous to hook assembly 350, hook assembly 550 includes a block 555 mounted within housing 551 via screws 553. The block includes a vertical bore 554 that receives vertical lifting pin 331 of the alternative embodiment of tire transporter 330, and the vertical lifting pin 731 of fork transporter 730 as shown in FIGS. 37–38. Block 555 and bore 554 function analogously to, and for the same purposes as, the block 352 and vertical bore 354 of hook assembly 350 as shown in FIG. 26.

Figure 34:
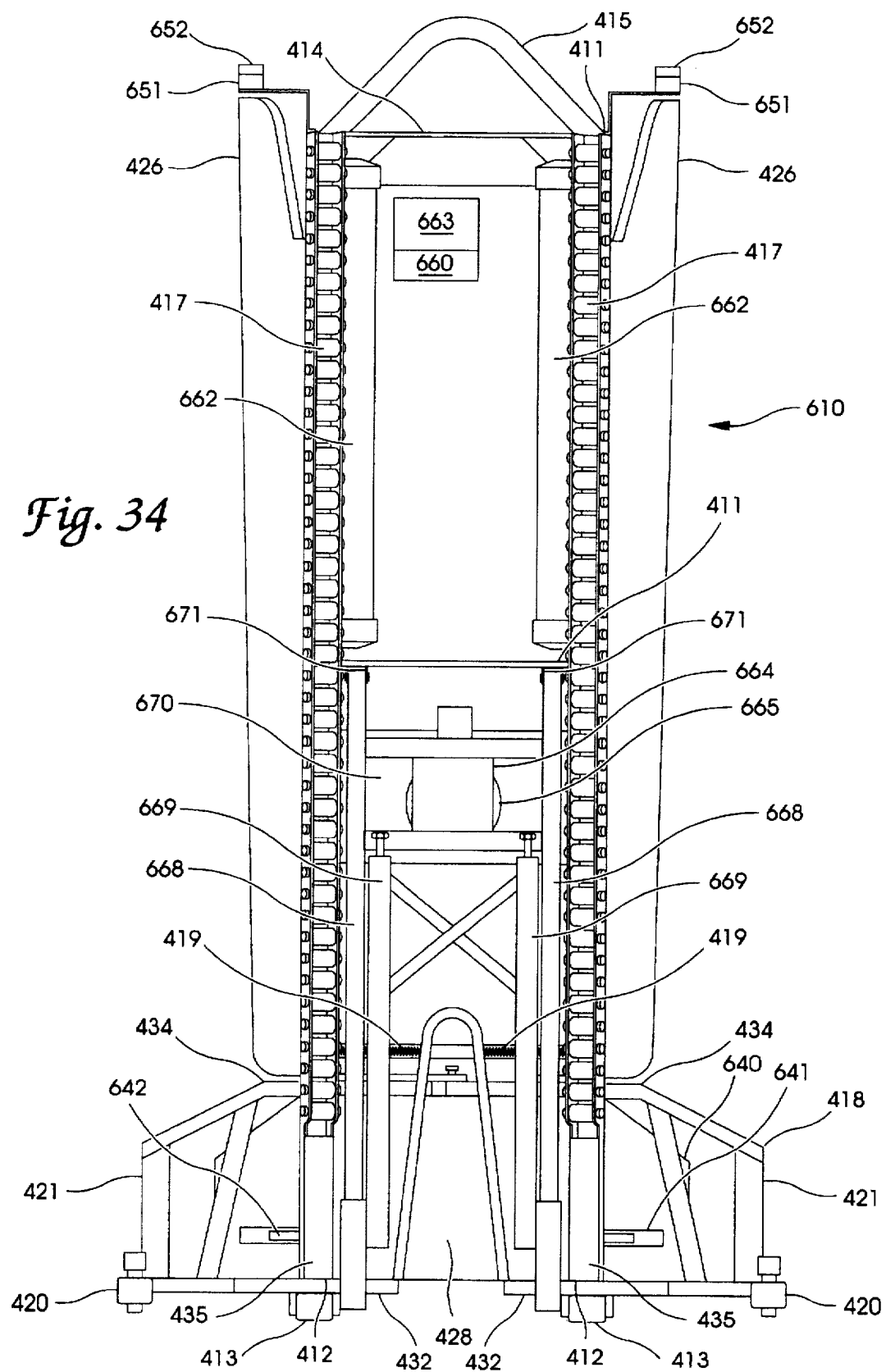
FIG. 34 is a front elevational view of yet another embodiment of a tire-stacking device in accordance with the present invention.
Figure 35:
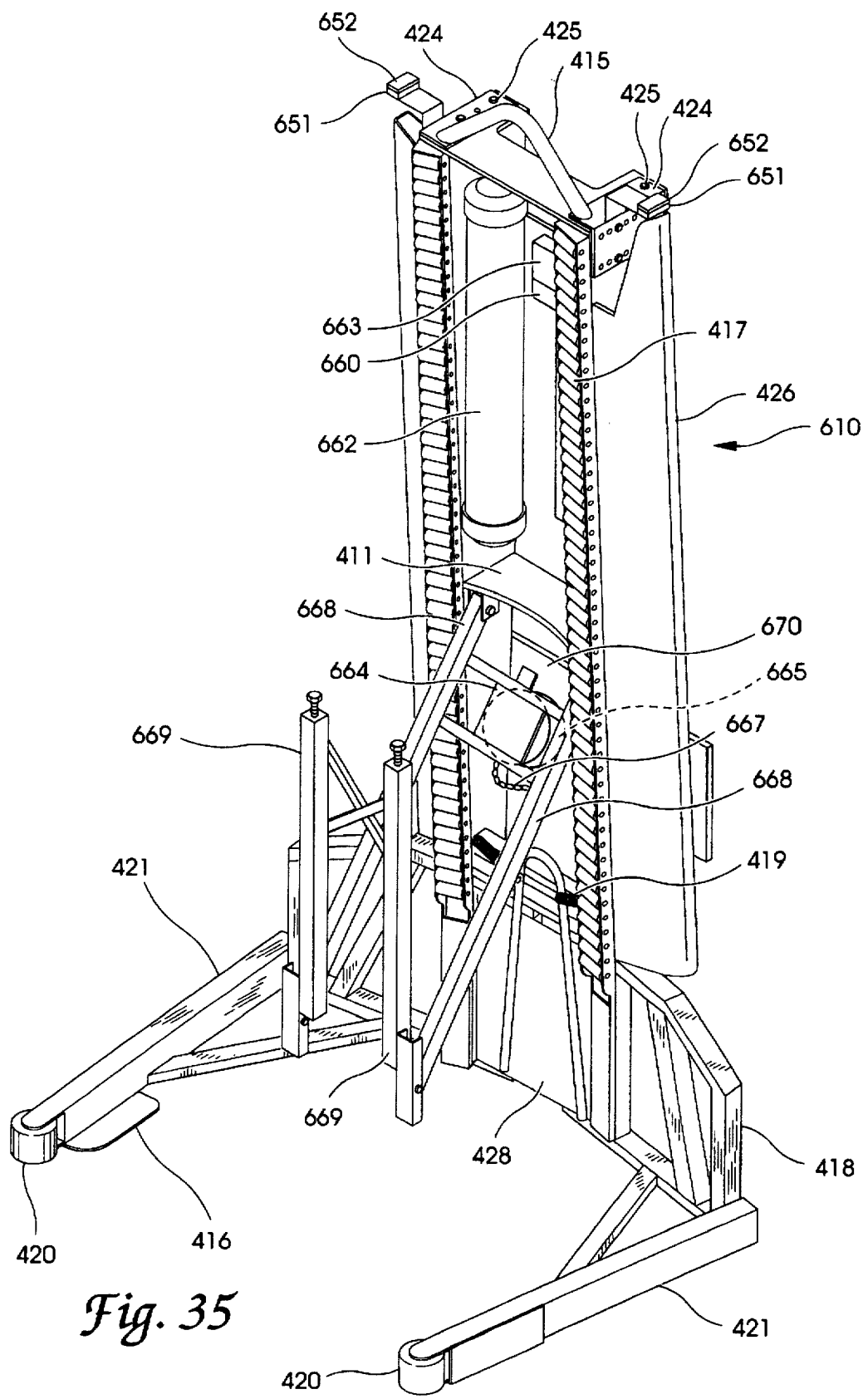
FIG. 35 is an isometric view of the embodiment shown in FIG. 34 with the structure for preventing the base end of the tire-stacking device from being drawn away from the lift truck fully extended.
Figure 36:
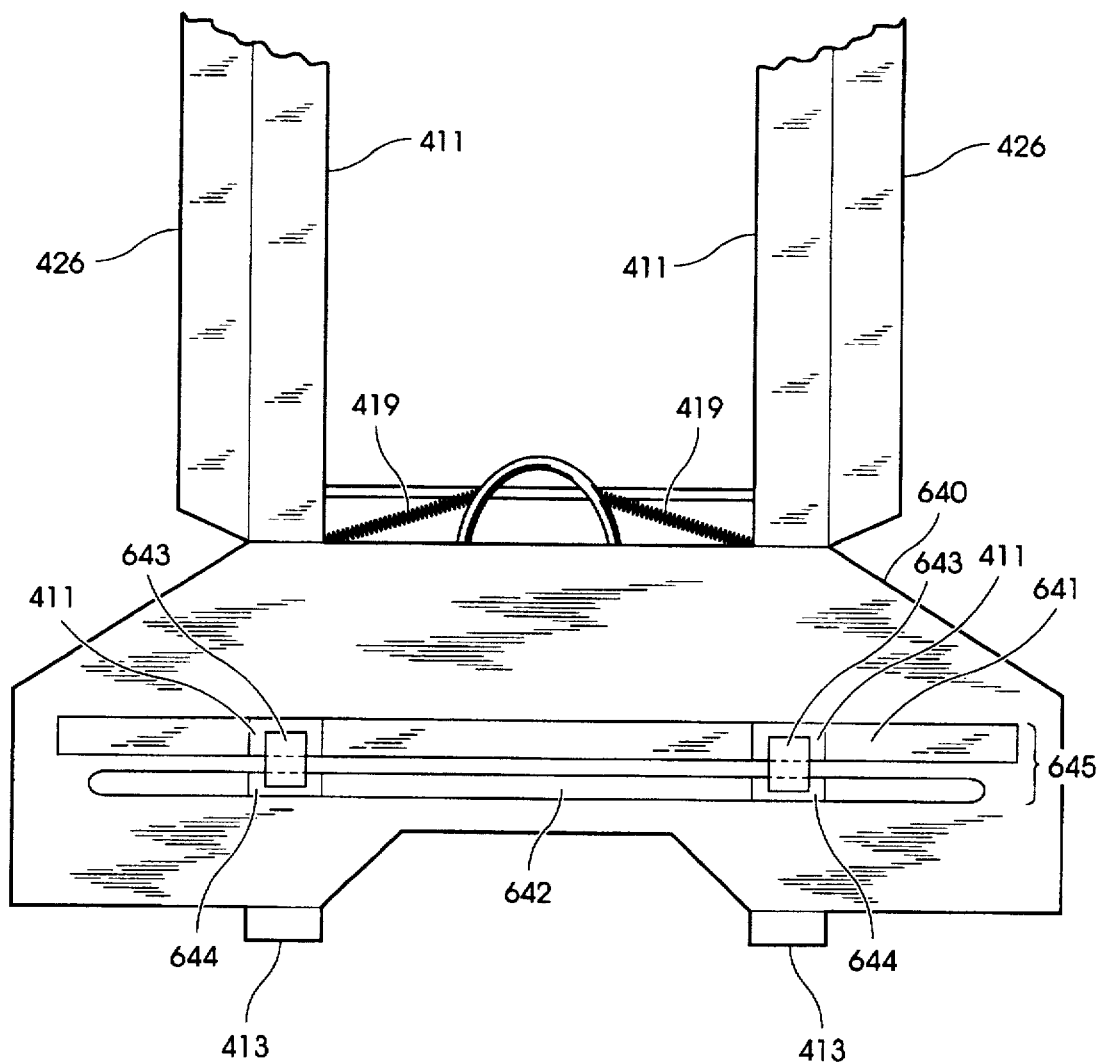
FIG. 36 is a partial rear elevational view of the embodiment shown in FIGS. 34 and 35.

Referring now to FIGS. 34–36, yet another improved tire-stacking device 610, according to another embodiment of the present invention, is shown. The tire-stacking device 610 is, in many ways, identical in structure and function to tire-stacking device 410, and like components are labelled with like numbers. However, device 610 also includes several significant improvements over device 410. These improvements are designed to not only increase the efficiency and stability of the tire-stacker, but also to produce a tire-stacker that is completely self-sufficient. A primary goal in designing the embodiment shown in FIGS. 34–36 is to produce a tire-stacker that is usable with virtually any lift truck without requiring any modifications to the lift truck itself. Tire-stacker 610 achieves this goal.

In order to improve the efficiency of tire-stacking device 610, offset mechanism 645 is included within device 610.

Most lift trucks have a multi-tiered mast system for which device 610 requires compensation. For a given stationary point in front of a lift truck, just above floor level for example, the horizontal distance between this point and the mast of the lift truck increases as the carriage mechanism is raised. This is because raising the various tiers of the mast progressively uncovers the tier below. Each subsequent tier is thus located further away from the stationary point. Thus, without some sort of offset mechanism near the base of any of the tire-stacker embodiments so far disclosed, the tire-stacker in its vertical position on the lift truck would actually come to rest beyond vertical with the stack of tires leaning away from the lift truck. The non-vertical position of the tire-stacker would result in a non-uniform and forward leaning stack of tires when deposited at its desired location. In the tire-stacking devices previously discussed, this needed offset mechanism was accomplished by securing rigid blocks onto the lower outside portion of the stationary mast of the lift truck. One intent of the embodiment shown in FIGS. 34-36 is to provide this offset mechanism entirely within tire-stacker 610. Tire-stacking device 610 provides this offset mechanism by including a bar 642 which is attached to the frame 411 via slotted counter-weighted hinges 643 positioned within grooves 644. Recess 641 is provided within rear base plate 640 and is sized for housing the bar 642.

When device 610 is in its horizontal position, bar 642 is housed within recess 641. As a lift truck begins to raise the lifting end 414 of device 610, slotted counter-weighted hinges 643 force the bar 642 out of recess 641 and toward the rollers 413. When device 610 is in its vertical position, bar 642 is disposed just below recess 641 as shown in FIG. 36. In this position, bar 642 provides the necessary offset mechanism to keep device 610 vertical when at its highest vertical position on the lift truck. As device 610 is lowered to its horizontal position, bar 642 will, begin to swing in a direction opposite to the direction of motion of frame 610. In other words, as the bar 642 contacts the floor it will advance toward recess 641. As device 610 is continued to be lowered, bar 642 will reach recess 641 and the weight of tire-stacker 610 will overcome the outward bias of hinges 643 and bar 642 will tuck into recess 641 thus enabling device 610 to lay flat. Although the present invention contemplates that bar 642 may vary substantially in diameter, the preferred embodiment utilizes a bar 642 having a diameter of about 1.25 inches. The material used for bar 642 must be soft enough so as not to mechanically deform the lift truck mast or rear base plate 640, during operation, but must be hard enough to provide a substantial useful life. The preferred material is UHMW plastic.

In order to increase the stability of tire-stacker 610, sway stabilizing extensions 651 are attached to the lifting end 414 of the frame 411. Each extension 651 includes a top-cap 652 made from a suitable shock-absorbing material such as UHMW plastic. As device 610 is raised to its vertical position by a lift truck, extensions 651 assume a position just beneath the bottom of the lift truck carriage (not shown). Extensions 651 are designed so that there exists a gap between the bottom of the lift truck carriage and the top-caps 652. However, the present invention contemplates that top-caps 652 may also be sized so that they are in contact with the bottom of the lift truck carriage when device 610 is in its vertical position. In any event, extensions 651 with top-caps 652 provide an anti-sway effect so that the tire-stacking device stays relatively vertical when the lift truck is transporting device 610 around corners and such. This anti-sway mechanism was built into the apparatus for securing the lower portion of the frame of the tire-stacking device to the mast of the lift truck to prevent the base of the tire-stacking device from drifting away from the lift truck when removing the device from a stack of tires in the previously discussed tire-stacking embodiments. However, since this anti-drift mechanism is now housed entirely within stacking device 610, as will be subsequently discussed, an anti-sway mechanism, such as stabilizing extensions 651, is desirable.

Finally, in order to produce a tire-stacker that is usable with virtually any lift truck without requiring any modifications to the lift truck itself, the anti-drift mechanism just discussed must be contained solely within tire-stacker 610. As shown in FIGS. 34 and 35, this anti-drift mechanism comprises a means for applying pressure to the stack of tires to be removed from tire-stacking device 610. This pressure is applied to at least one of the tires near the base of the stack and is exerted in the direction of the mouth of the clamping arrangement 418. Although the present invention contemplates providing sufficient pressure to push the stack of tires out of tire-stacking device 610 when device 610 is in its vertical position, the pressure supplied in the preferred embodiment is only sufficient to keep the base 412 of device 610 from being drawn away from the lift truck when device 610 is being drawn away, or removed, from the stack of tires, regardless of the number of tires in the stack, as the stack is being deposited at its desired location. The pressure supplied in the preferred embodiment is not enough to overcome the weight of the tires in the stack and the inward bias of arms 421, and therefore push the stack of tires out of device 610, also regardless of the number of tires in the stack.

In the preferred embodiment, this means for applying pressure is housed within frame 411 and includes a battery 663, at least one air source containing pressurized air 662 and control electronics 660, all attached to the frame 411. In a preferred embodiment, frame 411 houses two air sources 662 as shown in FIG. 34. Additionally, a plate 670 is securely attached to frame 411 and a displacement structure 668, including pressure plate 664, is pivotally attached to frame 411 via hinge brackets 671. Means for pivoting structure 668 is disposed between plate 664 and plate 670. Although the present invention contemplates using a variety of pivoting means, such as a fluid or pneumatic, magnetic and/or mechanical means, such as a spring, the preferred embodiment utilizes an air bladder 665 connected to the air source 662 which, when filled with air, presses against plate 670 and forces plate 664, along with pivoting structure 668, outward and away from frame 411. In order to provide a positive stop to the pivoting of structure 668, a chain, or other suitable restraining device, is connected between plate 664, or pivoting structure 668, and plate 70, or any other stationary structure of tire stacking device 610. Thus, as the air bladder 665 inflates, structure 668 pivots toward the stack of tires to a distance permitted by the length of chain 667 or other restraining device.

Pivotally connected to structure 668 are extension arms 669. As structure 668 is pivoted outwardly toward the stack of tires, extension arms 669 also pivot so that arms 669 maintain a vertical position with respect to the stack of tires. Thus, the long edges of extension arms 669 provide the surface to apply pressure to the stack of tires. It can therefore be appreciated that the length of arms 669 may be varied to determine the number of tires being acted upon by structure 668. In the preferred embodiment, arms 669 are sized so that structure 668 apply pressure to at least two of the tires in the stack.

In operation, the control electronics 660, powered by battery 663, receives a prompt from an operator-controlled mechanism, such as a wired switch or wireless remote control, and responds thereto by generating a signal to begin filling air bladder 665 with air from the air source 662. The air bladder 665 fills with air and presses against plates 664 and 670. Since plate 670 is rigidly secured to frame 411, bladder 665 displaces plate 664, and therefore pivots displacement structure 668 outwardly and toward the stack of tires. In turn, extension arms 669 pivot downwardly and provide a surface for contacting at least two of the tires near the bottom of the stack. As the lift truck operator backs away from the stack of tires, the pressure of extension arms 669 keep the base 412 of the tire-stacking device 610 from drifting away from the lift truck. As the lift truck continues to back away, rollers 420 ride along the surface of the bottom tire in the stack, thus spreading the gripping arms 421. When the lift truck has sufficiently backed away from the stack of tires, tire-stacking device 610 is removed from the stack and a vertical stack of tires is deposited at its desired location. At this point, the lift truck operator may provide a second prompt to the control electronics 660 which then provides a signal to cause air bladder 665 to deflate. As bladder 665 deflates, structure 668 and arms 669 begin to pivot back to their pre-inflation positions. By the time tire-stacking device 610 can be lowered back to its horizontal position, bladder 665 will have completely deflated and structure 668 and arms 669 will be pivoted back to their pre-inflation positions. It should be noted that in their pre-inflations positions, structure 668 and extension arms 669 are positioned coextensive with surfaces 435 and thus contact the surfaces of tires stacked thereon, but neither interfere with or impede the stacking, lifting or other normal operation of tire-stacker 610.

In all other respects, tire-stacking device 610 operates identically to device 410 as previously discussed and shown in FIGS. 28–30. Moreover, device 610, as with device 410 may be used in cooperative arrangement with the lifting mechanism of a lift truck by using of hook assemblies 250, 350 and 550.

Referring now to FIGS. 37 and 38, fork apparatus 730, according to another aspect of the present invention, is shown. Fork apparatus 730 is capable of hooking to a hook arrangement, such as hook arrangement 350 or 550, and may be used for conventional fork lifting needs when it is undesirable to remove the hook assembly from the lift truck carriage mechanism and install conventional fork tines thereon. Fork apparatus 730 includes a vertical frame 732 having a base end 733, a head end 734, an open channel 740 disposed between the ends and a lifting element or pin 738 disposed horizontally within channel 740 near the base end 733. Lifting pin 731 is attached to the head end 734 and is disposed vertically within channel 740. Lugs 746, functionally similar to mounting flange 556(a) shown in FIGS. 31–33, are provided for securing fork apparatus 730 to the carriage mechanism of a lift truck. Additionally, fork apparatus 730 is provided with a pair of rollers 713 attached to the base end 733.

A horizontal support structure is attached to the fork side of the frame 732 and includes an upper horizontal bar 750 and a lower horizontal bar 752 attached to frame 732. A pair of conventional fork tines 720, commonly known in the fork lift art, are attached to bars 750 and 752, one at either end thereof. Each of the forks 720 have a base end 724, that is attached to bars 750 and 752, and a free end 723, with a support surface 722 disposed therebetween.

Clamp mechanisms 754 and 756 are attached to upper and lower portions respectively of the base end 724 of each fork 720. The bottom surfaces of clamp mechanisms 754 are configured equally and oppositely to the top surface of upper bar 750. Likewise, the top surfaces of clamp mechanisms 756 are configured equally and oppositely to the bottom surface of lower bar 752. Thus, each fork 720 may be positioned on fork apparatus 730 by sliding each fork, in horizontal fashion, onto horizontal bars 750 and 756 so that the aforementioned equal and opposite surfaces interlock. The manner of hooking fork assembly 730 to a hook assembly, such as hook assembly 350 or 550, is identical to that described with respect to tire transporter 330 shown in FIG. 27. Additionally, lugs 746 are attached to the frame 732 for engaging the carriage mechanism of the lift truck. In operation, when the carriage mechanism is raised to a predetermined height by the lift truck, lugs 746 engage the top of the carriage mechanism. The weight of the fork apparatus 730, and any load disposed thereon, is thereafter supported by the carriage mechanism and lug engagement, rather than by the hook assembly 350 or 550 and lifting pin 731. Such a transfer of load support enables fork assembly 730 to lift and transport a variety of heavy loads without damaging hook assembly 350 or 550 and either of lifting pins 731 or 738.

Figure 39:
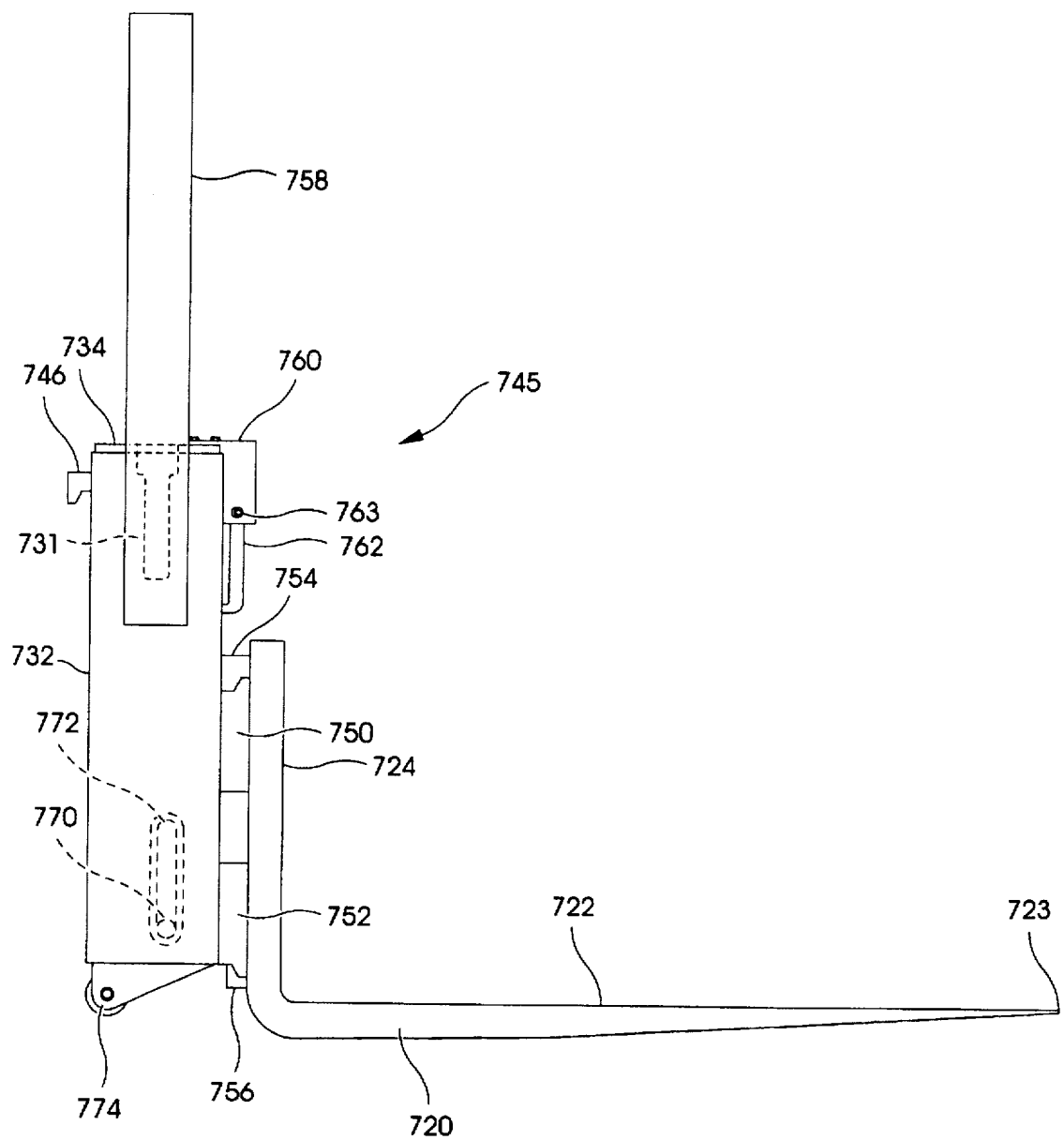
FIG. 39 is a side elevational view of an alternate embodiment of a fork apparatus in accordance with the present invention.
Figure 40:
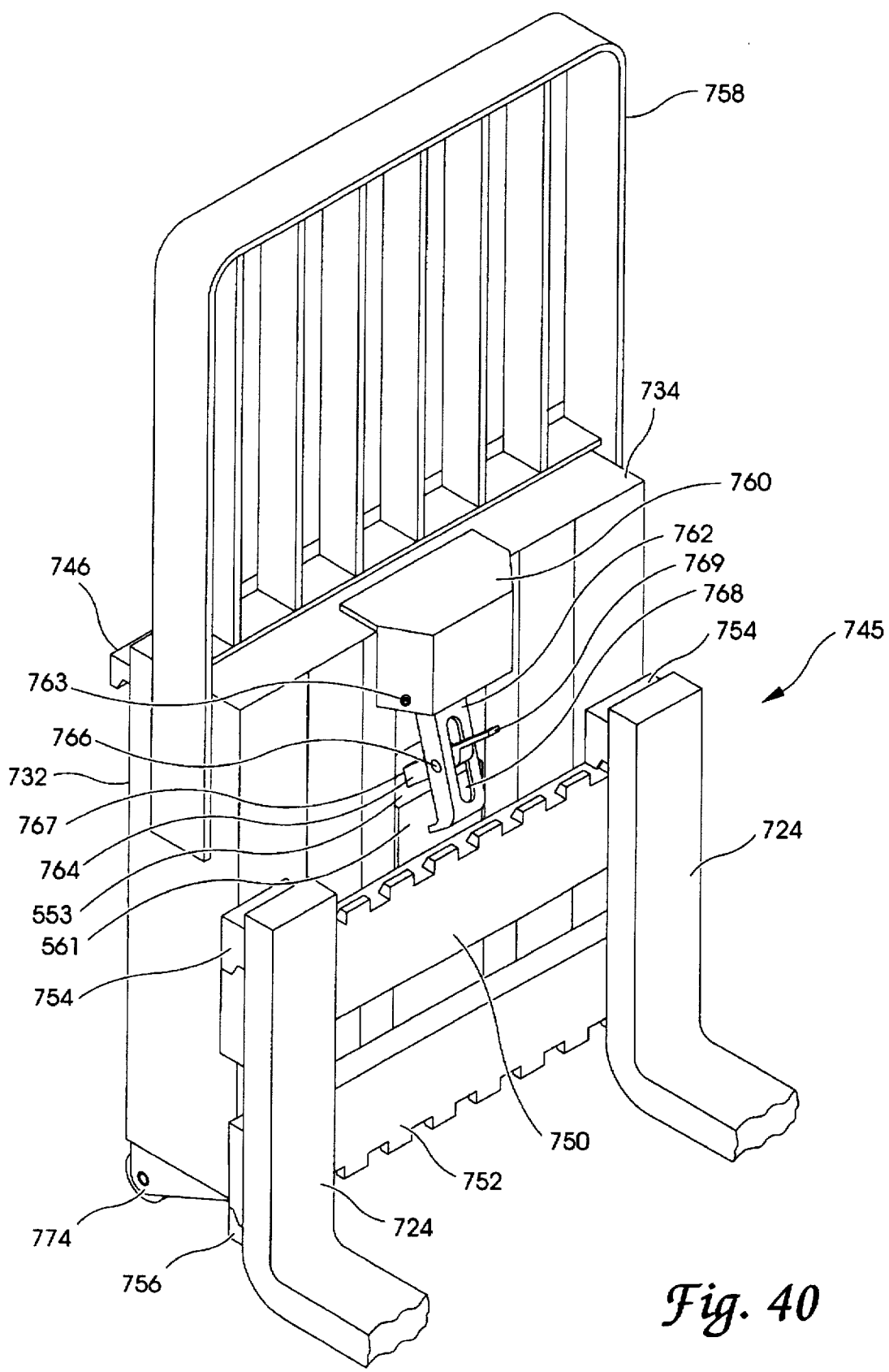
FIG. 40 is a left front perspective view of the fork apparatus of FIG. 39 showing the fork tines in partial cutaway.
Figure 41:
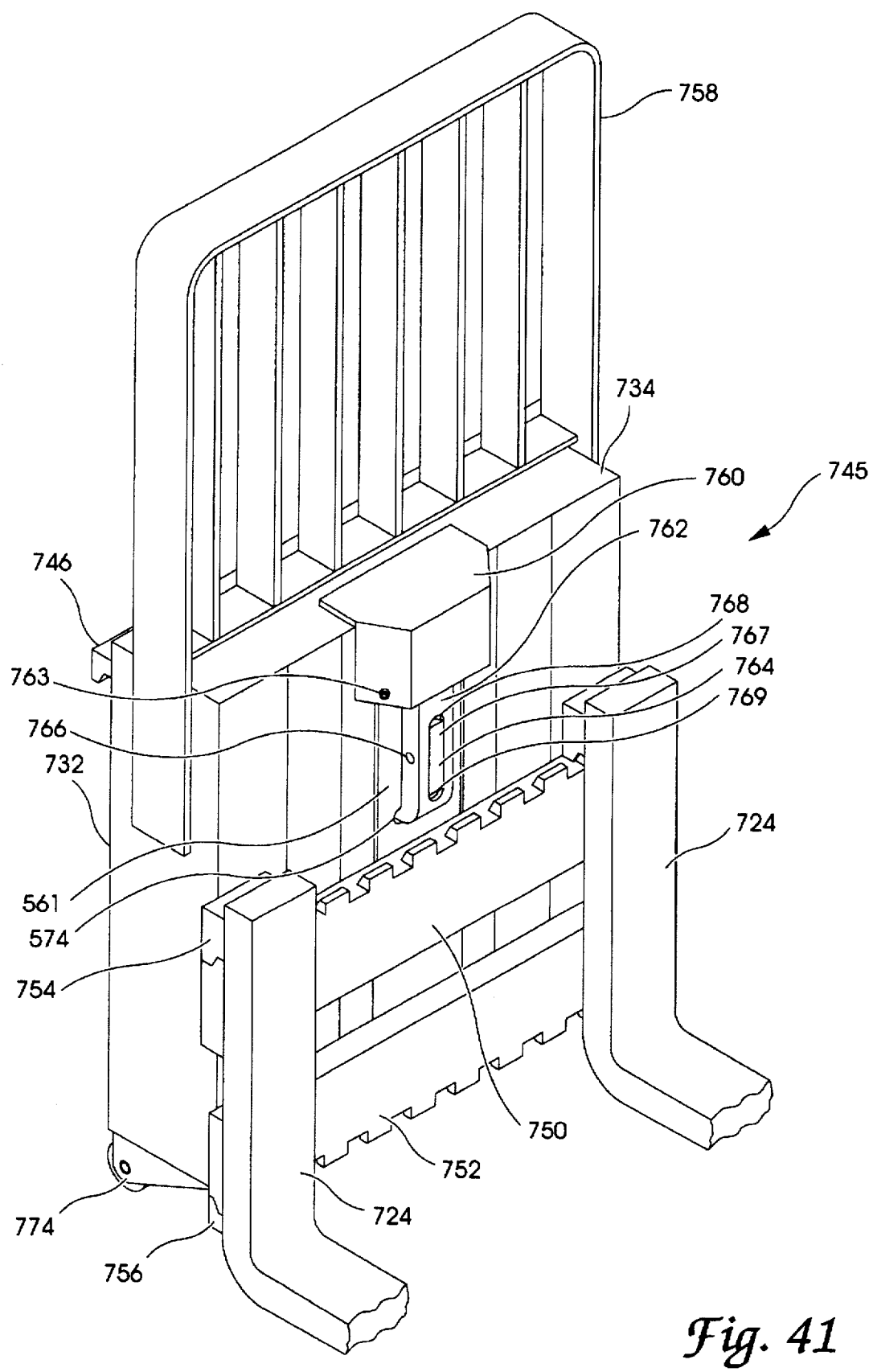
FIG. 41 is a left front perspective view of the fork apparatus of FIG. 39 showing connection of the fork apparatus to a hook assembly.

Referring now to FIGS. 39–41, an improved fork apparatus 745, according to another embodiment of the present invention, is shown. The fork apparatus 745 is, in many ways, identical in structure and function to fork apparatus 730, and like components are therefore labeled with like numbers. However, fork apparatus 745 includes two primary improvements to optimize its use with a hook arrangement, such as hook arrangement 550 (FIGS. 31–33) or new hook arrangement 572 (FIGS. 48–49).

The first of these improvements is a re-configuration of the horizontal lifting pin 738 shown in FIGS. 37 and 38. As shown in FIG. 39, horizontal lifting pin 738 has been replaced by a horizontal lifting pin 770 slidably disposed within a pair of vertical slots 772. Such a configuration permits locating the jaws, such as jaws 557 of hook arrangement 550, at various locations along the hook assembly. In operation, lifting pin 770 is trapped within the jaws of a hook assembly, such as jaws 557 of hook assembly 550, and carried upwardly as vertical lifting pin 731 is received within the hook assembly bore 554. Although not shown in the drawings, the tire transporter 330 of FIG. 27 may similarly include a slidingly disposed horizontal lifting pin in place of horizontal lifting pin 238 for the same purpose as just described.

A second improvement to fork apparatus 745 is a latch mechanism 760, attached to the top 734 of the frame 732. The latch mechanism 760 includes a latch member 762 hingedly connected thereto via pin 763. Preferably, a spring is included within hinge mechanism 760 for biasing latch member 762 toward vertical lifting pin 731. Although this spring is omitted from the figures for ease of illustration, its biasing function may be accomplished by other commonly known means such as a biased hinge or other resilient structure.

Latch member 762 further includes a lever 764 hingedly connected thereto via pin 766. In normal operation of the fork apparatus 745, lever 764 is disposed within groove 768 of latch member 762. As will be more fully discussed hereinafter, lever 764 is pivotable to a position approximately perpendicular to latch member 762 to facilitate connection to hook assembly 561.

The role of the latch mechanism 760 in connecting a hook assembly, such as hook assembly 561 of FIGS. 48–49, will now be described. Although this description is made with reference to hook assembly 561, hook assembly 550 may similarly be used. In either case, the front face 551 of hook assembly 550 or 561 must include a slot 574 therein as shown in FIG. 49. Prior to connecting hook assembly 561 to fork apparatus 745, lever 764 is manually pivoted to a position perpendicular to latch member 762 as shown in FIG. 40. As hook assembly 561 is raised toward vertical lifting pin 731, its top surface 553 comes into contact with lever 764, which causes latch member 762 to pivot away from the front face 551 of hook assembly 561 as shown in FIG. 40. As hook assembly 561 is raised toward vertical lifting pin 731, the top surface 553 causes lever 764 to pivot toward slot 768 of latch member 762. When hook assembly 561 is sufficiently raised so that the slot 574 in the front face 551 of hook assembly 561 becomes aligned with latch member 762, the bias on the latch member 762 forces it to be received within the slot 574. As this occurs, lever 764 is received within slot 768 as shown in FIG. 41. Simultaneously with this sequence, vertical lifting pin 731 is received within bore 554.

When latch member 762 is received within slot 574, hook assembly 561 is thereby rigidly secured to fork apparatus 745. Thus, fork apparatus 745 may be repetitively raised and lowered without disengaging hook assembly 561 from either vertical lifting pin 731 or horizontal lifting pin 770. In this way, a fork lift operator may use fork assembly 745 as a conventional fork lift having fork tines 724. To release hook assembly 561 from fork apparatus 745, the lower portion 769 of lever 764 is pulled in a direction opposite to the face 551 of hook assembly 561. This action causes the top portion 767 of lever 764 to anchor against the face 551 of hook assembly 561. Since latch member 762 is pivotably connected to latch mechanism 760, continued force upon lever 764 in the direction described causes latch member 762 to become disengaged from slot 574. Hook assembly 561 may then be lowered to disengage vertical lifting pin 731 from bore 554. Horizontal lifting pin 770 may thereafter be withdrawn from the jaws 557 of lifting apparatus 561 as previously discussed in connection with earlier hook assembly embodiments.

Fork assembly 745 further includes the addition of fence member 758 attached to the frame 732 adjacent the top 734. Fence member 758 is included to provide a horizontal stop for items stacked on forks 724 higher than the top 734 of fork apparatus 745. Finally, wheel assembly 774 is located adjacent the rear of fork apparatus 745 for increased stability.

Referring now to FIGS. 42–46, yet another tire-stacking device 800, according to a further embodiment of the present invention, is shown. Tire-stacking device 800 is, in many ways, identical in structure and function to tire-stacking devices 410 and 610, and like components are therefore labeled with like numbers. However, device 800 includes several significant improvements over the devices 410 and 610. For example, several apparata have been disclosed herein for preventing the base of a tire-stacking device from being drawn away from the lift truck when an operator is removing the tire-stacking device from a deposited stack of tires, such as the magnetic assembly 450 of tire-stacking device 410 shown in FIGS. 28–30. Although not shown in the previous FIGS., the present invention also contemplates an apparatus for spreading the clamping arrangement, such as clamping arrangement 418, when unloading a stack of tires from tire-stacker 410. In the alternative, the present invention also contemplates an apparatus for displacing the support surfaces, such as surfaces 416 shown in FIG. 28, either toward and away from rollers 420, or pivotally toward and away from arms 421. With the support surfaces so displaced, or the clamping arrangement so spread, the tire-stacker will no longer be subjected to the resistance of a stack of tires when being removed from the stack by the lift truck. The need for providing a mechanism for preventing the base of the tire-stacker from being drawn away from the lift truck when depositing a stack of tires is thereby obviated by utilizing such a clamping arrangement spreading, or support surface displacing, apparatus. Either the spreading or displacing apparatus may be hydraulic, mechanical or electro-mechanical in nature and it is further contemplated that such an apparatus may be capable of being remotely controlled in a manner such as that described with respect to the actuation of the pivoting structure 668 shown in FIGS. 34 and 35.

Figure 42:
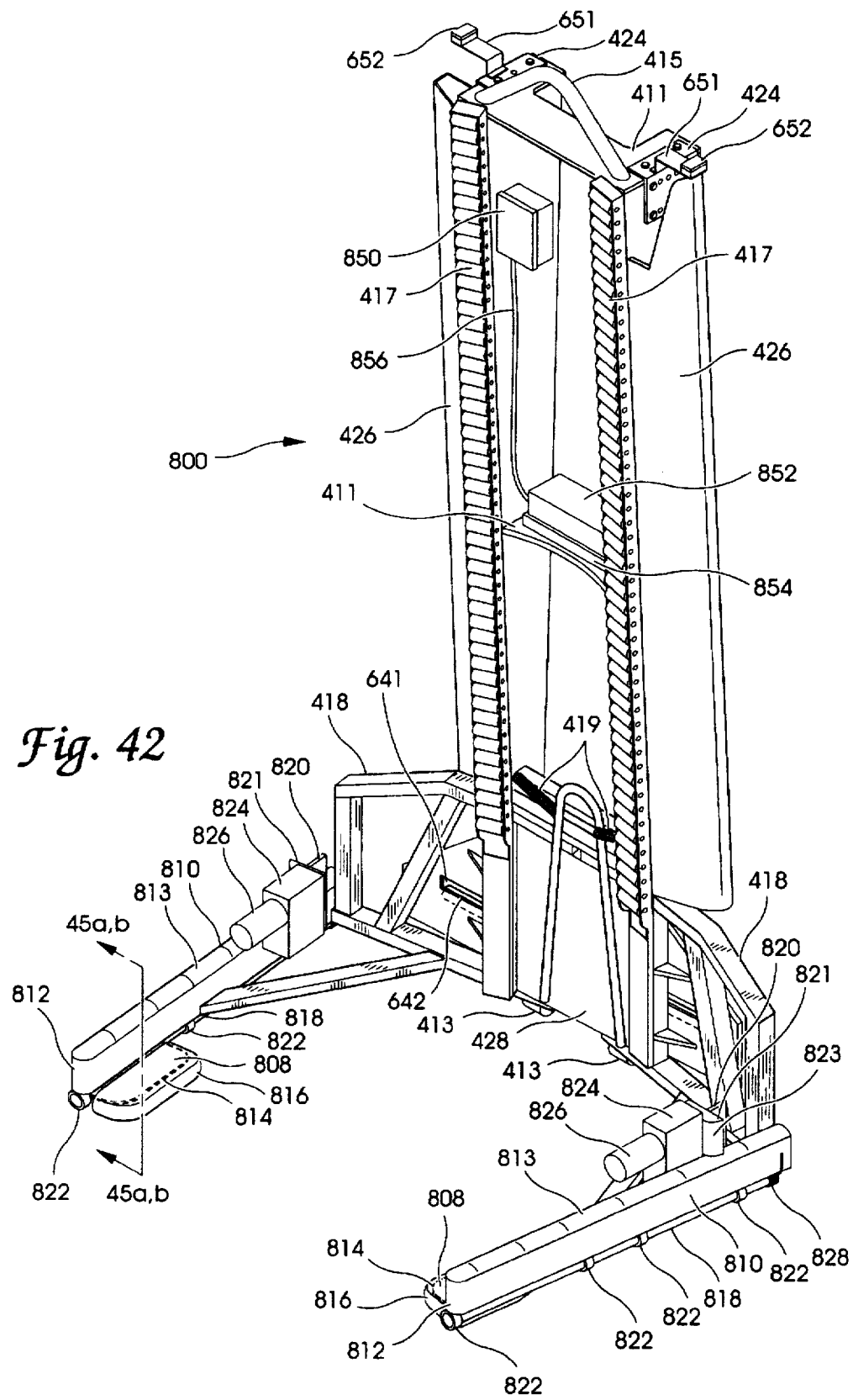
FIG. 42 is a right front perspective view of yet another embodiment of a tire-stacking device in accordance with the present invention.
Figure 43:
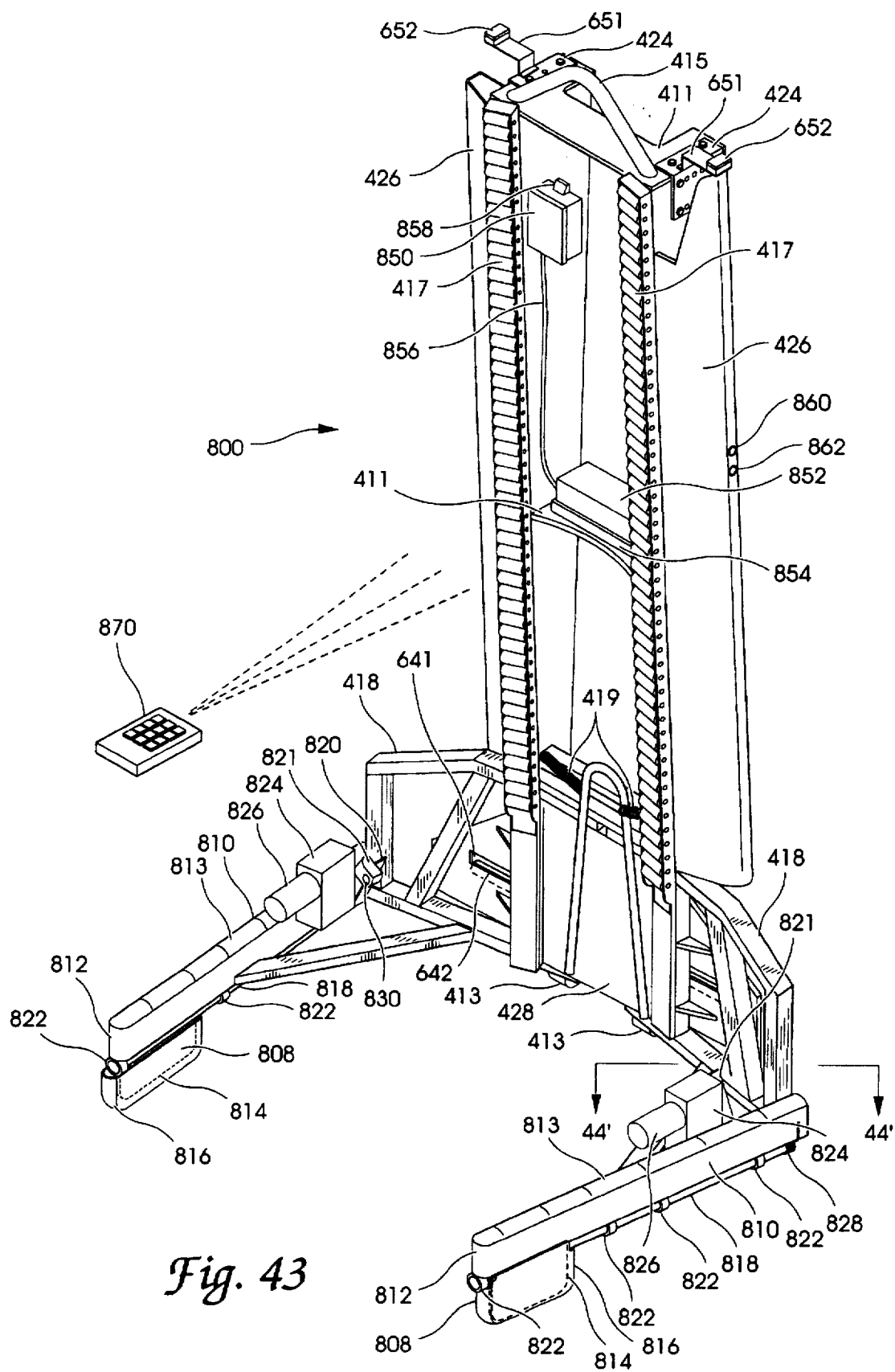
FIG. 43 is a right front perspective view of the tire-stacking device of FIG. 42 showing the tire supporting surfaces pivoted away from each other.

In accordance with these concepts, tire-stacking device 800 incorporates a pair of gripping arms 810, similar to gripping arms 421, but incorporating a pair of tire support surfaces 808 which are lockable in a tire supporting position as shown in FIG. 42, and which are further releasable so that the support surfaces 808 are pivotable away from each other, as shown in FIG. 43, to thereby permit tire-stacking device 800 to be lifted off, or tilted away from, a stack of tires by the lift truck.

The improvements in tire-stacking device 800 over the embodiments 410 and 610 will now be described in detail. Gripping arms 810 are identical to gripping arms 421 with two exceptions. First, upper surface 813 of each gripping arm 810 is convexly shaped. Since the tire-stacking device 800, in this embodiment, is either lifted off, or tilted away from, a stack of tires when support surfaces 808 are pivoted away from each other, there exists the possibility that the top surface 813 of either gripping arm 810 may catch the surface of a misaligned tire in the stack. By providing a convex surface 813, the gripping arms 810 will more easily slide off from a misaligned tire when depositing a stack of tires. Second, the ends 812 of gripping arms 810 are convexly shaped, and the roller 420 is omitted therefrom. In this embodiment, the tire-stacking device 800 is intended to be optimized for stacking tires rather than providing the dual functions of stacking tires and moving existing stacks of tires. Since the task of transporting existing stacks of tires is left to the tire transporter 330 of FIG. 27, rollers 420 for assisting the spreading of gripping arms 810 are no longer necessary and are therefore omitted from the tire-stacking device 800.

Each of the gripping arms 810 further includes a tire support surface 808 pivotably attached thereto. Each of the tire support surfaces 808 includes a support shoe 814 attached to an elongated member 818. Preferably, elongated member 818 is a hollow pipe and support shoe 814 is attached at one end thereto via welding or other commonly known method. Each pipe 818 is pivotably attached to its respective gripping arm 810 via ring-shaped retaining members 822 positioned at various locations along the pipe 818 and rigidly secured to the gripping arms 810. Retaining members 822 may alternatively be configured in a variety of shapes, including a U-shape for example. As a practical matter, retaining members 822 must be rigidly attachable to the gripping arms 810, via fasteners, adhesive, or welding, or the like, and must further permit pipes 818 to pivot relative to gripping arms 810 as shown in FIGS. 42–44.

Figure 44:
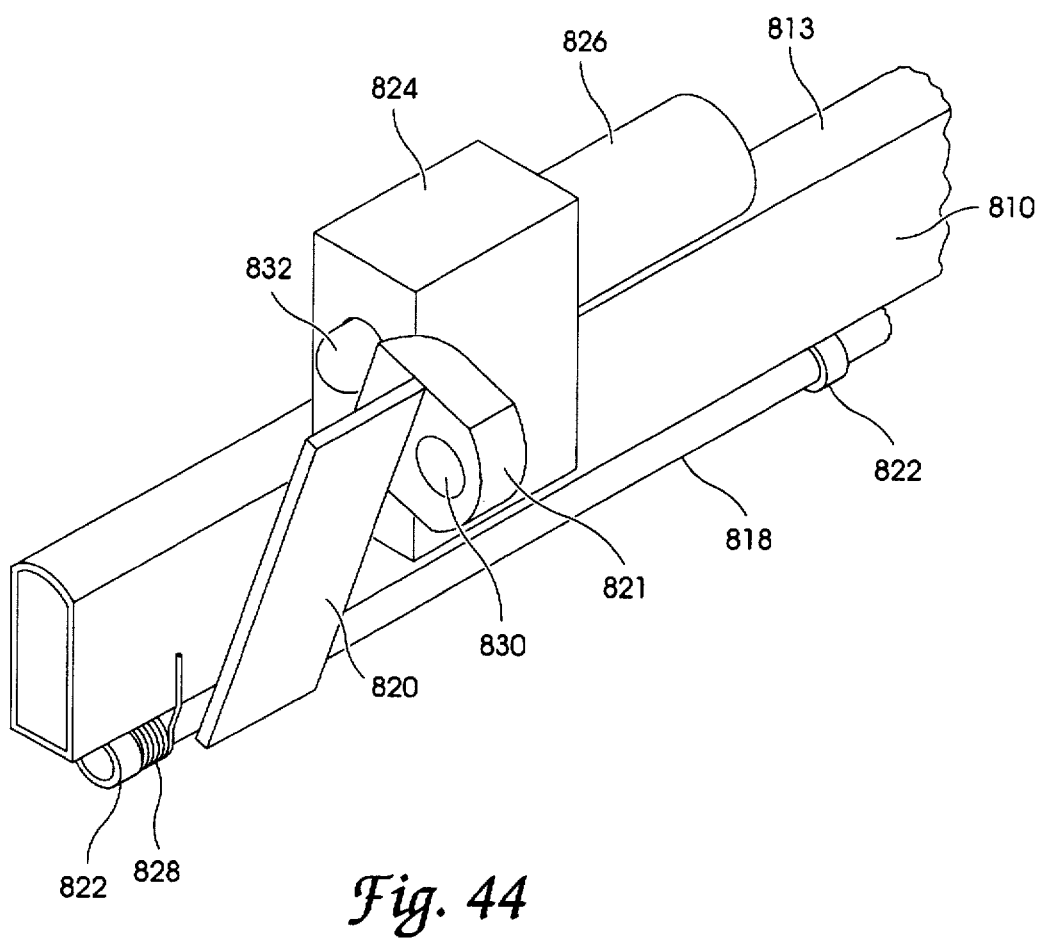
FIG. 44 is a rear perspective view of the support shoe locking structure as viewed from the section lines 44'—44' in FIG. 43.

As most clearly shown in FIG. 44, each of the pipes 818 includes a plate 820 at the opposite end thereof connected to a latch member 821 having a bore 830 disposed therethrough. Each of the pipes 818 includes a biasing mechanism 828 for returning the support surfaces 808 from their pivoted (released) position to their tire-supporting (locked) positions. Although the present invention contemplates the use of various biasing mechanisms 828, such as various electro-mechanical or pneumatic means, a torsion spring 828 is used in a preferred embodiment.

Each of the biasing arms further includes a support block 824 rigidly attached thereto adjacent to the latch members 821. Each of the support blocks 824 has a latch pin 832 disposed therethrough for operative engagement with the bore 830 of latch member 821. Each of the support blocks 824 further includes means 826 for actuating the latch pin 832. Although the means for actuating 826 may be various known mechanical, electro-mechanical, or pneumatic actuators, an electrically actuated solenoid 826 is used in a preferred embodiment.

Figure 45A:
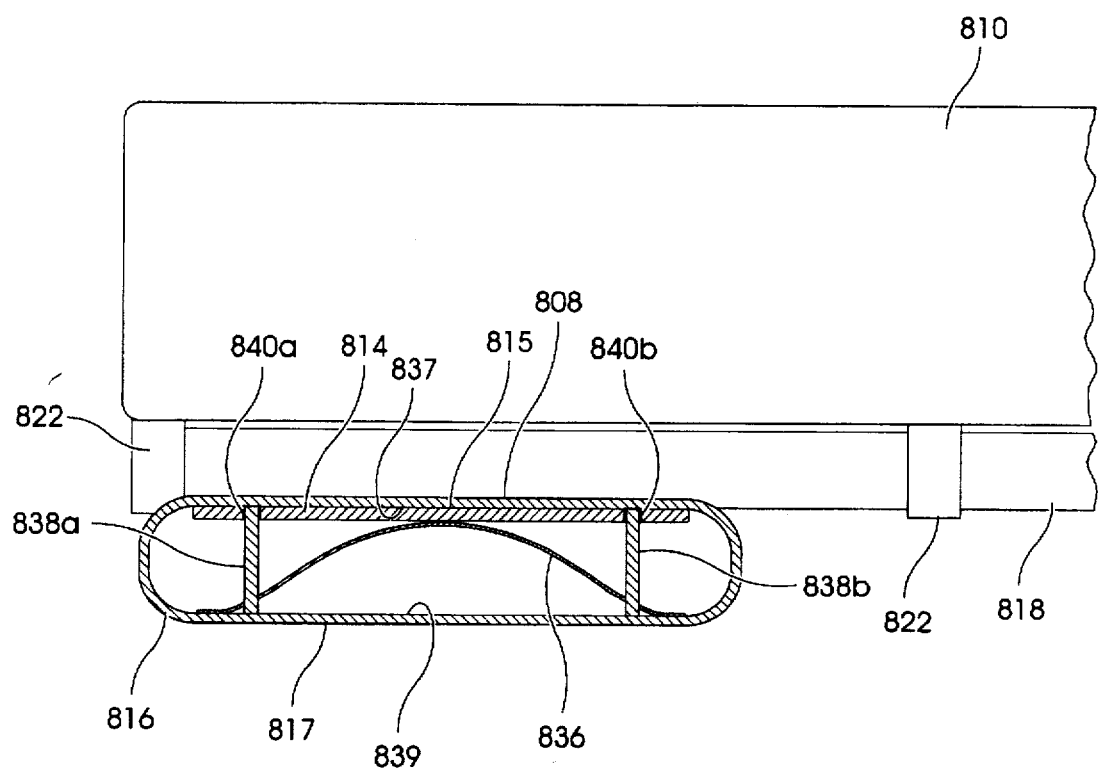
FIG. 45a is a cross-sectional view of the support shoe/overshoe structure along the section lines 45a,b—45a,b of FIG. 42.
Figure 45B:
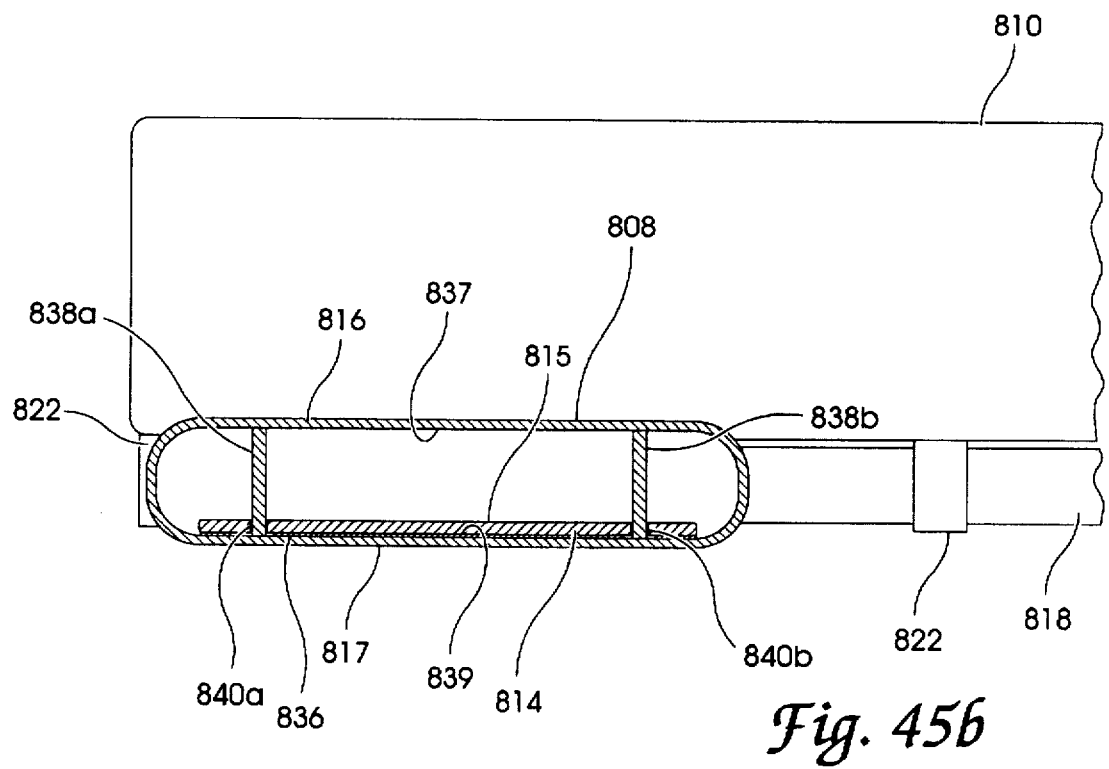
FIG. 45b is another cross-sectional view of the support shoe/overshoe structure along the section lines 45a,b—45a,b of FIG. 42 showing the support shoe descended within the overshoe.

Referring now to FIGS. 45a and 45b, the support surface 808 structure will now be described in detail. As previously described, a support shoe 814 is rigidly attached to each pipe 818 at one end thereof. Each support shoe 814 extends inwardly toward the opposing gripping arm 810, and is operatively associated with its respective pipe 818 and latch member 821 to support a plurality of tires stacked thereon.

Each of the support shoes 814 is further adapted to receive an overshoe 816 thereon. Overshoes 816 are preferably constructed of a rigid material, such as steel, and are sized slightly larger than support shoes 814 so that support shoes 814 may be slidingly received within its respective overshoe 816. Each of the overshoes 816 further include at least one pin attached to an inner surface thereof. In a preferred embodiment, pins 838a and 838b are attached to the lower surface 839 of each overshoe 816. Each of the support shoes 814 further include a pair of bores therethrough 840a and 840b sized to slidingly receive pins 838a and 838b therethrough. Finally, each of the overshoes 816 includes a biasing member 836 for normally biasing the support shoe 814 against the upper inner surface 837 of the overshoe 816. Although a variety of deformably elastic materials may be used for biasing member 836, a flat spring 836 is used in a preferred embodiment.

In operation, each support shoe 814 is normally biased against the upper inner surface 837 of its corresponding overshoe 816 under the action of flat spring 836, as shown in FIG. 45a. As the lower surface 817 of either overshoe 816 is pressed with sufficient force against the ground or floor, the bias of flat spring 836 will be overcome and the support shoe 814 will begin to depress flat spring 836 and descend within the overshoe 816. As each support shoe 814 descends within its respective overshoe 816, the weight of the stack of tires is transferred from the support shoe 814 to the overshoe 816. As shown in FIG. 45b, each support shoe 814 may descend within its corresponding overshoe 816 until it compresses the flat spring 836 against the lower inner surface 839 of the overshoe 816.

Referring back to FIGS. 42 and 43, fire-stacking device 800 further includes control circuitry 850 attached to frame 411 and connected via a conducting path 856 to a battery 852. A battery housing 854 is rigidly secured to the frame 411 and is adapted to retain the battery 852 therein. Preferably, battery 852 is rechargeable, and housing 854 is therefore configured to permit easy removal and replacement of the battery 852 therein. Alternatively, control circuitry 850 may be powered by the lift truck electrical system via appropriate conductors.

Figure 46:
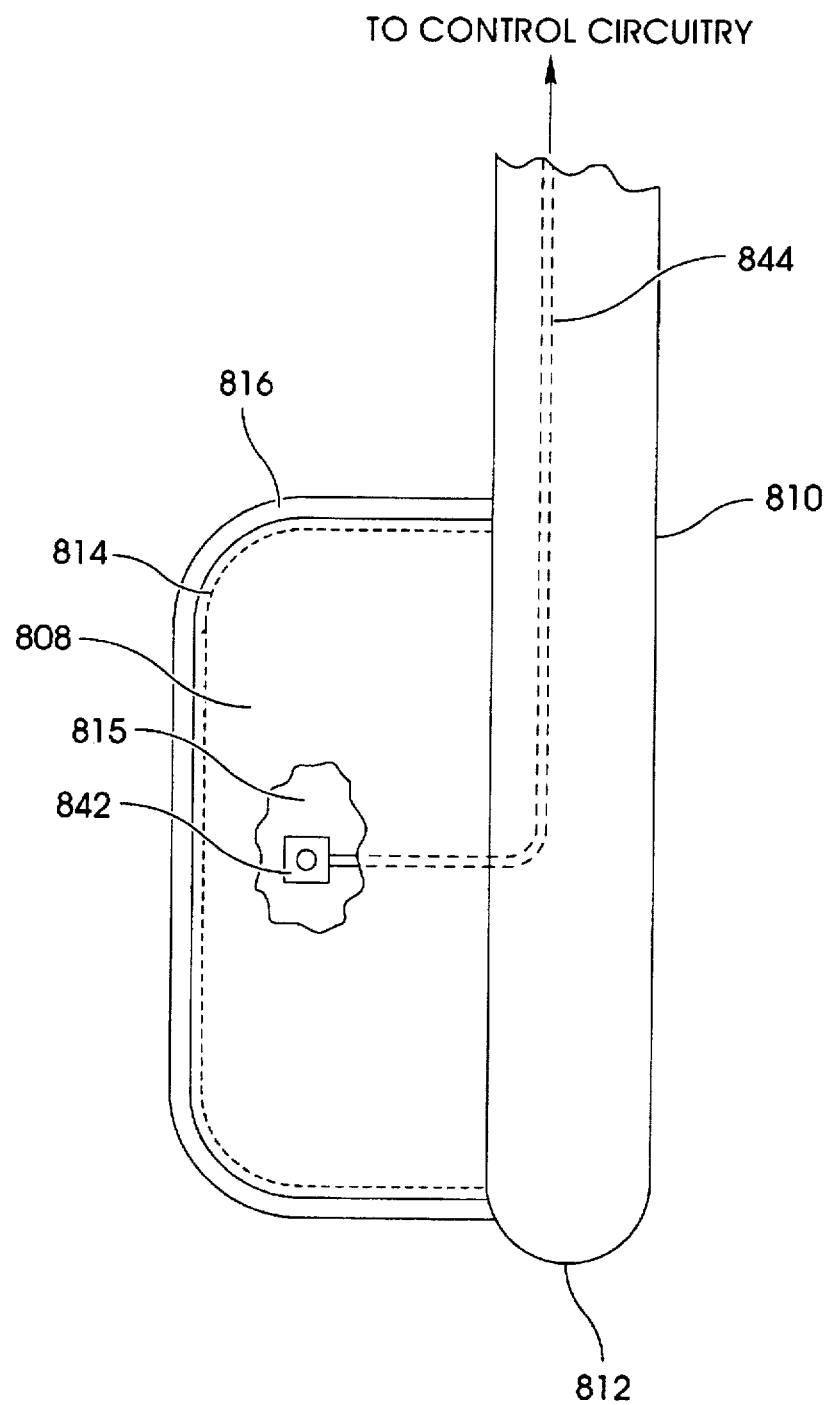
FIG. 46 is a top plan view in partial cutaway of an alternate embodiment of a support shoe containing a proximity switch therein.

Control circuitry 850 is further connected to each of the solenoids 826 via conductors contained within the frame 411 (not shown). In one embodiment, a remote control unit 870 may be used to trigger the control circuitry 850 to actuate each of the solenoids 826. Alternatively, either the support shoe 814 or overshoe 816 may contain means for sensing separation between the top surface 815 of support shoe 814 and the inner top surface 837 of the respective overshoe 816. When such a separation occurs, a signal may be sent to trigger the control circuitry 850 to actuate the solenoids 826. Although a variety of known sensors may be used as the means for sensing separation, a proximity switch 842 is used in a preferred embodiment. As shown in FIG. 46, proximity switch 842 comprises a portion of the top surface 815 of support shoe 814 and is connected to the control circuitry 850 via conductor 844.

Finally, the tire-stacking device 800 includes alternative mechanisms for signalling the lift truck operator when the solenoids 826 have been actuated. First, either one or both of flanges 426 may include means for providing a visual signal to the operator when each of the solenoids 826 has been actuated. Although a variety of visual readout mechanisms may be employed, LEDs 860 and 862 are used in a preferred embodiment as shown in FIG. 43. Each of the LEDs 860 and 862 are connected to control circuitry 850, and are illuminated in some predetermined fashion (continuously illuminated, flashed on and off, etc.) to indicate when each of the solenoids 826 have been actuated. For example, LED 860 may be illuminated when one solenoid 826 is actuated, while the other LED 862 is actuated when the remaining solenoid 826 is actuated. In this way, the lift truck operator is provided with a visual indication of the actuation of each solenoid 826.

The tire-stacking device 800 may further include means for providing an audible indication when both solenoids 826 are actuated. In this way, the lift truck operator is provided with an audible signal to indicate that both solenoids 826 have been actuated and that the tire-stacking device 800 may be removed from the stack of tires. Although a variety of audible mechanisms may be used, including a buzzer, an amplified alarm or a loud speaker conveying a recorded message, for example, a beeper 858 capable of being heard by the lift truck operator is used in a preferred embodiment. Beeper 858 may be connected to the tire-stacking device 800 in any suitable location, and is shown as being mounted to the housing of control circuitry 850 in FIG. 43.

With reference to FIGS. 42-46, the operation of tire-stacking device 800 will now be described in detail. A plurality of tires are positioned upon roller rails 417 while tire-stacking device 800 is in a horizontal position in the same manner as discussed with reference to the previous tire-stacking device embodiments. Tire-stacking device 800 is then raised to its vertical position, as previously discussed, wherein tire support surfaces 808 support the plurality of tires in a support position. In this support position, locking pins 832 are disposed through bores 830 of latch members 821 so that support shoes 814 are locked in the support position. Furthermore, the top surface 815 of support shoes 814 are in contact with the upper inner surfaces 837 of overshoes 816. With the tire-stacking device 800 so arranged, the plurality of tires therein may be transported by a lift truck to a location suitable for depositing the stack of tires.

When a suitable location is reached, tire-stacking device 800 is lowered until the bottom surface 817 of overshoes 816 contacts the tire depositing surface (floor or ground). The tire-stacking device 800 is then pressed against the tire depositing surface by the lift truck so that the support shoes 814 descend within the overshoes 816. As this descent occurs, the weight of the stack of tires is transferred from the support shoes 814 to the overshoes 816. When weight transferal is achieved, the force required by the solenoids 826 to retract the locking pins 832 from the latch members 821 is significantly reduced. In one embodiment, the solenoids 826 may require up to 10 amps to withdraw the locking pins 832 from the latch members 821 when the weight of a stack of tires is transferred to the overshoes 816. Once retracted, approximately 1 amp is required to maintain the locking pins 832 in the retracted position. In order to minimize battery power consumption, it is therefore advantageous to maintain the locking pins 832 in their actuated positions for only a short time period after actuating the solenoids. Although the solenoids 826 may be actuated to hold the locking pins 832 in their retracted positions for variable amounts of time, locking pins 832 are retracted from the bores 830 of latch members 821 for approximately 3 seconds in a preferred embodiment in order to provide the lift truck operator with sufficient time to deposit the stack of tires. This may be accomplished, as previously described, by timely use of a remote control unit 870 or automatically through the use of a proximity switch 842. In either case, when the solenoids 826 have been actuated and the locking pins 832 have been retracted from latch members 821, the support shoes 814 are pivotable, away from each other, to a release position. In order to effectuate release of the stack of tires, the lift truck operator need only raise tire-stacking device 800 vertically, or tilt tire-stacking device 800 toward the lift truck. Either of these actions will cause support shoes 814 to pivot away from each other and release the stack of tires from tire-stacking device 800.

In addition to providing the weight transference function previously described, overshoes 816 provide two additional functional advantages. First, the tire-stacking device can more easily deposit a stack of tires on an uneven surface than with previous tire-stacking device embodiments. Because the support shoes 814 travel within the overshoes 816, a certain tolerance for an uneven tire depositing surface is built into the structure. Previous embodiments, in contrast, required a level tire depositing surface for optimum functionality. Second, it is well known that inflated tires are convexly shaped across their diameter. With previous embodiments of the tire-stacking device, the tire support surfaces of the gripping arms were positioned relative to the gripping arms such that the convex portion of the bottom tire on the stack could contact, and drag along, the floor as the device was raised from its horizontal position to its vertical position by the lift truck. In contrast, the support shoes 814 and overshoes 816 of tire-stacking device 800 are positioned relative to the gripping arms such that the bottom tire in a stack of tires, whether inflated or deflated, does not contact the floor as the tire-stacking device is raised from its horizontal position to its vertical position. Thus tire-stacking device 800 may therefore be operated smoothly and efficiently to stack either inflated or deflated tires.

After the solenoids 826 have held the locking pins 832 in their retracted positions for the required period of time, locking pins 832 are returned to their locking positions. In their locking, or extended, positions, locking pins 832 may easily be manually pushed into their retracted positions by applying force in the direction of retraction. Locking members 821 therefore include a rounded face 823 (FIG. 42) for momentarily retracting locking pins 832 as latch members 821 are returned to their locking positions under the force of torsion springs 828. Rounded face 823 of latch member 821 and locking pins 832 therefore function analogously to an ordinary door latch and striker plate mechanism. Due to the rounded face 823, latch member 821 is easily returned to its locking position, but requires actuation of solenoid 826 in order to unlock. The configuration of latch members 821, support shoes 814, elongated pipes 818, and torsion springs 828 therefore permit the support shoes 814 (and overshoes 816) to automatically return to their support positions after a stack of tires is released from tire-stacking device 800.

Figure 47A:
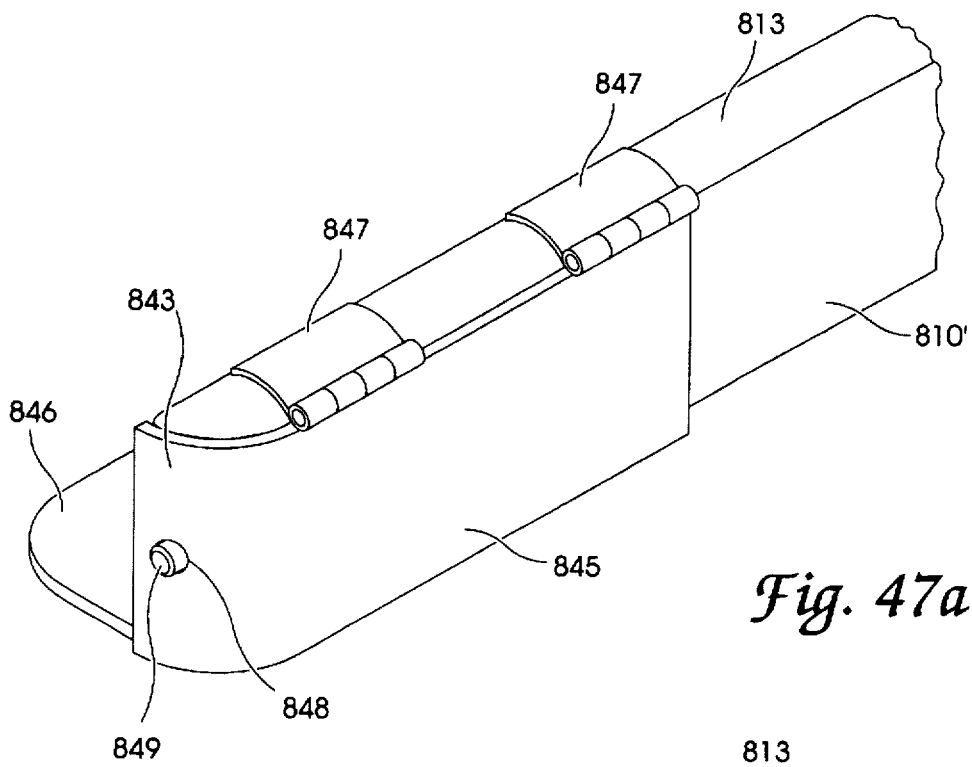
FIG. 47a is a right front perspective view of an alternate support shoe embodiment in accordance with the present invention.
Figure 47B:
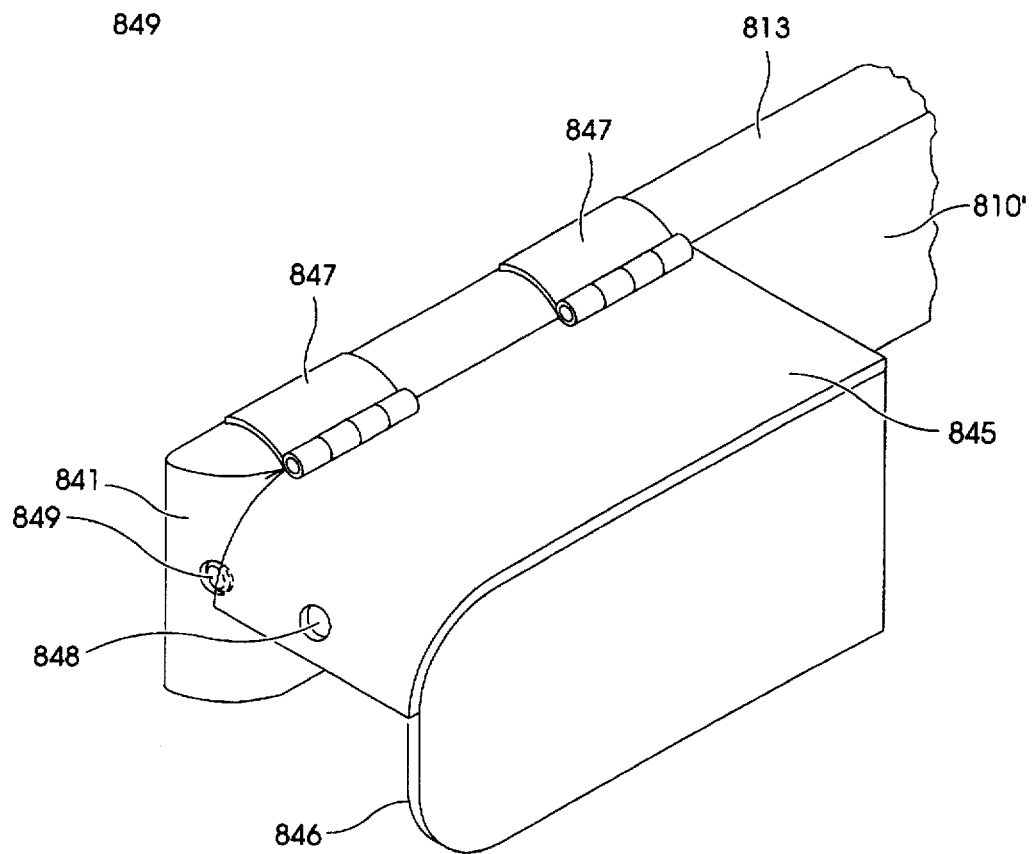
FIG. 47b is a right front perspective view of the support shoe embodiment of FIG. 47a showing the support shoe pivoted to a release position.

Referring now to FIGS. 47a and 47b, an alternate support shoe 845 embodiment is shown. In this embodiment, support shoe 845 is hingedly attached to the top surface 813 of gripping arm 810'. Although a variety of known hinges may be used, a preferred embodiment requires a pair of hinge plates 847 rigidly connected to the top surface 813 of gripping arm 810', and pivotably connected to support shoe 845. Support shoe 845 further includes a support surface 846 extending inwardly from gripping arm 810' toward the opposing gripping arm 810' (not shown). Support shoe 845 further includes a locking portion 843 having a bore 848 disposed therethrough for receiving a locking pin 849 extending from the end 841 of gripping arm 810'. Locking portion 843 of support shoe 845 is configured complementary to the end portion 841 of gripping arm 810'. In operation, locking pin 849 is extended through bore 848 to lock support shoe 845 to gripping arm 810' in a support position, and is further retractable within gripping arm 810' to permit the support surface 846 of support shoe 845 to pivot away from gripping arm 810'.

Figure 48A:
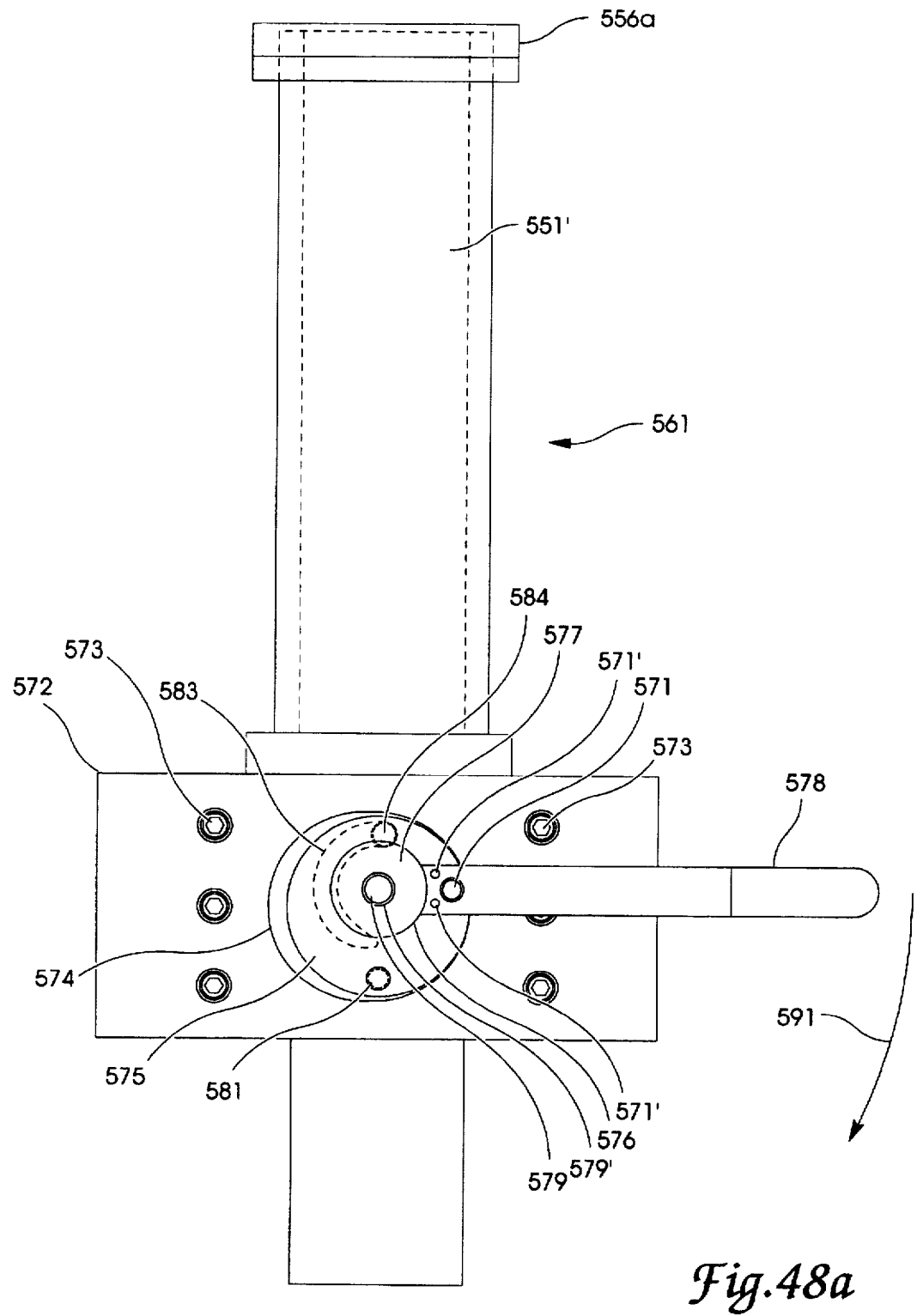
FIG. 48a is a rear elevational view of an alternate embodiment of a hook assembly in accordance with the present invention.
Figure 48B:
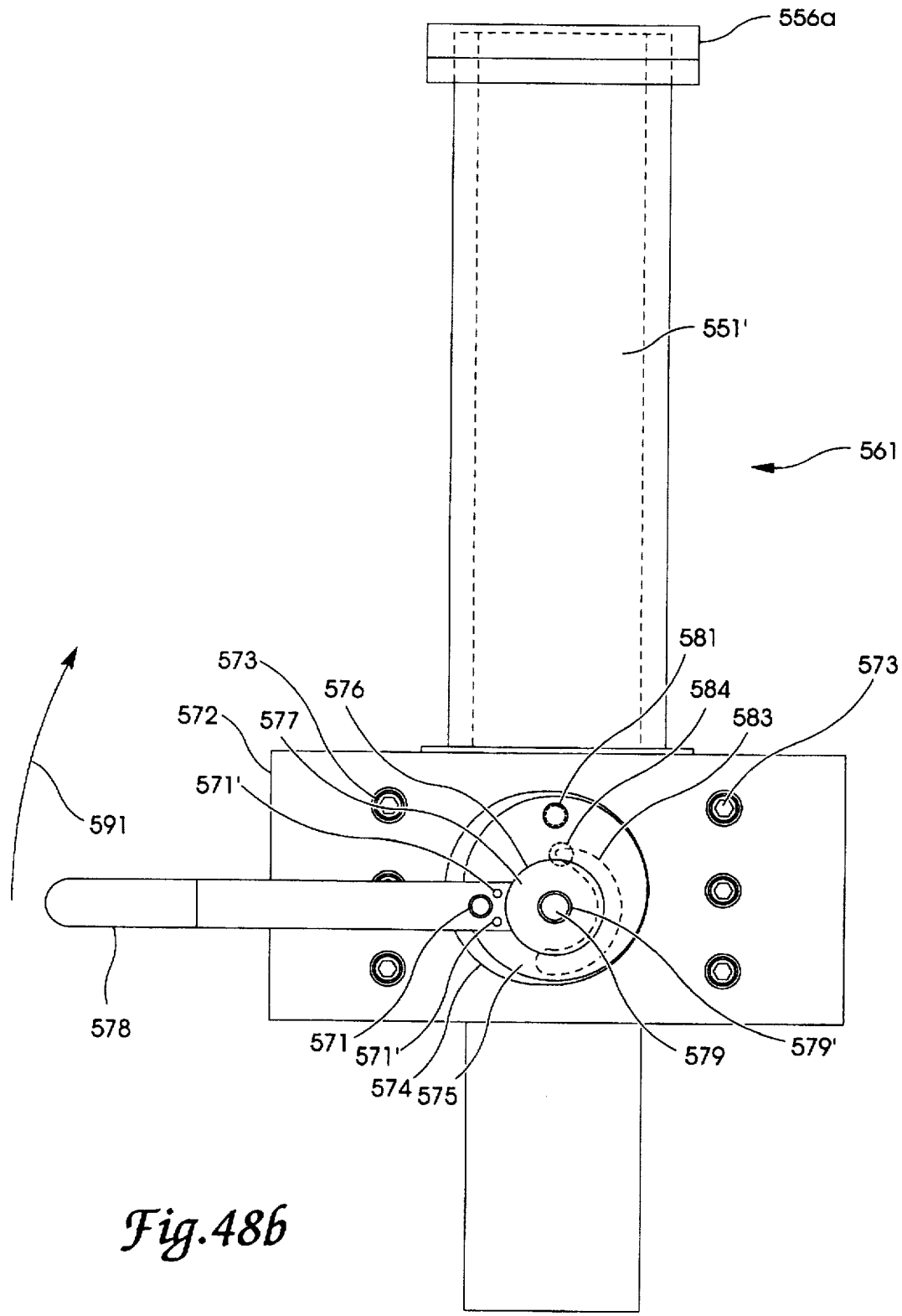
FIG. 48b is a rear elevational view of the hook assembly embodiment of FIG. 48a showing the lower mounting flange in a locked position.
Figure 49:
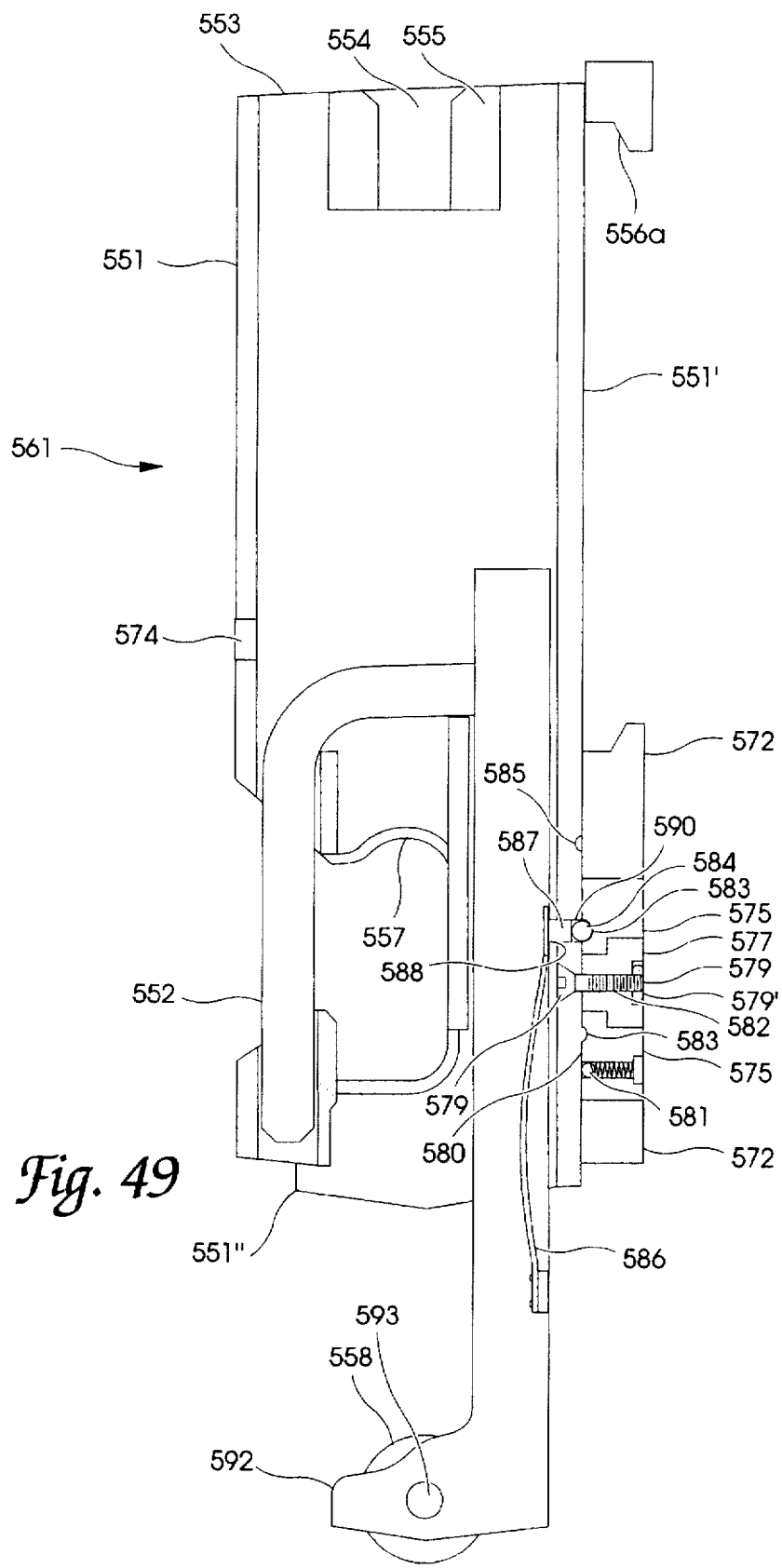

Referring now to FIGS. 48–49, an improved hook assembly 561, according to another embodiment of the present invention, is shown. The hook assembly 561 is, in many ways, identical in structure and function to hook assembly 550, and like components are therefore labeled with like numbers. However, hook assembly 561 includes significant improvements, particularly with respect to the slidable mounting flange 556b. In this regard, flange 556b is shown in FIG. 48a as being replaced by new slidable flange 572. Slidable flange 572 is attached to the flange brackets 563 (not shown) via a series of bolts 573. A bore 574 extends through flange 572 and receives a disc 575 therein. Bore 574 and disc 575 are configured to permit relative rotation therebetween. Disc 575 has a bore 576 therethrough for receiving disc 577 therein. Bore 576 and disc 577 are also configured for permitting relative rotation therebetween. A lever 578 is further provided and is rigidly secured to disc 575 via bolts 571 and 571'. Bolt 579 extends through bore 582 of disc 577 and is received by fastening member 579' to rigidly secure disc 577 to the back 551' of hook apparatus 561.

Disc 575 has a face portion 580 facing the back 551' of hook apparatus 561. Face portion 580 of disc 575 has a ball spring plunger 581 extending therefrom. The back 551' of hook assembly 561 has a detent 585 therein for receiving ball spring plunger 581 when the lever 578 is in a locked position. Face 580 of disc 575 further includes a channel 583 of tapered depth positioned radially, and in a semicircle, about the centerpoint of disc 575. Channel 583 has a ball bearing 584 operable therewith as will be more fully described hereinafter.

The portion of pin 552 facing the back 551' of hook assembly 561 has a locking member 586 attached thereto with a plug 587 extending therefrom and a bore 588 disposed therethrough for receiving the plug 587. Locking member 586 is constantly biased so as to force plug 587 through bore 588. The back 551' of hook assembly 561 further includes a bore 590 disposed therethrough and sized to receive either plug 587 or ball bearing 584 therein. Bore 590 is axially aligned with plug 587 and ball bearing 584 when plug 587 slides, under the action of pin 552, adjacent thereto.

In operation, sliding flange 572 is mounted onto the carriage of a lift truck as previously discussed, with the lever 578 positioned as shown in FIG. 48a. Once positioned on the lift truck carriage, lever 578 is rotated in the direction of arrow 591. In a preferred embodiment, bore 574 is oval-shaped and bore 576 is disposed off-center through disc 575 such that the rotation of lever 578 in the direction of arrow 591 causes mounting flange 572 to be displaced upwardly towards mounting flange 556a. When lever 578 has reached the position shown in FIG. 48b, ball spring plunger 581 is received within detent 585 to restrict further movement of mounting flange 572. In this way, hook assembly 561 is securely mounted to the lift carriage of a lift truck.

Biased locking member 586 provides the previously discussed safety feature of locking the pin 552 in a closed positioned and restricting further movement thereof if hook assembly 561 is attempted to be operated without locking lever 578 in its locked position as shown in FIG. 48b. To accomplish this, the deepest portion of channel 583 is aligned with bore 590 when lever 578 is in its unlocked position as shown in FIG. 48a. Thus, if pin 552 is lowered to its position shown in FIG. 49, plug 587 will extend into bore 590, thereby pushing ball bearing 584 into the deepest portion of channel 583. Pin 552 will thereby be locked in a closed position and further movement of pin 552 will be restricted until lever 578 is rotated to the position shown in FIG. 48b. As lever 578 is rotated in the direction of arrow 591, the depth of channel 583 gradually decreases. It therefore becomes increasingly difficult for plug 587 to displace ball bearing 584 so that when lever 578 is in its locked position, as shown in FIG. 48b, plug 587 is unable to displace ball bearing 584 into channel 583 because channel 583 has minimal depth at this position. Since the ball bearing 584 is firmly positioned within bore 590, due to the decreased depth of channel 583, plug 587, although disposed through bore 588, is thereby inhibited from entering bore 590. Thus, when lever 578 is properly locked, pin 552 is free to actuate between opened and closed positions.

Hook assembly 561 further includes a slot 574 in the front face 551 thereof for receiving latch member 562 of fork assembly 745 as shown and described with respect to FIGS. 39–41. Finally, roller housing 592 is configured to permit roller 558 to be partially exposed above the roller axle 593 as shown in FIG. 49. This configuration is intended as a safety feature so that lifting bar 415 of tire-stacking device 410, 610 or 800 does not become trapped between the roller housing 592 and the underside of hook assembly 561 when attempting to connect hook assembly 561 to one of the tire-stacking devices. If lifting bar 415 does become so trapped, the open wheel design of housing 592 allows the roller 558 to roll the lifting bar 415 outwardly and away from confinement in this area.

Figures 50A, 50B:
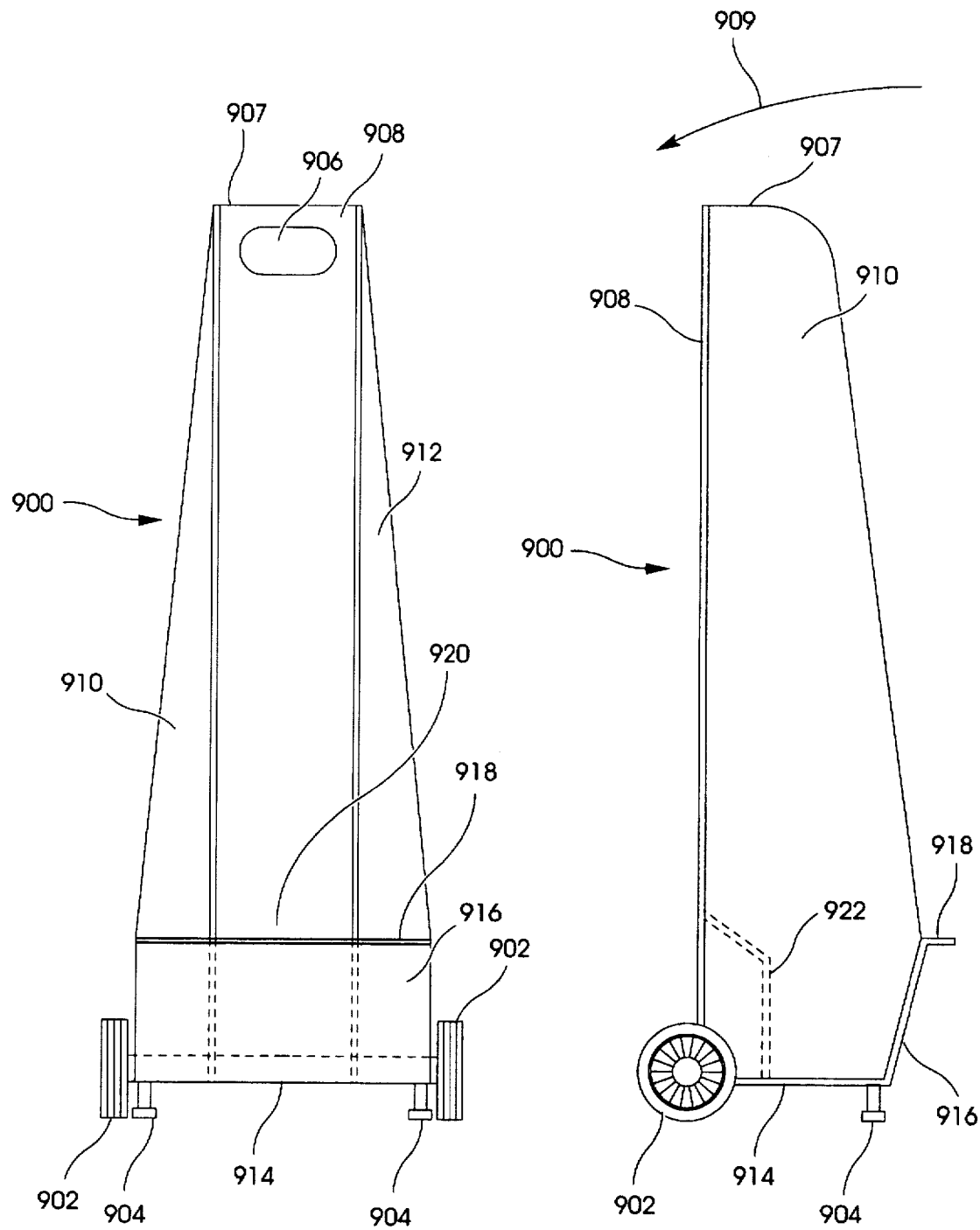
Figure 50C:
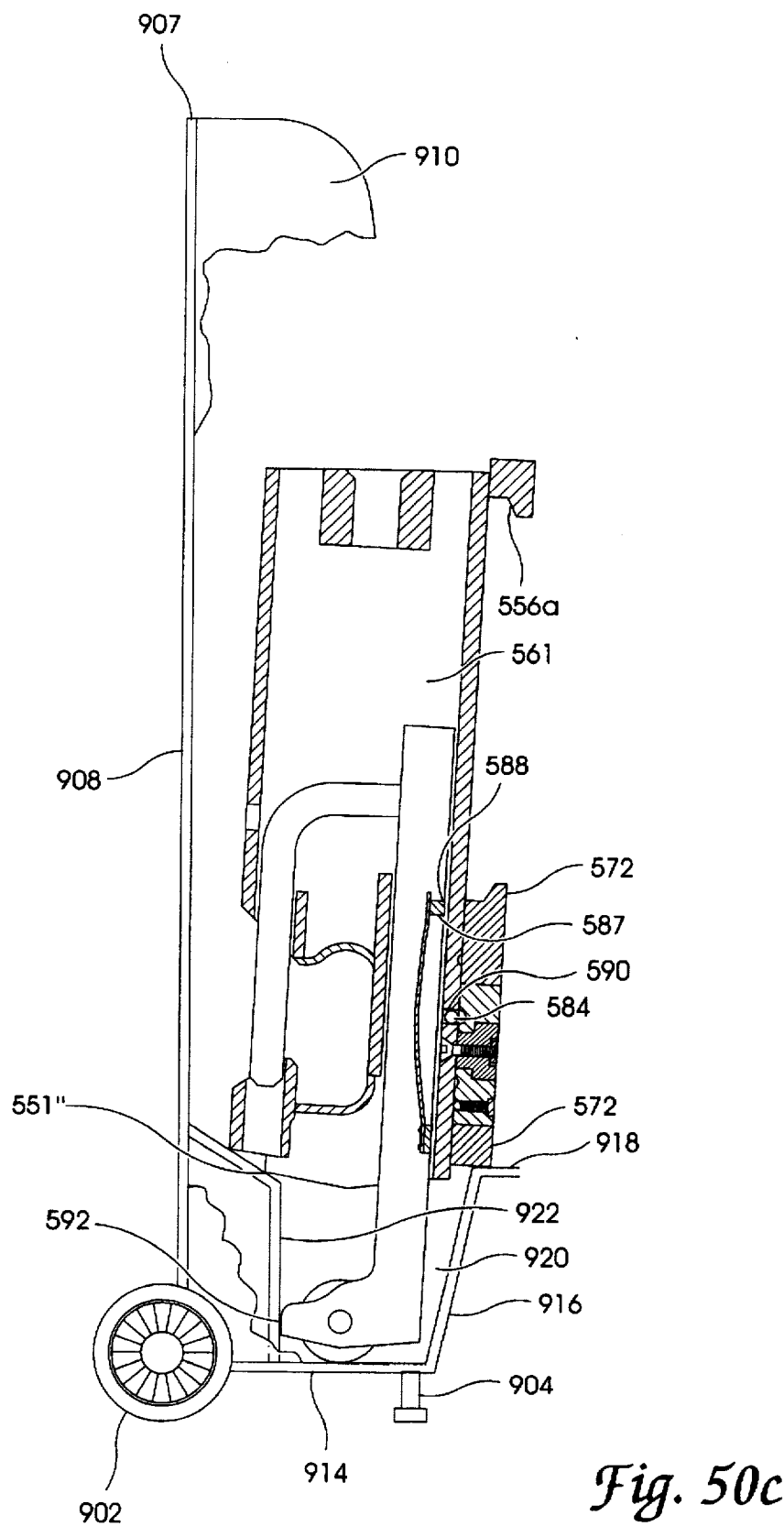
FIG. 50c is a side elevational view of the cart apparatus of FIG. 50a showing the hook assembly of FIG. 49 disposed therein.

Referring now to FIGS. 50a–50c, cart apparatus 900, according to another aspect of the present invention, is shown. Care apparatus 900 has a body portion 908, two side portions 910 and 912, and a base portion 914 having a set of wheels 902 attached thereto. A pair of stands 904 extend from the base portion 914 opposite the wheels 902, and provide means for keeping cart assembly 900 stationary in its vertical position as shown in the figures. Cart assembly 900 further includes a cut out handle portion 906 adjacent the top portion 907 of body 908. Cart assembly 900 is tipable in the direction of arrow 909 so that cart assembly 900 may be manually transported on wheels 902 to various locations.

Cart assembly 900 further includes a front wall portion 916 extending from the base 914 and including a horizontal top ledge 918. A rear wall portion 922 is positioned opposite front wall 916 and extends vertically from the base 914 to the height of ledge 918 and then slants diagonally back toward body 908. Sides 910 and 912, base 914, front wall 916, and rear wall 922 together form a recess 920 for receiving the hook assembly, such as hook assembly 561, therein. In a preferred embodiment, hook assembly 561, as with all hook assembly embodiments discussed herein, is constructed of industrial-grade steel and may weigh 100–150 pounds. Since such a hook assembly may be burdensome to lift, particularly when attempting to simultaneously mount such a hook assembly on the carriage of a lift truck, cart assembly 900 is configured to store a hook assembly, such as hook assembly 561, in a mounting/dismounting position. Hook assembly 561 is received within recess 920 such that the lower front wall portion 551" rests against the diagonal portion of rear wall 922, and the lower mounting flange 572 rests upon ledge 918. Roller 558 (connected to pin 552) is free to fall within recess 920 to the base 914 under the action of gravity. In this position, hook assembly 561 is positioned a sufficient distance above the ground to permit a lift truck to drive up adjacent to cart assembly 900 so that hook assembly 561 may be directly mounted to the lift carriage of the lift truck. Similarly, cart assembly 900 may be positioned so that a lift truck carrying a hook assembly 561 may drive up adjacent thereto and deposit hook assembly 561 therein as previously described. In this way, hook assembly 561 need not be manually lifted when mounting to, or dismounting from, the lift carriage of a lift truck.

While the invention has been illustrated and described in detail in the drawings and foregoing description, the same is to be considered as illustrative and not restrictive in character. It is to be understood that only the preferred embodiment has been shown and described and that all changes and modifications that come-within the spirit of the invention are desired to be protected.

What is claimed is:

1. A fork apparatus for use in cooperative arrangement with a lift truck having a lifting apparatus secured to a hook member defining a bore extending vertically therein from a top surface thereof, the fork apparatus comprising:

a frame having a top end, a base end, and a lifting pin affixed to said top end and centrally positioned within said frame, said lifting pin extending vertically from said top end toward said base end, said lifting pin adapted to be received within the bore of the hook member as the lifting apparatus of the lift truck is raised;

a support structure attached to said frame, said support structure adapted to support a pair of fork lift forks in side by side relation; and a pair of lugs attached to said top end of said frame, said lugs adapted to engage the lifting apparatus of the lift truck such that the lifting apparatus of the lift truck supports said frame.

2. The fork apparatus of claim 1 further including roller means attached to said base end for supporting said base end of said fork apparatus.

3. A fork apparatus for use in cooperative arrangement with a lift truck having a lifting apparatus secured to a hook member defining a bore and a mouth portion therein, the fork apparatus comprising:

a frame having a top end, a base end, a first lifting pin adjacent said top end, and a second lifting pin adjacent said base end, said first lifting pin adapted to be received within the bore of the hook member and said second lifting pin adapted to be received within the mouth portion of the hook member, to thereby attach said frame to the hook member;

a pair of lugs attached to said frame adjacent said top end, said lugs adapted to engage the lifting apparatus of the lift truck such that the lifting apparatus of the lift truck supports said frame; and a support structure attached to said frame, said support structure being adapted to support a pair of fork lift forks in side by side relation.

4. The fork apparatus of claim 3 wherein the hook member defines a slot therein, said fork apparatus further including a latch attached to said frame adjacent said first lifting pin, said latch adapted to be received within the slot of the hook member to thereby lock said frame to the hook member.

5. The fork apparatus of claim 4 wherein said latch further includes a releasing element operable to withdraw said latch from the slot of the hook member.

* * * * *